United States Patent
Conrad

(10) Patent No.: US 11,766,156 B2
(45) Date of Patent: Sep. 26, 2023

(54) SURFACE CLEANING APPARATUS WITH REMOVABLE AIR TREATMENT MEMBER ASSEMBLY

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

( * ) Notice: Subject to any disclaimer, the term of this patent is extended or adjusted under 35 U.S.C. 154(b) by 275 days.

(21) Appl. No.: 16/823,203

(22) Filed: Mar. 18, 2020

(65) Prior Publication Data

US 2021/0290016 A1    Sep. 23, 2021

(51) Int. Cl.
  *A47L 9/12*        (2006.01)
  *A47L 9/32*        (2006.01)
  (Continued)

(52) U.S. Cl.
  CPC .................. *A47L 9/12* (2013.01); *A47L 9/165* (2013.01); *A47L 9/1666* (2013.01); *A47L 9/20* (2013.01);
  (Continued)

(58) Field of Classification Search
  CPC ... A47L 5/24; A47L 5/225; A47L 9/12; A47L 9/165; A47L 9/1666; A47L 9/20;
  (Continued)

(56) References Cited

U.S. PATENT DOCUMENTS

| | | |
|---|---|---|
| 911,258 A | 2/1909 | Neumann |
| 1,600,762 A | 9/1926 | Hawley |
| | (Continued) | |

FOREIGN PATENT DOCUMENTS

| | | |
|---|---|---|
| AU | 112778 | 4/1940 |
| CA | 1077412 A1 | 5/1980 |
| | (Continued) | |

OTHER PUBLICATIONS

Handbook of Air Pollution Prevention and Control, pp. 397-404, 2002.

(Continued)

*Primary Examiner* — Lee D Wilson
*Assistant Examiner* — Alberto Saenz
(74) *Attorney, Agent, or Firm* — Philip C. Mendes da Costa; BERESKIN & PARR LLP/S.E.N.C.R.L., s.r.l.

(57) ABSTRACT

A hand vacuum includes a nozzle portion at a front end of the hand vacuum having a dirty air inlet. An air flow passage extends from the dirty air inlet to a clean air outlet in a main body rearward of the nozzle portion. The main body houses a suction motor in the air flow passage. First and second laterally spaced apart opposed arm members extend generally axially between the nozzle portion and the main body, and a volume is positioned between the nozzle portion, the main body and the opposed arm members. An air treatment member assembly comprising an air treatment member is removably positionable in the volume. At least one of a nozzle portion air outlet, an air treatment member assembly air inlet, an air treatment member assembly air outlet and a main body air inlet is axially retractable.

17 Claims, 24 Drawing Sheets

(51) Int. Cl.
   *A47L 9/16* (2006.01)
   *A47L 9/20* (2006.01)
   *B01D 45/16* (2006.01)
   *B01D 46/00* (2022.01)

(52) U.S. Cl.
   CPC .............. *A47L 9/322* (2013.01); *B01D 45/16* (2013.01); *B01D 46/0005* (2013.01); *B01D 2279/55* (2013.01)

(58) Field of Classification Search
   CPC ..... A47L 9/322; B01D 45/16; B01D 46/0005; B01D 2279/55
   USPC ...................................................... 15/347, 24
   See application file for complete search history.

(56) References Cited

U.S. PATENT DOCUMENTS

| | | |
|---|---|---|
| 1,797,812 A | 3/1931 | Waring |
| 1,898,608 A | 2/1933 | Alexander |
| 1,937,765 A | 12/1933 | Ward |
| 2,015,464 A | 9/1935 | Saint |
| 2,152,114 A | 3/1939 | Van Tongeren |
| 2,542,634 A | 2/1951 | Davis et al. |
| 2,678,110 A | 5/1954 | Madsen |
| 2,731,102 A | 1/1956 | James |
| 2,811,219 A | 10/1957 | Wenzl |
| 2,846,024 A | 8/1958 | Bremi |
| 2,913,111 A | 11/1959 | Rogers |
| 2,917,131 A | 12/1959 | Evans |
| 2,937,713 A | 5/1960 | Stephenson et al. |
| 2,942,691 A | 6/1960 | Dillon |
| 2,942,692 A | 6/1960 | Benz |
| 2,946,451 A | 7/1960 | Culleton |
| 2,952,330 A | 9/1960 | Winslow |
| 2,981,369 A | 4/1961 | Yellott et al. |
| 3,032,954 A | 5/1962 | Racklyeft |
| 3,085,221 A | 4/1963 | Kelly |
| 3,130,157 A | 4/1964 | Kelsall et al. |
| 3,200,568 A | 8/1965 | McNeil |
| 3,204,772 A | 9/1965 | Ruxton |
| 3,217,469 A | 11/1965 | Eckert |
| 3,269,097 A | 8/1966 | German |
| 3,320,727 A | 5/1967 | Farley et al. |
| 3,372,532 A | 3/1968 | Campbell |
| 3,426,513 A | 2/1969 | Bauer |
| 3,518,815 A | 7/1970 | Peterson et al. |
| 3,530,649 A | 9/1970 | Porsch et al. |
| 3,543,325 A | 12/1970 | Hamrick et al. |
| 3,561,824 A | 2/1971 | Homan |
| 3,582,616 A | 6/1971 | Wrob |
| 3,675,401 A | 7/1972 | Cordes |
| 3,684,093 A | 8/1972 | Kono |
| 3,822,533 A | 7/1974 | Oranje |
| 3,898,068 A | 8/1975 | McNeil et al. |
| 3,933,450 A | 1/1976 | Percevaut |
| 3,988,132 A | 10/1976 | Oranje |
| 3,988,133 A | 10/1976 | Schady |
| 4,097,381 A | 6/1978 | Ritzler |
| 4,187,088 A | 2/1980 | Hodgson |
| 4,218,805 A | 8/1980 | Brazier |
| 4,236,903 A | 12/1980 | Malmsten |
| 4,307,485 A | 12/1981 | Dessig |
| 4,373,228 A | 2/1983 | Dyson |
| 4,382,804 A | 5/1983 | Mellor |
| 4,409,008 A | 10/1983 | Solymes |
| 4,486,207 A | 12/1984 | Baillie |
| 4,494,270 A | 1/1985 | Ritzau et al. |
| 4,523,936 A | 6/1985 | Disanza, Jr. |
| 4,678,588 A | 7/1987 | Shortt |
| 4,700,429 A | 10/1987 | Martin et al. |
| 4,744,958 A | 5/1988 | Pircon |
| 4,778,494 A | 10/1988 | Patterson |
| 4,826,515 A | 5/1989 | Dyson |
| D303,173 S | 8/1989 | Masakata et al. |
| 4,853,008 A | 8/1989 | Dyson |
| 4,853,011 A | 8/1989 | Dyson |
| 4,853,111 A | 8/1989 | MacArthur et al. |
| 4,905,342 A | 3/1990 | Ataka |
| 4,944,780 A | 7/1990 | Usmani |
| 5,078,761 A | 1/1992 | Dyson |
| 5,080,697 A | 1/1992 | Finke |
| 5,090,976 A | 2/1992 | Dyson |
| 5,129,125 A | 7/1992 | Gamou et al. |
| 5,224,238 A | 7/1993 | Bartlett |
| 5,230,722 A | 7/1993 | Yonkers |
| 5,254,019 A | 10/1993 | Noschese |
| 5,267,371 A | 12/1993 | Solerm et al. |
| 5,287,591 A | 2/1994 | Rench et al. |
| 5,307,538 A | 5/1994 | Rench et al. |
| 5,309,601 A | 5/1994 | Hampton et al. |
| 5,347,679 A | 9/1994 | Saunders et al. |
| 5,363,535 A | 11/1994 | Rench et al. |
| 5,481,780 A | 1/1996 | Daneshvar |
| 5,504,970 A | 4/1996 | Neshat et al. |
| 5,599,365 A | 2/1997 | Alday et al. |
| D380,033 S | 6/1997 | Masterton et al. |
| 5,755,096 A | 5/1998 | Holleyman |
| 5,815,878 A | 10/1998 | Murakami et al. |
| 5,858,038 A | 1/1999 | Dyson et al. |
| 5,858,043 A | 1/1999 | Geise |
| 5,893,938 A | 4/1999 | Dyson et al. |
| 5,935,279 A | 8/1999 | Kilstroem |
| 5,950,274 A | 9/1999 | Kilstrom |
| 5,970,572 A | 10/1999 | Thomas |
| 6,071,095 A | 6/2000 | Verkaar |
| 6,071,321 A | 6/2000 | Trapp et al. |
| 6,080,022 A | 6/2000 | Shaberman et al. |
| 6,122,796 A | 9/2000 | Downham et al. |
| 6,210,469 B1 | 4/2001 | Tokar |
| 6,221,134 B1 | 4/2001 | Conrad et al. |
| 6,228,260 B1 | 5/2001 | Conrad et al. |
| 6,231,645 B1 | 5/2001 | Conrad et al. |
| 6,251,296 B1 | 6/2001 | Conrad et al. |
| 6,260,234 B1 | 7/2001 | Wright et al. |
| 6,345,408 B1 | 2/2002 | Nagai et al. |
| 6,406,505 B1 | 6/2002 | Oh et al. |
| 6,434,785 B1 | 8/2002 | Vandenbelt et al. |
| 6,440,197 B1 | 8/2002 | Conrad et al. |
| 6,502,278 B2 | 1/2003 | Oh et al. |
| 6,519,810 B2 | 2/2003 | Kim |
| 6,531,066 B1 | 3/2003 | Saunders et al. |
| 6,553,612 B1 | 4/2003 | Dyson et al. |
| 6,553,613 B2 | 4/2003 | Onishi et al. |
| 6,560,818 B1 | 5/2003 | Hasko |
| 6,581,239 B1 | 6/2003 | Dyson et al. |
| 6,599,338 B2 | 7/2003 | Oh et al. |
| 6,599,350 B1 | 7/2003 | Rockwell et al. |
| 6,613,316 B2 | 9/2003 | Sun et al. |
| 6,623,539 B2 | 9/2003 | Lee et al. |
| 6,625,845 B2 | 9/2003 | Matsumoto et al. |
| 6,640,385 B2 | 11/2003 | Oh et al. |
| 6,648,934 B2 | 11/2003 | Choi et al. |
| 6,712,868 B2 | 3/2004 | Murphy et al. |
| 6,732,403 B2 | 5/2004 | Moore et al. |
| 6,746,500 B1 | 6/2004 | Park et al. |
| 6,782,583 B2 | 8/2004 | Oh |
| 6,782,585 B1 | 8/2004 | Conrad et al. |
| 6,810,558 B2 | 11/2004 | Lee |
| 6,818,036 B1 | 11/2004 | Seaman |
| 6,833,015 B2 | 12/2004 | Oh et al. |
| 6,868,578 B1 | 3/2005 | Kasper |
| 6,874,197 B1 | 4/2005 | Conrad |
| 6,896,719 B2 | 5/2005 | Coates et al. |
| 6,929,516 B2 | 8/2005 | Brochu et al. |
| 6,968,596 B2 | 11/2005 | Oh et al. |
| 6,976,885 B2 | 12/2005 | Lord |
| 7,160,346 B2 | 1/2007 | Park |
| 7,162,770 B2 | 1/2007 | Davidshofer |
| 7,175,682 B2 | 2/2007 | Nakai et al. |
| 7,198,656 B2 | 4/2007 | Takemoto et al. |
| 7,222,393 B2 | 5/2007 | Kaffenberger et al. |
| 7,272,872 B2 | 9/2007 | Choi |
| 7,278,181 B2 | 10/2007 | Harris et al. |

(56) References Cited

U.S. PATENT DOCUMENTS

| | | |
|---|---|---|
| 7,341,611 B2 | 3/2008 | Greene et al. |
| 7,354,468 B2 | 4/2008 | Arnold et al. |
| 7,370,387 B2 | 5/2008 | Walker et al. |
| 7,377,007 B2 | 5/2008 | Best |
| 7,377,953 B2 | 5/2008 | Ph |
| 7,386,915 B2 | 6/2008 | Blocker et al. |
| 7,395,579 B2 | 7/2008 | Oh |
| 7,429,284 B2 | 9/2008 | Oh |
| 7,448,363 B1 | 11/2008 | Rasmussen et al. |
| 7,449,040 B2 | 11/2008 | Conrad et al. |
| 7,485,164 B2 | 2/2009 | Jeong et al. |
| 7,488,363 B2 | 2/2009 | Jeong et al. |
| 7,547,337 B2 | 6/2009 | Oh |
| 7,547,338 B2 | 6/2009 | Kim et al. |
| 7,563,298 B2 | 7/2009 | Oh |
| 7,588,616 B2 | 9/2009 | Conrad et al. |
| 7,597,730 B2 | 10/2009 | Yoo et al. |
| 7,628,831 B2 | 12/2009 | Gomiciaga-Pereda et al. |
| 7,740,676 B2 | 6/2010 | Burnham et al. |
| 7,770,256 B1 | 8/2010 | Fester |
| 7,776,120 B2 | 8/2010 | Conrad |
| 7,779,506 B2 | 8/2010 | Kang et al. |
| 7,803,207 B2 | 9/2010 | Conrad |
| 7,805,804 B2 | 10/2010 | Loebig |
| 7,811,349 B2 | 10/2010 | Nguyen |
| 7,867,308 B2 | 1/2011 | Conrad |
| 7,922,794 B2 | 4/2011 | Morphey |
| 7,931,716 B2 | 4/2011 | Oakham |
| 7,938,871 B2 | 5/2011 | Lloyd |
| 7,979,959 B2 | 7/2011 | Courtney |
| 8,021,453 B2 | 9/2011 | Howes |
| 8,062,398 B2 | 11/2011 | Luo et al. |
| 8,117,712 B2 | 2/2012 | Dyson et al. |
| 8,146,201 B2 | 4/2012 | Conrad |
| 8,151,407 B2 | 4/2012 | Conrad |
| 8,152,877 B2 | 4/2012 | Greene |
| 8,156,609 B2 | 4/2012 | Milne et al. |
| 8,161,599 B2 | 4/2012 | Griffith et al. |
| 8,225,456 B2 | 7/2012 | Håkan et al. |
| 8,484,799 B2 | 7/2013 | Conrad |
| 8,673,487 B2 | 3/2014 | Churchill |
| 9,314,139 B2 | 4/2016 | Conrad |
| 2002/0011050 A1 | 1/2002 | Hansen et al. |
| 2002/0011053 A1 | 1/2002 | Oh |
| 2002/0062531 A1 | 5/2002 | Oh |
| 2002/0088208 A1 | 7/2002 | Lukac et al. |
| 2002/0112315 A1 | 8/2002 | Conrad |
| 2002/0134059 A1 | 9/2002 | Oh |
| 2002/0178535 A1 | 12/2002 | Oh et al. |
| 2002/0178698 A1 | 12/2002 | Oh et al. |
| 2002/0178699 A1 | 12/2002 | Oh |
| 2003/0046910 A1 | 3/2003 | Lee |
| 2003/0066273 A1 | 4/2003 | Choi et al. |
| 2003/0106180 A1 | 6/2003 | Tsen |
| 2003/0159238 A1 | 8/2003 | Oh |
| 2003/0159411 A1 | 8/2003 | Hansen et al. |
| 2003/0200736 A1 | 10/2003 | Ni |
| 2004/0010885 A1 | 1/2004 | Hitzelberger et al. |
| 2004/0025285 A1 | 2/2004 | McCormick et al. |
| 2004/0216264 A1 | 11/2004 | Shaver et al. |
| 2005/0081321 A1 | 4/2005 | Milligan et al. |
| 2005/0115409 A1 | 6/2005 | Conrad |
| 2005/0132528 A1 | 6/2005 | Yau |
| 2005/0198769 A1 | 9/2005 | Lee et al. |
| 2005/0198770 A1 | 9/2005 | Jung et al. |
| 2005/0252179 A1 | 11/2005 | Oh et al. |
| 2005/0252180 A1 | 11/2005 | Oh et al. |
| 2006/0037172 A1 | 2/2006 | Choi |
| 2006/0042206 A1 | 3/2006 | Arnold et al. |
| 2006/0090290 A1 | 5/2006 | Lau |
| 2006/0123590 A1 | 6/2006 | Fester et al. |
| 2006/0137304 A1 | 6/2006 | Jeong et al. |
| 2006/0137306 A1 | 6/2006 | Jeong et al. |
| 2006/0137309 A1 | 6/2006 | Jeong et al. |
| 2006/0137314 A1 | 6/2006 | Conrad et al. |
| 2006/0156508 A1 | 7/2006 | Khalil |
| 2006/0162298 A1 | 7/2006 | Oh et al. |
| 2006/0162299 A1 | 7/2006 | North |
| 2006/0168922 A1 | 8/2006 | Oh |
| 2006/0168923 A1 | 8/2006 | Lee et al. |
| 2006/0207055 A1 | 9/2006 | Ivarsson et al. |
| 2006/0207231 A1 | 9/2006 | Arnold |
| 2006/0230715 A1 | 10/2006 | Oh et al. |
| 2006/0230723 A1 | 10/2006 | Kim et al. |
| 2006/0230724 A1 | 10/2006 | Han et al. |
| 2006/0236663 A1 | 10/2006 | Oh |
| 2006/0254226 A1 | 11/2006 | Jeon |
| 2006/0278081 A1 | 12/2006 | Han et al. |
| 2006/0288516 A1 | 12/2006 | Sawalski |
| 2007/0067944 A1 | 3/2007 | Kitamura |
| 2007/0077810 A1 | 4/2007 | Gogel |
| 2007/0079473 A1 | 4/2007 | Min |
| 2007/0079585 A1 | 4/2007 | Oh et al. |
| 2007/0095028 A1 | 5/2007 | Kim |
| 2007/0095029 A1 | 5/2007 | Min |
| 2007/0209334 A1 | 9/2007 | Conrad |
| 2007/0209335 A1 | 9/2007 | Conrad |
| 2007/0271724 A1 | 11/2007 | Hakan et al. |
| 2007/0289089 A1 | 12/2007 | Yacobi |
| 2007/0289266 A1 | 12/2007 | Oh |
| 2008/0040883 A1 | 2/2008 | Beskow et al. |
| 2008/0047091 A1 | 2/2008 | Nguyen |
| 2008/0134460 A1 | 6/2008 | Conrad |
| 2008/0134462 A1 | 6/2008 | Jansen et al. |
| 2008/0178416 A1 | 7/2008 | Conrad |
| 2008/0178420 A1 | 7/2008 | Conrad |
| 2008/0190080 A1 | 8/2008 | Oh et al. |
| 2008/0196194 A1 | 8/2008 | Conrad |
| 2008/0301903 A1 | 12/2008 | Cunningham et al. |
| 2009/0100633 A1 | 4/2009 | Bates et al. |
| 2009/0113659 A1 | 5/2009 | Jeon |
| 2009/0144932 A1 | 6/2009 | Yoo |
| 2009/0165431 A1 | 7/2009 | Oh |
| 2009/0205160 A1 | 8/2009 | Conrad |
| 2009/0205161 A1 | 8/2009 | Conrad |
| 2009/0205298 A1 | 8/2009 | Hyun et al. |
| 2009/0209666 A1 | 8/2009 | Hellberg et al. |
| 2009/0265877 A1 | 10/2009 | Dyson et al. |
| 2009/0282639 A1 | 11/2009 | Dyson et al. |
| 2009/0300874 A1 | 12/2009 | Tran et al. |
| 2009/0300875 A1 | 12/2009 | Inge et al. |
| 2009/0307564 A1 | 12/2009 | Vedantham et al. |
| 2009/0307863 A1 | 12/2009 | Milne et al. |
| 2009/0307864 A1 | 12/2009 | Dyson |
| 2009/0308254 A1 | 12/2009 | Oakham |
| 2009/0313958 A1 | 12/2009 | Gomiciaga-Pereda et al. |
| 2009/0313959 A1 | 12/2009 | Gomiciaga-Pereda et al. |
| 2010/0083459 A1 | 4/2010 | Beskow et al. |
| 2010/0132319 A1 | 6/2010 | Ashbee |
| 2010/0154150 A1 | 6/2010 | McLeod |
| 2010/0175217 A1 | 7/2010 | Conrad |
| 2010/0212104 A1 | 8/2010 | Conrad |
| 2010/0224073 A1 | 9/2010 | Oh et al. |
| 2010/0229321 A1 | 9/2010 | Dyson et al. |
| 2010/0229328 A1 | 9/2010 | Conrad |
| 2010/0242210 A1 | 9/2010 | Conrad |
| 2010/0243158 A1 | 9/2010 | Conrad |
| 2010/0293745 A1 | 11/2010 | Coburn |
| 2010/0299865 A1 | 12/2010 | Conrad |
| 2010/0299866 A1 | 12/2010 | Conrad |
| 2011/0023261 A1 | 2/2011 | Proffitt, II |
| 2011/0146024 A1 | 6/2011 | Conrad |
| 2011/0168332 A1 | 7/2011 | Bowe et al. |
| 2012/0060322 A1 | 3/2012 | Simonelli et al. |
| 2012/0216361 A1 | 8/2012 | Millington et al. |
| 2012/0222245 A1 | 9/2012 | Conrad |
| 2012/0222260 A1 | 9/2012 | Conrad et al. |
| 2012/0222262 A1 | 9/2012 | Conrad |
| 2013/0091815 A1 | 4/2013 | Smith |
| 2013/0185892 A1 | 7/2013 | Walker |
| 2014/0137362 A1 | 5/2014 | Smith |
| 2014/0137363 A1 | 5/2014 | Wilson |
| 2014/0137364 A1 | 5/2014 | Stickney et al. |
| 2014/0182080 A1 | 7/2014 | Lee et al. |

(56) References Cited

U.S. PATENT DOCUMENTS

| | | |
|---|---|---|
| 2014/0208538 A1 | 7/2014 | Visel et al. |
| 2016/0015227 A1 | 1/2016 | Conrad et al. |
| 2016/0174789 A1 | 6/2016 | Han et al. |
| 2020/0138254 A1* | 5/2020 | Lee .................... A47L 5/225 |

FOREIGN PATENT DOCUMENTS

| | | |
|---|---|---|
| CA | 1218962 A | 3/1987 |
| CA | 2484587 A1 | 4/2005 |
| CA | 2593950 A1 | 6/2008 |
| CA | 2438079 C | 8/2009 |
| CA | 2659212 A1 | 9/2010 |
| CN | 1493244 A | 5/2004 |
| CN | 1887437 A | 1/2007 |
| CN | 202932850 U | 5/2013 |
| CN | 211609590 U | 10/2020 |
| DE | 875134 C | 4/1953 |
| DE | 9216071.9 U1 | 2/1993 |
| DE | 4232382 C1 | 3/1994 |
| EP | 0489498 A1 | 6/1992 |
| EP | 493950 B1 | 7/1992 |
| EP | 1200196 B1 | 6/2005 |
| EP | 1779761 A2 | 5/2007 |
| EP | 1594386 B1 | 4/2009 |
| EP | 1676516 B1 | 1/2010 |
| EP | 2308360 A2 | 4/2011 |
| EP | 1629758 A3 | 10/2013 |
| EP | 2389849 B1 | 9/2016 |
| FR | 2812531 B1 | 11/2004 |
| GB | 700791 A | 12/1953 |
| GB | 1111074 A | 4/1968 |
| GB | 2163703 B | 1/1988 |
| GB | 2268875 A | 1/1994 |
| GB | 2282979 B | 10/1997 |
| GB | 2365324 B | 7/2002 |
| GB | 2441962 B | 3/2011 |
| GB | 2466290 B | 10/2012 |
| GB | 2508035 A | 5/2014 |
| JP | 61131720 A | 6/1986 |
| JP | 2000140533 A | 5/2000 |
| JP | 2010178773 A | 8/2010 |
| JP | 2010220632 A | 10/2010 |
| JP | 2011189132 A | 9/2011 |
| JP | 2011189133 A | 9/2011 |
| JP | 2019069298 A | 5/2019 |
| JP | 2020110472 A | 7/2020 |
| WO | 1980002561 A1 | 11/1980 |
| WO | 9627446 A1 | 9/1996 |
| WO | 9809121 A1 | 3/1998 |
| WO | 9843721 A1 | 10/1998 |
| WO | 01/07168 A1 | 2/2001 |
| WO | 200217766 A2 | 3/2002 |
| WO | 2004069021 A1 | 8/2004 |
| WO | 2006026414 A3 | 8/2007 |
| WO | 2008009883 A1 | 1/2008 |
| WO | 2008009888 A1 | 1/2008 |
| WO | 2008009890 A1 | 1/2008 |
| WO | 2008009891 A1 | 1/2008 |
| WO | 2008088278 A2 | 7/2008 |
| WO | 2009026709 A1 | 3/2009 |
| WO | 2010102396 A1 | 9/2010 |
| WO | 2010142968 A1 | 12/2010 |
| WO | 2010142969 A1 | 12/2010 |
| WO | 2010142970 A1 | 12/2010 |
| WO | 2010142971 A1 | 12/2010 |
| WO | 2011054106 A1 | 5/2011 |
| WO | 2012042240 A1 | 4/2012 |
| WO | 2012117231 A1 | 9/2012 |
| WO | 2014195711 | 12/2014 |
| WO | 2019/031719 A1 | 2/2019 |
| WO | 2020/015250 A1 | 1/2020 |

OTHER PUBLICATIONS

Euro-Pro Shark Cordless Hand Vac Owner's Manual, published in 2002.

Centerline. (n.d.). 1 page; Retrieved Apr. 19, 2016, from http://www.merriam-webster.com/dictionary/centerline.

Centerline. Oxford Dictionaries. Oxford University Press, n.d. Web. 1 Page; Retrieved Apr. 19, 2016. <https://www.oxforddictionaries.com/us/definition/english/centre-line.

Weisstein, Eric W. "Projection." from MathWorld—A Wolfram Web Resource. Web. 2 pages; Retrieved Apr. 20, 2016 <http://mathworld.wolfram.com/Projection.html>.

"Projection". Encyclopedia Britannica. Encyclopedia Britannica Online. Encyclopedia Britannica Inc., 2016. Web. 1 page, Retrieved Apr. 20, 2016 <http://britannica.com/topic/projection-geometry>.

English machine translation of CN202932850, published on May 15, 2013.

Makita Cordless Cleaner, Handy Vac II, Model 4071, Instruction Manual, dated at least as early and Oct. 1993.

User Manual SS80N80/SS75N80; Samsung; Mar. 8, 2018 (Mar. 8, 2018) *p. 20,Fig. 1; p. 21; Fig. 6 *.

Samsung PowerStick PRO; https://www.youtube.com/watch?v=JzMIXi90n0M&t=160s; Sep. 15, 2018 (Sep. 15, 2018) * see minute 2:40 pf video *.

International Search Report and Written Opinion, received in connection to co-pending international patent application No. PCT/CA2021/050352, dated Jun. 17, 2021.

English machine translation of JP2020110472, published on Jul. 27, 2020.

English machine translation of JP2019069298, published on May 9, 2019.

English machine translation of CN211609590; published on Oct. 2, 2020.

English machine translation of WO2019/031719, published on Feb. 14, 2019.

English machine translation of JP2011189133, published on Sep. 29, 2011.

English machine translation of JP2010220632, published on Oct. 7, 2010.

English machine translation of JP2010178773, published on Aug. 19, 2010.

English machine translation of JP61131720, published on Jun. 19, 1986.

English machine translation of DE4232382, published on Mar. 24, 1994.

English machine translation of FR2812531, published on Nov. 5, 2004.

English machine translation of DE875134, published on Apr. 30, 1953.

English machine translation of DE9216071.9, published on Feb. 25, 1993.

English machine translation of CN1493244, published on May 5, 2004.

English machine translation of CN1887437, publishe on Jan. 3, 2007.

English machine translation of JP2011189132, published on Sep. 29, 2011.

* cited by examiner

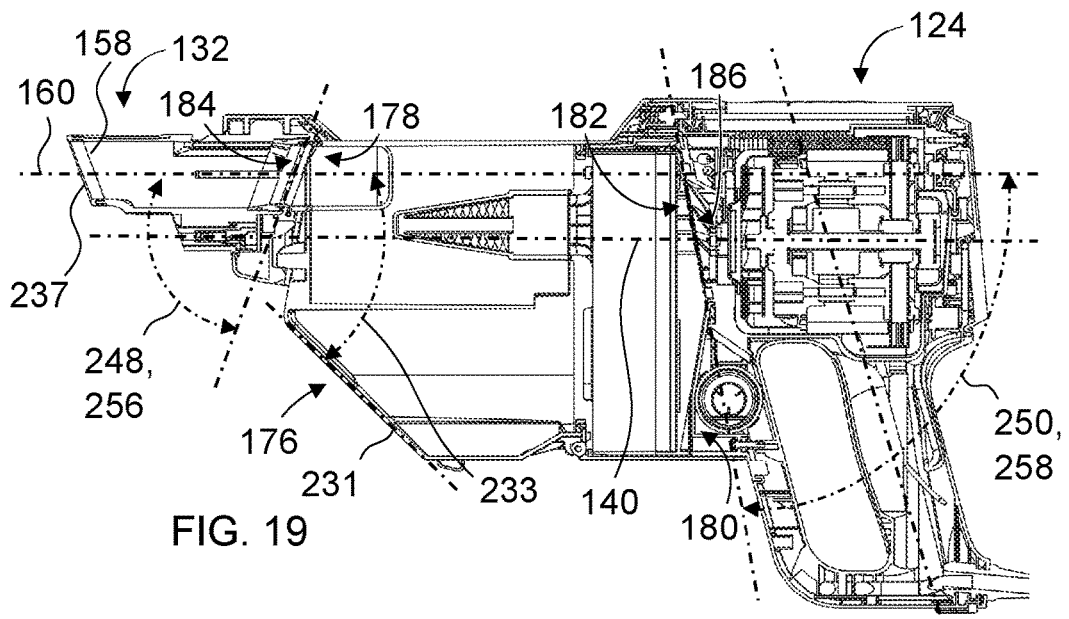
FIG. 19
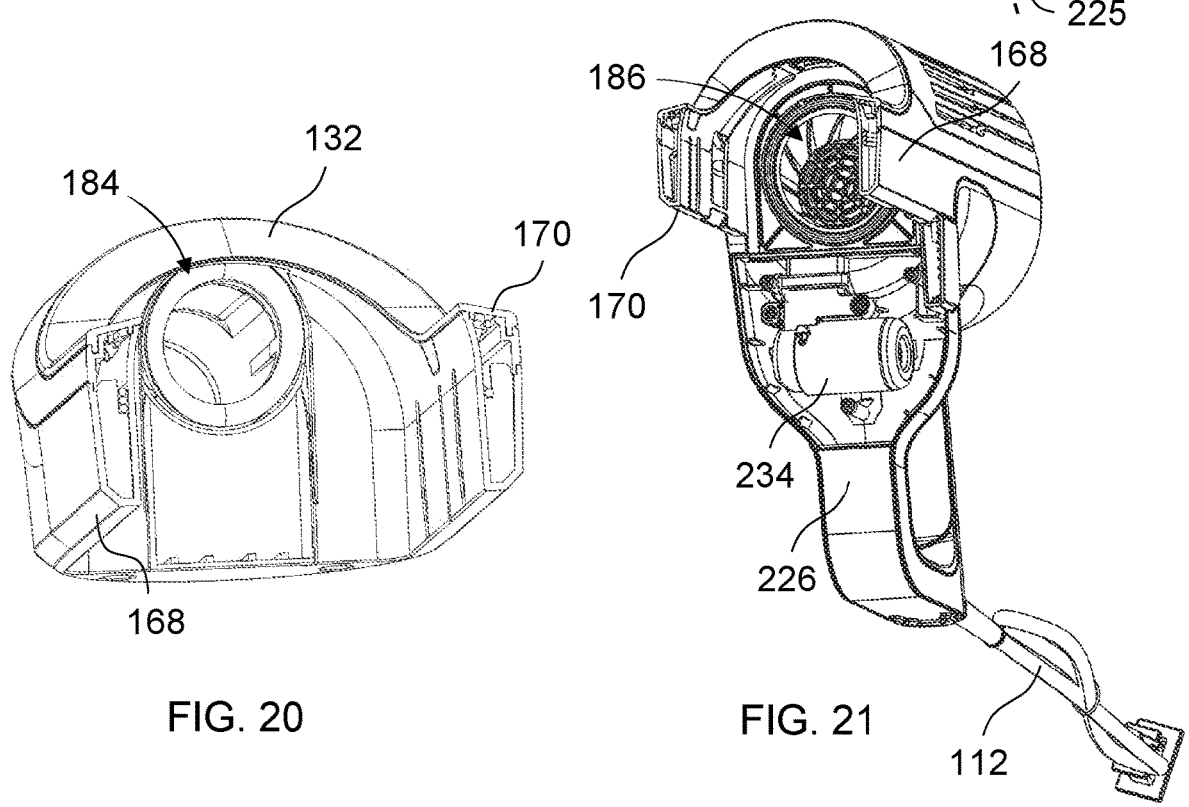
FIG. 20
FIG. 21

SURFACE CLEANING APPARATUS WITH REMOVABLE AIR TREATMENT MEMBER ASSEMBLY

FIELD

This disclosure relates generally to surface cleaning apparatus, and in particular to a surface cleaning apparatus having a removable air treatment member assembly.

INTRODUCTION

The following is not an admission that anything discussed below is part of the prior art or part of the common general knowledge of a person skilled in the art.

Various types of surface cleaning apparatus are known, including upright surface cleaning apparatus, canister surface cleaning apparatus, stick surface cleaning apparatus, central vacuum systems, and hand carriable surface cleaning apparatus such as hand vacuums. Further, various designs for cyclonic hand vacuum cleaners are known in the art.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

The directness and length of an air flow passage are important features of any surface cleaning apparatus, since an increase in the length of an air flow path through a surface cleaning apparatus and changes in air flow direction through an air flow path may result in an increase in back pressure and a reduction in air flow velocity at the dirty air inlet, which may result in a reduction in cleaning efficiency. These features are especially important for hand vacuum cleaners and other surface cleaning apparatus that are meant to be carried during a cleaning operation, and often do not incorporate a high power suction motor.

To shorten and/or straighten an air flow path or passage, a nozzle portion, an air treatment member assembly and a suction motor of a surface cleaning apparatus may be aligned. The nozzle portion may be upstream of the air treatment member assembly, and the air treatment member assembly may be upstream of the suction motor.

In many surface cleaning apparatus, an air treatment member assembly is removable so such as to allow a user to clean an air treatment member, replace a filter, or empty a dust collection chamber. It may be desirable to allow the air treatment member assembly by itself so that the air treatment member assembly may be manipulated without the added weight of any part of the body portion. For example, the a nozzle portion may be positioned forward of the air treatment member assembly. The suction motor may be housed in a main body joined to a nozzle portion by a pair of spaced apart arms. The removable air treatment member assembly may be removable received between the spaced apart arms, the main body, and the nozzle portion.

A removable air treatment member assembly received between a main body. When the air treatment member assembly is in an operating position, the air treatment member assembly air inlet may be in air flow communication with a nozzle portion air outlet and the air treatment member assembly air outlet may be air flow communication with a main body air inlet.

In accordance with one aspect of this disclosure, which may be used alone or in combination with any other aspect, a removable air treatment member assembly is removable upwardly and at least a portion of a lower surface of the air treatment member assembly rests on another portion of the surface cleaning apparatus such as the main body or the handle assembly when the air treatment member assembly is in the operating position. For example, a rearward portion of the air treatment member assembly may rest on a portion of the handle assembly.

Seating the air treatment member assembly on the main body or the handle assembly may simplify inserting and/or securing the air treatment member assembly in the operating position. It may also increase the stability of the air treatment member assembly, and reduce movement between the air treatment member assembly and other parts of the surface cleaning apparatus During use of the surface cleaning apparatus. Reduced movement may increase the performance of the surface cleaning apparatus, such as by reducing wear on interfacing materials or by preventing misalignment.

In accordance with this broad aspect, there is provided a hand vacuum cleaner comprising:
 (a) an air flow passage extending from a dirty air inlet at a front end of the hand vacuum cleaner to a clean air outlet;
 (b) a nozzle portion comprising the dirty air inlet provided at the front end of the hand vacuum cleaner;
 (c) a main body positioned rearward of the nozzle portion and housing a suction motor, the suction motor provided in the air flow passage;
 (d) first and second laterally spaced apart opposed arm members extending between the nozzle portion and the main body wherein a volume is positioned between the nozzle portion, the main body and the opposed arm members;
 (e) an air treatment member assembly comprising an air treatment member, the air treatment member assembly is removably positionable in the volume wherein, when the air treatment member assembly is mounted to the hand vacuum cleaner in an operating position, the air treatment member assembly is positioned in the volume and the air treatment member is positioned in the air flow passage; and,
 (f) a handle assembly provided on a lower portion of the main body wherein the handle assembly has a base portion and the air treatment member assembly seats on the base portion when the air treatment member assembly is in the operating position, wherein the air treatment member assembly is removable upwardly.

In any embodiment, the handle assembly may comprise a hand grip and a finger guard positioned forward of the hand grip and the finger guard may be positioned below the base portion.

In any embodiment, the finger guard may extend away from the base portion.

In any embodiment, a rear end of the air treatment member assembly may have an air treatment member air outlet, a front end of the main body may have a main body air inlet and the dirty air inlet may have an inlet axis wherein, when the air treatment member assembly is in the operating position, the air treatment member air outlet is in air flow communication with the main body air inlet and each of the air treatment member air outlet and the main body air inlet extend upwardly and rearwardly at an angle to the inlet axis.

In any embodiment, the air treatment member air outlet may have an outlet port that is located in a plane and, when the air treatment member assembly is in the operating position, an included angle from the inlet axis downwardly and rearwardly to the plane is between 60° and 80° and the main body air inlet extends at a mating angle.

In any embodiment, a front end of the air treatment member assembly may have an air treatment member air inlet, a rear end of the nozzle portion may have a nozzle portion air outlet and the dirty air inlet may have an inlet axis wherein, when the air treatment member assembly is in the operating position, the air treatment member air inlet is in air flow communication with the nozzle portion air outlet and each of the air treatment member air inlet and the nozzle portion air outlet extend upwardly and forwardly at an angle to the inlet axis.

In any embodiment, the air treatment member air inlet may have an inlet port that is located in a plane and, when the air treatment member assembly is in the operating position, an included angle downwardly and forwardly from the inlet axis to the plane is between 60° and 80° and the nozzle portion air outlet extends at a mating angle.

In any embodiment, a front end of the air treatment member assembly may have an air treatment member air inlet and a rear end of the nozzle portion may have a nozzle portion air outlet wherein, when the air treatment member assembly is in the operating position, the air treatment member air inlet is in air flow communication with the nozzle portion air outlet and each of the air treatment member air inlet and the nozzle portion air outlet extend upwardly and forwardly at an angle to the inlet axis.

In any embodiment, the air treatment member air outlet may have an outlet port that is located in a plane and, when the air treatment member assembly is in the operating position, an included angle from the inlet axis downwardly and rearwardly to the plane is between 60° and 80° and the main body air inlet extends at a mating angle.

In accordance with this broad aspect, there is also provided a hand vacuum cleaner comprising:
(a) an air flow passage extending from a dirty air inlet at a front end of the hand vacuum cleaner to a clean air outlet;
(b) a nozzle portion comprising the dirty air inlet provided at the front end of the hand vacuum cleaner;
(c) a main body positioned rearward of the nozzle portion and housing a suction motor, the suction motor provided in the air flow passage, a lower portion of the main body comprising a base portion;
(d) first and second laterally spaced apart opposed arm members extending between the nozzle portion and the main body wherein a volume is positioned between the nozzle portion, the main body and the opposed arm members; and,
(e) an air treatment member assembly comprising an air treatment member, the air treatment member assembly is removably positionable in the volume wherein, when the air treatment member assembly is mounted to the hand vacuum cleaner in an operating position, the air treatment member assembly is positioned in the volume and the air treatment member is positioned in the air flow passage;
wherein the air treatment member assembly seats on the base portion when the air treatment member assembly is in the operating position, and wherein the air treatment member assembly is removable upwardly.

In any embodiment, a handle assembly comprising a pistol grip handle may be positioned on a lower portion of the main body.

In any embodiment, a rear end of the air treatment member assembly may have an air treatment member air outlet, a front end of the main body may have a main body air inlet and the dirty air inlet may have an inlet axis wherein, when the air treatment member assembly is in the operating position, the air treatment member air outlet is in air flow communication with the main body air inlet and each of the air treatment member air outlet and the main body air inlet extend upwardly and rearwardly at an angle to the inlet axis.

In any embodiment, the air treatment member air outlet may have an outlet port that is located in a plane and, when the air treatment member assembly is in the operating position, an included angle from the inlet axis downwardly and rearwardly to the plane is between 60° and 80° and the main body air inlet extends at a mating angle.

In any embodiment, a front end of the air treatment member assembly may have an air treatment member air inlet, a rear end of the nozzle portion may have a nozzle portion air outlet and the dirty air inlet may have an inlet axis wherein, when the air treatment member assembly is in the operating position, the air treatment member air inlet is in air flow communication with the nozzle portion air outlet and each of the air treatment member air inlet and the nozzle portion air outlet extend upwardly and forwardly at an angle to the inlet axis.

In any embodiment, the air treatment member air inlet may have an inlet port that is located in a plane and, when the air treatment member assembly is in the operating position, an included angle downwardly and forwardly from the inlet axis to the plane is between 60° and 80° and the nozzle portion air outlet extends at a mating angle.

In any embodiment, a front end of the air treatment member assembly may have an air treatment member air inlet and a rear end of the nozzle portion may have a nozzle portion air outlet wherein, when the air treatment member assembly is in the operating position, the air treatment member air inlet is in air flow communication with the nozzle portion air outlet and each of the air treatment member air inlet and the nozzle portion air outlet extend upwardly and forwardly at an angle to the inlet axis.

In accordance with this broad aspect, there is also provided a hand vacuum cleaner comprising:
(a) an air flow passage extending from a dirty air inlet at a front end of the hand vacuum cleaner to a clean air outlet, the dirty air inlet having an inlet axis;
(b) a nozzle portion comprising the dirty air inlet provided at the front end of the hand vacuum cleaner;
(c) a main body positioned rearward of the nozzle portion, the main body having a front end having a main body air inlet, the main body housing a suction motor, the suction motor provided in the air flow passage, a lower portion of the main body comprising a base portion;
(d) first and second laterally spaced apart opposed arm members extending between the nozzle portion and the main body wherein a volume is positioned between the nozzle portion, the main body and the opposed arm members; and,
(e) an air treatment member assembly comprising an air treatment member, the air treatment member assembly having a rear end having an air treatment member air outlet, the air treatment member assembly is removably positionable in the volume wherein, when the air treatment member assembly is mounted to the hand vacuum cleaner in an operating position, the air treatment member assembly is positioned in the volume and the air treatment member is positioned in the air flow passage;

wherein, when the air treatment member assembly is in the operating position, the air treatment member air outlet is in air flow communication with the main body air inlet and each of the air treatment member air outlet and the main body air inlet extend upwardly and rearwardly at an angle to the inlet axis, and wherein the air treatment member assembly is removable upwardly.

In any embodiment, the air treatment member air outlet may have an outlet port that is located in a plane and, when the air treatment member assembly is in the operating position, an included angle from the inlet axis downwardly and rearwardly to the plane is between 60° and 80° and the main body air inlet extends at a mating angle.

In any embodiment, a front end of the air treatment member assembly may have an air treatment member air inlet, a rear end of the nozzle portion may have a nozzle portion air outlet and the dirty air inlet may have an inlet axis wherein, when the air treatment member assembly is in the operating position, the air treatment member air inlet may be in air flow communication with the nozzle portion air outlet and each of the air treatment member air inlet and the nozzle portion air outlet may extend upwardly and forwardly at an angle to the inlet axis.

In any embodiment, the air treatment member air inlet may have an inlet port that is located in a plane and, when the air treatment member assembly is in the operating position, an included angle downwardly and forwardly from the inlet axis to the plane is between 60° and 80° and the nozzle portion air outlet extends at a mating angle.

In accordance with another aspect of this disclosure, which may be used alone or in combination with any other aspect, the surface cleaning apparatus includes a pistol grip handle assembly on a lower portion of the main body and rearward of a volume between the pair of arms, the nozzle portion, and the main body, and the air treatment member assembly is removable downwardly.

A pistol grip handle permits for a more ergonomic grip during operation of the surface cleaner apparatus than alternative handles, allowing for easier operation and/or greater efficiency. A surface cleaning apparatus with an aligned nozzle portion, air treatment member assembly, and main body may be more maneuverable with a pistol grip handle rearward of the air treatment member assembly in an operating position. This position may position the pistol grip handle proximate (e.g., underneath) the suction motor when the suction motor is in a main body aligned with a nozzle portion and the air treatment member assembly, which may be advantageous as the suction motor is often the heaviest component of a surface cleaning apparatus.

In accordance with this broad aspect, there is provided a hand vacuum cleaner comprising:

(a) an air flow passage extending from a dirty air inlet at a front end of the hand vacuum cleaner to a clean air outlet;

(b) a nozzle portion comprising the dirty air inlet provided at the front end of the hand vacuum cleaner;

(c) a main body positioned rearward of the nozzle portion and housing a suction motor, the suction motor provided in the air flow passage;

(d) first and second laterally spaced apart opposed arm members extending between the nozzle portion and the main body wherein a volume is positioned between the nozzle portion, the main body and the opposed arm members;

(e) an air treatment member assembly comprising an air treatment member, the air treatment member assembly is removably positionable in the volume wherein, when the air treatment member assembly is mounted to the hand vacuum cleaner in an operating position, the air treatment member assembly is positioned in the volume and the air treatment member is positioned in the air flow passage; and, (f) a pistol grip handle assembly provided on a lower portion of the main body wherein the handle assembly is positioned rearward of the volume, wherein the air treatment member assembly is removable downwardly.

In any embodiment, the handle assembly may comprise a pistol grip hand grip and a finger guard positioned forward of the pistol grip hand grip and the finger guard is positioned rearward of the volume.

In any embodiment, the pistol grip hand grip may extend away from the lower portion of the main body.

In any embodiment, a rear end of the air treatment member assembly may have an air treatment member air outlet, a front end of the main body may have a main body air inlet and the dirty air inlet may have an inlet axis wherein, when the air treatment member assembly is in the operating position, the air treatment member air outlet is in air flow communication with the main body air inlet and each of the air treatment member air outlet and the main body air inlet extend downwardly and rearwardly at an angle to the inlet axis.

In any embodiment, the air treatment member air outlet may have an outlet port that is located in a plane and, when the air treatment member assembly is in the operating position, an included angle from the inlet axis downwardly and rearwardly to the plane is between 60° and 80° and the main body air inlet extends at a mating angle.

In any embodiment, a front end of the air treatment member assembly may have an air treatment member air inlet, a rear end of the nozzle portion may have a nozzle portion air outlet and the dirty air inlet may have an inlet axis wherein, when the air treatment member assembly is in the operating position, the air treatment member air inlet is in air flow communication with the nozzle portion air outlet and each of the air treatment member air inlet and the nozzle portion air outlet extend downwardly and forwardly at an angle to the inlet axis.

In any embodiment, the air treatment member air inlet may have an inlet port that is located in a plane and, when the air treatment member assembly is in the operating position, an included angle downwardly and forwardly from the inlet axis to the plane is between 60° and 80° and the nozzle portion air outlet extends at a mating angle.

In any embodiment, a front end of the air treatment member assembly may have an air treatment member air inlet and a rear end of the nozzle portion may have a nozzle portion air outlet wherein, when the air treatment member assembly is in the operating position, the air treatment member air inlet is in air flow communication with the nozzle portion air outlet and each of the air treatment member air inlet and the nozzle portion air outlet extend downwardly and forwardly at an angle to the inlet axis.

In any embodiment, the air treatment member air outlet may have an outlet port that is located in a plane and, when the air treatment member assembly is in the operating position, an included angle from the inlet axis downwardly and rearwardly to the plane is between 60° and 80° and the main body air inlet extends at a mating angle.

In any embodiment, the air treatment member assembly may be rotatably insertable into hand vacuum cleaner.

In any embodiment, the volume may have a forward portion and a rearward portion, the air treatment member assembly may have a front end that is positionable in the forward portion of the volume and a rear end of the air treatment member assembly is rotatable towards the operating position when the forward portion of the air treatment member assembly is positioned in the forward end of the volume.

In any embodiment, an air treatment member assembly air inlet may be proximate a nozzle portion air outlet of the nozzle portion when the forward end of the air treatment member assembly is positioned in the forward portion of the volume.

In any embodiment, the front end of the air treatment member assembly may have an air treatment member air inlet, a rear end of the nozzle portion may have the nozzle portion air outlet and the dirty air inlet may have an inlet axis wherein, when the air treatment member assembly is in the operating position, the air treatment member air inlet is in air flow communication with the nozzle portion air outlet and each of the air treatment member air inlet and the nozzle portion air outlet extend downwardly and forwardly at an angle to the inlet axis.

In any embodiment, the air treatment member air inlet may have an inlet port that is located in a plane and, when the air treatment member assembly is in the operating position, an included angle downwardly and forwardly from the inlet axis to the plane is between 60° and 80° and the nozzle portion air outlet extends at a mating angle.

In any embodiment, a rear end of the air treatment member assembly may have an air treatment member air outlet and a front end of the main body has a main body air inlet wherein, when the air treatment member assembly is in the operating position, the air treatment member air outlet is in air flow communication with the main body air inlet and each of the air treatment member air outlet and the main body air inlet extend downwardly and rearwardly at an angle to the inlet axis.

In any embodiment, the air treatment member air outlet may have an outlet port that is located in a plane and, when the air treatment member assembly is in the operating position, an included angle from the inlet axis downwardly and rearwardly to the plane is between 60° and 80° and the main body air inlet extends at a mating angle.

In any embodiment, the air treatment member air inlet may have an inlet port that is located in a plane and, when the air treatment member assembly is in the operating position, an included angle downwardly and forwardly from the inlet axis to the plane is between 60° and 80° and the nozzle portion air outlet extends at a mating angle.

In any embodiment, a rear end of the air treatment member assembly may have an air treatment member air outlet, a front end of the main body may have a main body air inlet and the dirty air inlet may have an inlet axis wherein, when the air treatment member assembly is in the operating position, the air treatment member air outlet is in air flow communication with the main body air inlet and each of the air treatment member air outlet and the main body air inlet extend downwardly and rearwardly at an angle to the inlet axis.

In any embodiment, the air treatment member air outlet may have an outlet port that is located in a plane and, when the air treatment member assembly is in the operating position, an included angle from the inlet axis downwardly and rearwardly to the plane is between 60° and 80° and the main body air inlet extends at a mating angle.

In accordance with another aspect of this disclosure, which may be used alone or in combination with any other aspect, at least one of the nozzle portion air outlet, the air treatment member assembly air inlet, the air treatment member assembly air outlet and the main body air inlet is retractable.

An air inlet and/or air outlet may be retractable to reduce friction between adjacent materials (e.g., a sealing member) during insertion and/or removal of the air treatment member assembly. For example, an inlet or an outlet may be axially retracted before the air treatment member assembly is removed so that adjacent materials do not slide against one another. Sliding of materials against one another may be particularly damaging when the materials are air flow sealing materials, such as a gasket. Reducing wear on materials may assist in preventing air flow leaks from an air flow passage.

In accordance with this broad aspect, there is provided a hand vacuum cleaner comprising:
  (a) an air flow passage extending from a dirty air inlet at a front end of the hand vacuum cleaner to a clean air outlet;
  (b) a nozzle portion comprising the dirty air inlet provided at the front end of the hand vacuum cleaner, the nozzle portion having an air outlet;
  (c) a main body positioned rearward of the nozzle portion and housing a suction motor, the suction motor provided in the air flow passage, the main body having a front end having an air inlet;
  (d) first and second laterally spaced apart opposed arm members extending between the nozzle portion and the main body wherein a volume is positioned between the nozzle portion, the main body and the opposed arm members;
  (e) an air treatment member assembly comprising an air treatment member, the air treatment member assembly has a front end having an air inlet and a rear end having an air outlet, the air treatment member assembly is removably positionable in the volume wherein, when the air treatment member assembly is mounted to the hand vacuum cleaner in an operating position, the air treatment member assembly is positioned in the volume and the air treatment member is positioned in the air flow passage; and, wherein at least one of the nozzle portion air outlet, the air treatment member assembly air inlet, the air treatment member assembly air outlet and the main body air inlet is retractable.

In any embodiment, at least one of the nozzle portion air outlet and the air treatment member assembly air inlet may be retractable and at least one of the air treatment member assembly air outlet and the main body air inlet may be retractable.

In any embodiment, at least one of the nozzle portion air outlet and the air treatment member assembly air inlet may be retractable.

In any embodiment, at least one of the air treatment member assembly air outlet and the main body air inlet may be retractable.

In any embodiment, a front end of the main body may have a main body air inlet, the dirty air inlet may have an inlet axis and a plane may extend at an angle of 5° to 85° to a dirty air axis wherein, when the air treatment member assembly is in the operating position, the air treatment member air outlet is in air flow communication with the main body air inlet and each of the air treatment member air outlet and the main body air inlet extend generally parallel to the plane.

In any embodiment, when the air treatment member assembly is in the operating position, the air treatment member air outlet may be in air flow communication with the main body air inlet and each of the air treatment member air outlet and the main body air inlet may extend downwardly and rearwardly at an angle to the inlet axis.

In any embodiment, the air treatment member air outlet may have an outlet port that is located in a plane and, when the air treatment member assembly is in the operating position, an included angle from the inlet axis downwardly and rearwardly to the plane is between 60° and 80° and the main body air inlet extends at a mating angle.

In any embodiment, a rear end of the nozzle portion may have a nozzle portion air outlet, the dirty air inlet may have an inlet axis and a plane may extend at an angle of 5° to 85° to a dirty air axis wherein, when the air treatment member assembly is in the operating position, the air treatment member air inlet is in air flow communication with the nozzle portion air outlet and each of the air treatment member air inlet and the nozzle portion air outlet extend generally parallel to the plane.

In any embodiment, when the air treatment member assembly is in the operating position, the air treatment member air inlet may be in air flow communication with the nozzle portion air outlet and each of the air treatment member air inlet and the nozzle portion air outlet may extend downwardly and forwardly at an angle to the inlet axis.

In any embodiment, the air treatment member air inlet may have an inlet port that is located in a plane and, when the air treatment member assembly is in the operating position, an included angle downwardly and forwardly from the inlet axis to the plane is between 60° and 80° and the nozzle portion air outlet extends at a mating angle.

In any embodiment, the hand vacuum cleaner may have a front end and a rear end, a longitudinal axis may extend between the front and rear ends and the at least one of the nozzle portion air outlet, the air treatment member assembly air inlet, the air treatment member assembly air outlet and the main body air inlet that is retractable may be axially translatable.

In any embodiment, the rear end of the air treatment member assembly may have a recess for receiving therein a portion of the main body when the air treatment member assembly is mounted to the hand vacuum cleaner in the operating position.

In any embodiment, the air treatment member assembly may be removable upwardly or downwardly.

In any embodiment, the air treatment member may comprise a cyclone.

In any embodiment, the air treatment member assembly may have a front openable door.

In any embodiment, the air treatment member assembly may comprise a pre-motor filter positioned rearward of the air treatment member.

In any embodiment, the pre-motor filter may be provided at a rear end of the air treatment member.

In accordance with another aspect of this disclosure, which may be used alone or in combination with any other aspect, one or more of a nozzle portion air outlet, air treatment member air inlet, air treatment member air outlet, and main body air inlet is angled relative to an inlet axis, and the air treatment member assembly is removable downwardly.

Inlets and outlets may be angled relative an inlet axis to reduce friction between adjacent materials during removal of the air treatment member assembly. For example, when an air treatment member assembly is removed downward relative the inlet axis, an angled inlet of the air treatment member assembly may move away from an angled outlet of the nozzle portion with less sliding against the outlet of the nozzle portion. Angled inlets or outlets may reduce the wear of these materials (e.g., gaskets or other sealing members) and reduce the risk of air flow leaks forming in the air flow passage.

In accordance with this broad aspect, there is also provided a hand vacuum cleaner comprising:
 (a) an air flow passage extending from a dirty air inlet at a front end of the hand vacuum cleaner to a clean air outlet;
 (b) a nozzle portion provided at the front end of the hand vacuum cleaner, the nozzle portion comprising an inlet axis, the dirty air inlet and a nozzle portion air outlet;
 (c) a main body positioned rearward of the nozzle portion and housing a suction motor, the suction motor provided in the air flow passage, the main body comprising a main body air inlet at to front end of the main body;
 (d) first and second laterally spaced apart opposed arm members extending between the nozzle portion and the main body wherein a volume is positioned between the nozzle portion, the main body and the opposed arm members; and,
 (e) an air treatment member assembly comprising a front end comprising an air treatment member air inlet, a rear end comprising an air treatment member air outlet and an air treatment member, the air treatment member assembly is removably positionable in the volume wherein, when the air treatment member assembly is mounted to the hand vacuum cleaner in an operating position, the air treatment member assembly is positioned in the volume and the air treatment member is positioned in the air flow passage,
 wherein when the air treatment member assembly is in the operating position, the air treatment member air inlet is in air flow communication with the nozzle portion air outlet, the air treatment member air outlet is in air flow communication with the main body air inlet, each of the air treatment member air inlet and the nozzle portion air outlet extend downwardly and forwardly at an angle to the inlet axis, and each of the air treatment member air outlet and the main body air inlet extend downwardly and rearwardly at an angle to the inlet axis, whereby the air treatment member is removable downwardly.

In any embodiment, the air treatment member air outlet may have an outlet port that is located in a plane and, when the air treatment member assembly is in the operating position, an included angle from the inlet axis downwardly and rearwardly to the plane is between 60° and 80° and the main body air inlet extends at a mating angle.

In any embodiment, the air treatment member air inlet may have an inlet port that is located in a plane and, when the air treatment member assembly is in the operating position, an included angle downwardly and forwardly from the inlet axis to the plane is between 60° and 80° and the nozzle portion air outlet extends at a mating angle.

In any embodiment, the air treatment member assembly may be rotatably insertable into hand vacuum cleaner.

In any embodiment, the volume may have a forward portion and a rearward portion, the air treatment member assembly may have a front end that is positionable in the forward portion of the volume and a rear end of the air treatment member assembly is rotatable towards the operating position when the forward portion of the air treatment member assembly is positioned in the forward end of the volume.

In any embodiment, an air treatment member assembly air inlet may be proximate a nozzle portion air outlet of the nozzle portion when the forward end of the air treatment member assembly is positioned in the forward portion of the volume.

In any embodiment, the rear end of the air treatment member assembly may have a recess which receives a portion of the front end of the main body when the air treatment member assembly is in the operating position.

In any embodiment, the air treatment member assembly may comprise a cyclone chamber and a pre-motor filter media positioned exterior to the cyclone chamber.

In any embodiment, the rear end of the air treatment member assembly may have a pre-motor filter media which is accessible when the air treatment member assembly is removed.

In any embodiment, a surface cleaning apparatus may further comprise a handle provided on a lower side of the main body.

In accordance with this broad aspect, there is also provided a hand vacuum cleaner comprising:
 (a) an air flow passage extending from a dirty air inlet at a front end of the hand vacuum cleaner to a clean air outlet;
 (b) a nozzle portion provided at the front end of the hand vacuum cleaner, the nozzle portion comprising an inlet axis, the dirty air inlet and a nozzle portion air outlet;
 (c) a main body positioned rearward of the nozzle portion and housing a suction motor, the suction motor provided in the air flow passage, the main body comprising a main body air inlet at to front end of the main body;
 (d) first and second laterally spaced apart opposed arm members extending between the nozzle portion and the main body wherein a volume is positioned between the nozzle portion, the main body and the opposed arm members; and,
 (e) an air treatment member assembly comprising a front end comprising an air treatment member air inlet, a rear end comprising an air treatment member air outlet and an air treatment member, the air treatment member assembly is removably positionable in the volume wherein, when the air treatment member assembly is mounted to the hand vacuum cleaner in an operating position, the air treatment member assembly is positioned in the volume and the air treatment member is positioned in the air flow passage,
 wherein when the air treatment member assembly is in the operating position, the air treatment member air inlet is in air flow communication with the nozzle portion air outlet, the air treatment member air outlet is in air flow communication with the main body air inlet, the air treatment member air inlet extends downwardly and forwardly at an angle to the inlet axis, the air treatment member air outlet extends downwardly and rearwardly at an angle to the inlet axis, whereby the air treatment member is removable downwardly.

In any embodiment, the air treatment member air outlet may have an outlet port that is located in a plane and, when the air treatment member assembly is in the operating position, an included angle from the inlet axis downwardly and rearwardly to the plane is between 60° and 80°.

In any embodiment, the air treatment member air inlet may have an inlet port that is located in a plane and, when the air treatment member assembly is in the operating position, an included angle downwardly and forwardly from the inlet axis to the plane is between 60° and 80°.

In any embodiment, the air treatment member assembly may be rotatably insertable into hand vacuum cleaner.

In any embodiment, the volume may have a forward portion and a rearward portion, the air treatment member assembly may have a front end that is positionable in the forward portion of the volume and a rear end of the air treatment member assembly is rotatable towards the operating position when the forward portion of the air treatment member assembly is positioned in the forward end of the volume.

In any embodiment, an air treatment member assembly air inlet may be proximate a nozzle portion air outlet of the nozzle portion when the forward end of the air treatment member assembly is positioned in the forward portion of the volume.

In any embodiment, the rear end of the air treatment member assembly may have a recess which receives a portion of the front end of the main body when the air treatment member assembly is in the operating position.

In any embodiment, the air treatment member assembly may comprise a cyclone chamber and a pre-motor filter media positioned exterior to the cyclone chamber.

In any embodiment, the rear end of the air treatment member assembly may have a pre-motor filter media which is accessible when the air treatment member assembly is removed.

In any embodiment, a surface cleaning apparatus may further comprise a handle provided on a lower side of the main body.

It will be appreciated by a person skilled in the art that an apparatus or method disclosed herein may embody any one or more of the features contained herein and that the features may be used in any particular combination or sub-combination.

These and other aspects and features of various embodiments will be described in greater detail below.

BRIEF DESCRIPTION OF THE DRAWINGS

For a better understanding of the described embodiments and to show more clearly how they may be carried into effect, reference will now be made, by way of example, to the accompanying drawings in which:

FIG. 19 is a cross sectional view of the hand vacuum of FIG. 1 taken along line 4-4 of FIG. 3;

FIG. 20 is a perspective view of a cross section of the hand vacuum of FIG. 14 taken along line 20-20;

FIG. 21 is a perspective view of a cross section of the hand vacuum of FIG. 14 taken along line 16-16, with part of the housing removed;

Figure 1:
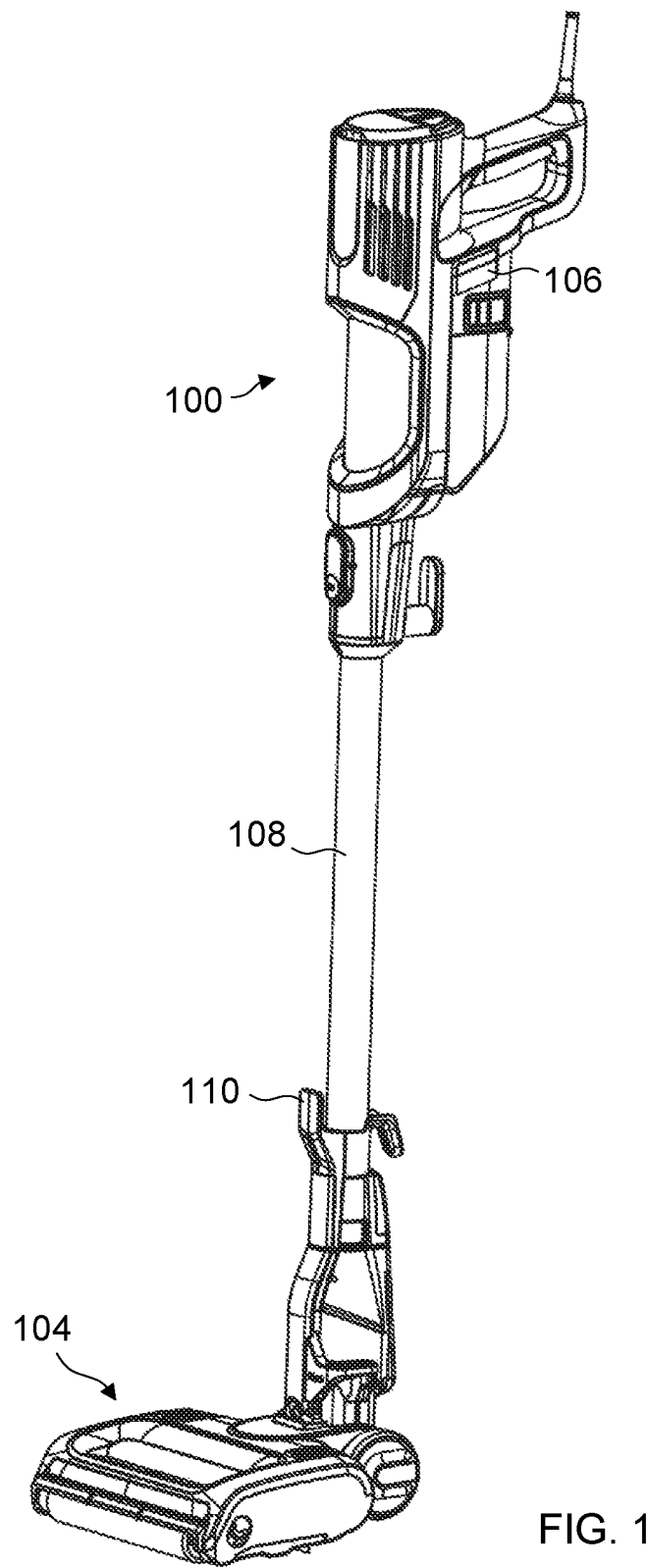
FIG. 1 is a perspective view of a surface cleaning head and elongated wand connected to a hand vacuum according to an embodiment.

The drawings included herewith are for illustrating various examples of articles, methods, and apparatuses of the teaching of the present specification and are not intended to limit the scope of what is taught in any way.

DESCRIPTION OF EXAMPLE EMBODIMENTS

Various apparatuses, methods and compositions are described below to provide an example of an embodiment of each claimed invention. No embodiment described below limits any claimed invention and any claimed invention may cover apparatuses and methods that differ from those described below. The claimed inventions are not limited to apparatuses, methods and compositions having all of the features of any one apparatus, method or composition described below or to features common to multiple or all of the apparatuses, methods or compositions described below. It is possible that an apparatus, method or composition described below is not an embodiment of any claimed invention. Any invention disclosed in an apparatus, method or composition described below that is not claimed in this document may be the subject matter of another protective instrument, for example, a continuing patent application, and the applicant(s), inventor(s) and/or owner(s) do not intend to abandon, disclaim, or dedicate to the public any such invention by its disclosure in this document.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

As used herein and in the claims, two or more parts are said to be "coupled", "connected", "attached", or "fastened" where the parts are joined or operate together either directly or indirectly (i.e., through one or more intermediate parts), so long as a link occurs. As used herein and in the claims, two or more parts are said to be "directly coupled", "directly connected", "directly attached", or "directly fastened" where the parts are connected in physical contact with each other. None of the terms "coupled", "connected", "attached", and "fastened" distinguish the manner in which two or more parts are joined together.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures, and components have not been described in detail so as not to obscure the example embodiments described herein. Also, the description is not to be considered as limiting the scope of the example embodiments described herein.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

General Description of a Surface Cleaning Apparatus

Figure 2:
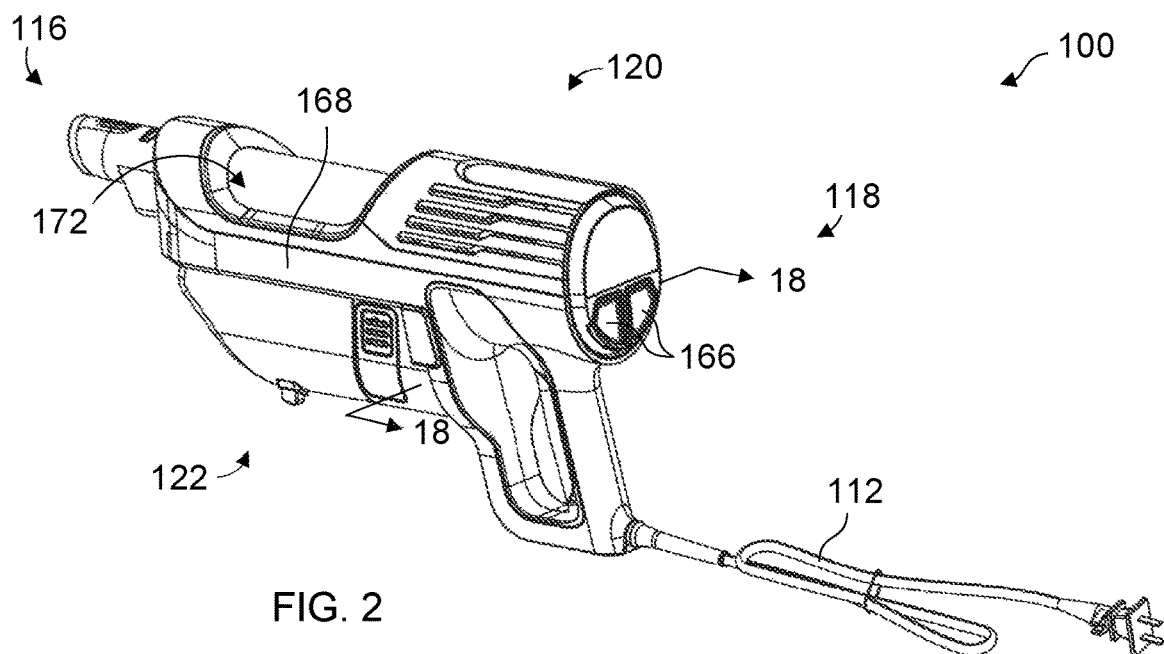
FIG. 2 is a rear perspective view of the hand vacuum of FIG. 1.
Figure 3:
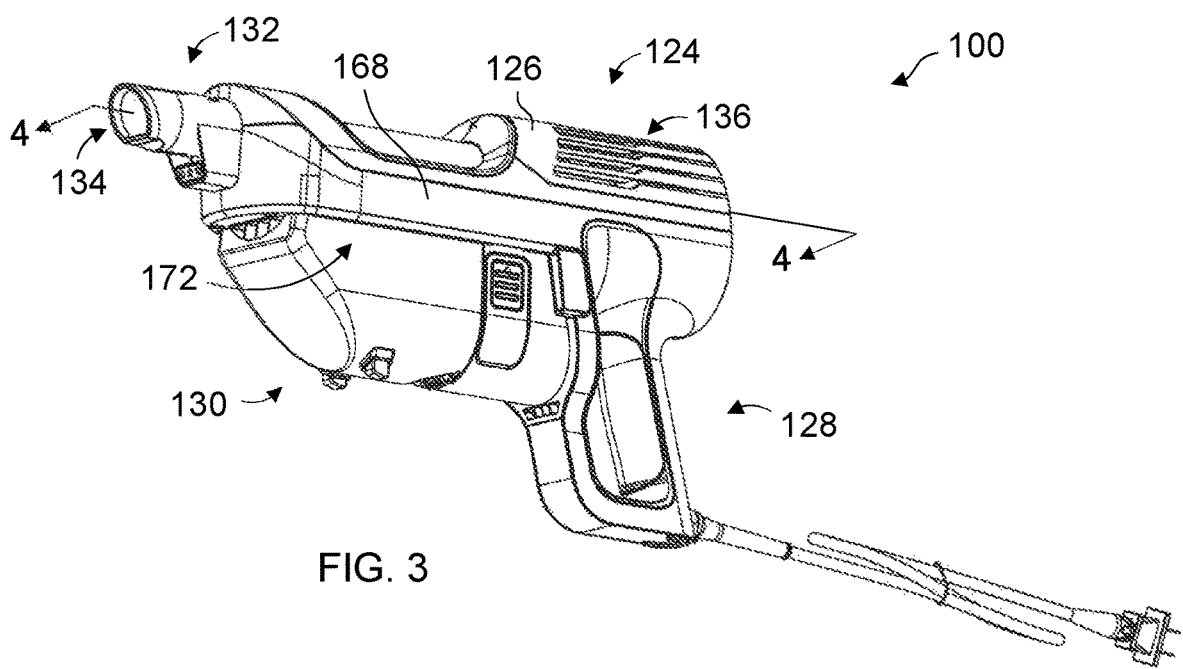
FIG. 3 is a front perspective view of the hand vacuum of FIG. 1.

Referring to FIGS. 1 to 3, an exemplary embodiment of a surface cleaning apparatus 100 is shown. The illustrated example surface cleaning apparatus 100 is a hand-held vacuum cleaner, which is commonly referred to as a "hand vacuum cleaner" or a "handvac". As used herein, a hand-held vacuum cleaner or hand vacuum cleaner or handvac is a vacuum cleaner that can be operated generally one-handedly to clean a surface while its weight is held by the same one hand. This is contrasted with upright and canister vacuum cleaners, the weight of which is supported by a surface (e.g. floor below) during use.

Optionally, surface cleaning apparatus 100 may be removably mountable on a base so as to form, for example, an upright vacuum cleaner, a canister vacuum cleaner, a stick vacuum cleaner or stick vac, a wet-dry vacuum cleaner and the like.

As illustrated in FIG. 1, the base of the surface cleaning apparatus 100 may include a surface cleaning head 104 and an elongate wand 108 that can be removably connectable to the hand vacuum 100. In this configuration, the surface cleaning apparatus may be used to clean a floor or other surface in a manner analogous to a conventional upright-style vacuum cleaner. A pocket 106 may be provided on hand vacuum 100 to hang up the hand vacuum 100 on a hook when not in use, such as to hang hand vacuum 100 from hook projection 110 of cleaning head 104.

Power may be supplied to the surface cleaning apparatus 100 by an electrical cord 112 that may be connected to a standard wall electrical outlet. The cord 112 may optionally be detachable from the hand vacuum 100. Alternatively, or in addition, the power source for the surface cleaning apparatus may be one or more onboard energy storage members, including, for example, one or more batteries.

As exemplified in FIGS. 2 to 3, the surface cleaning apparatus 100 has a front end 116, a rear end 118, an upper end 120, and a lower/bottom end 122. The surface cleaning apparatus 100 includes a main body 124 having a main body housing 126 and a handle assembly 128 provided on a lower portion of the main body 124.

In the illustrated embodiment, an air treatment member assembly 130 and a nozzle portion 132 are aligned with the main body 124. The surface cleaning apparatus 100 has a dirty air inlet 134 in the nozzle portion 132, a clean air outlet 136 downstream from the dirty air inlet 134 and an air flow passage extending there between. The air flow passage extends through the air treatment member assembly 130.

Figure 4:
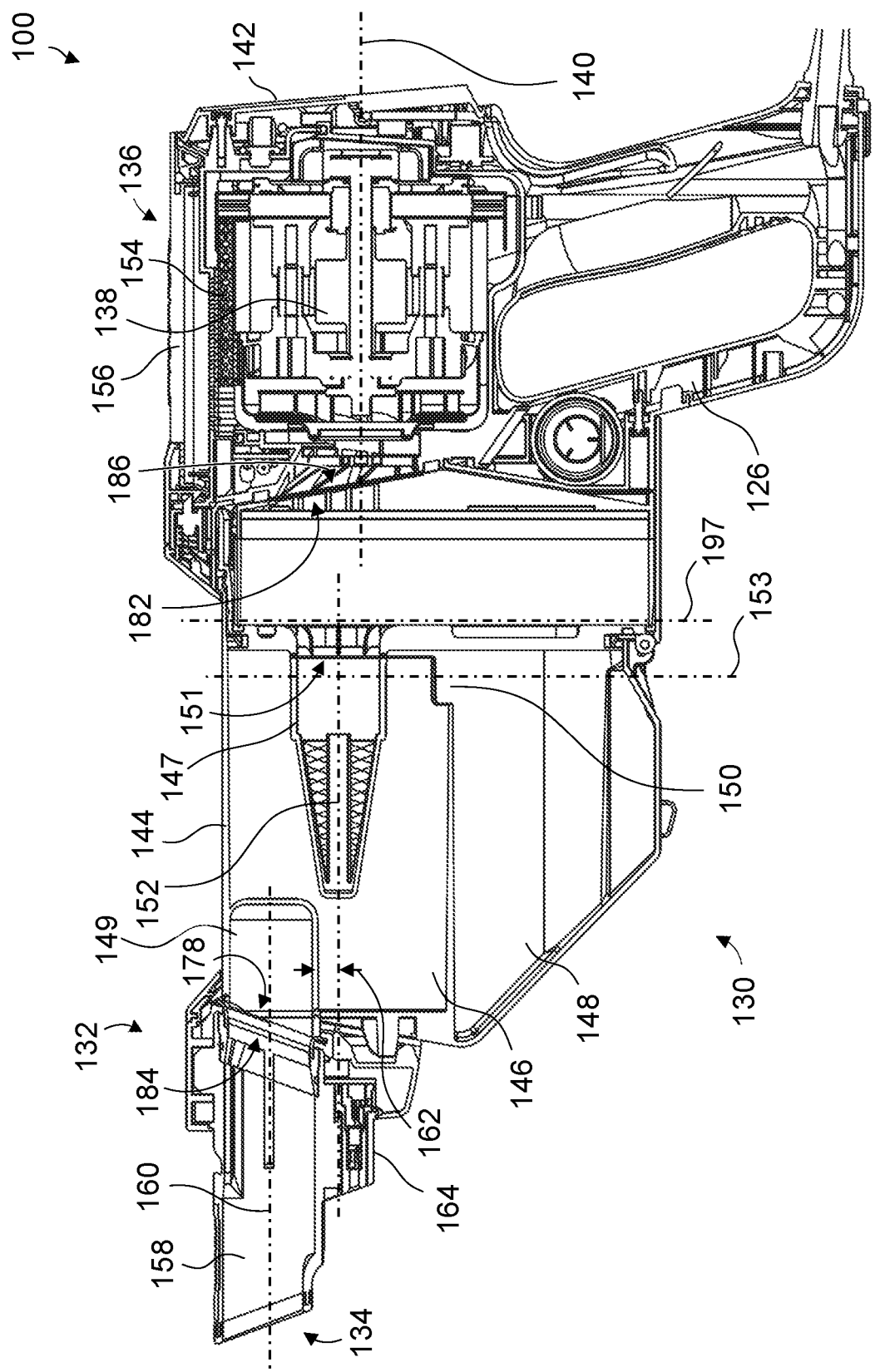
FIG. 4 is a cross sectional view of the hand vacuum of FIG. 1 taken along line 4-4 of FIG. 3.

Referring now to FIG. 4, a suction motor 138 defines a motor axis 140 (about which the rotor rotates) and is provided to generate suction through the air flow passage and is positioned within a motor housing portion 142 of the main body housing 126. The suction motor 138 may be upstream or downstream from the air treatment member assembly 130, and in the exemplified embodiment is downstream.

Air treatment member assembly 130 includes at least one air treatment member 144. The at least one air treatment member 144 is configured to treat the air in a desired manner, including, for example, removing dirt particles and other debris from the air flow. The air treatment member 144 may be provided upstream or downstream from the suction motor 138, and may be any suitable member that can treat the air. Optionally, the air treatment member 144 may include at least one cyclonic cleaning stage. Each cyclonic cleaning stage may include a cyclone unit that has one or more cyclone chambers (arranged in parallel with each other) and one or more dirt collection chambers, of any suitable configuration. The dirt collection chambers may be external to the cyclone chambers, or may be internal the cyclone chamber and configured as a dirt collection area or region within the cyclone chamber. Alternatively, the air treatment member may incorporate a bag, a porous physical filter media (such as foam or felt) or other air treating means.

Illustrated in FIG. 4 is a cyclonic air treatment member 144 having a cyclone chamber 146 and a dirt collection chamber 148 external to the cyclone chamber 146. This may be an efficient configuration for separating dirt from an air stream and collecting the separated dirt, respectively, although any suitable configuration may be used. Dirt separated from an air flow within cyclone chamber 146 may exit cyclone chamber 146 through a dirt outlet 150 into dirt collection chamber 148 where the dirt collects until the dirt collection chamber 148 is emptied.

Figure 5:
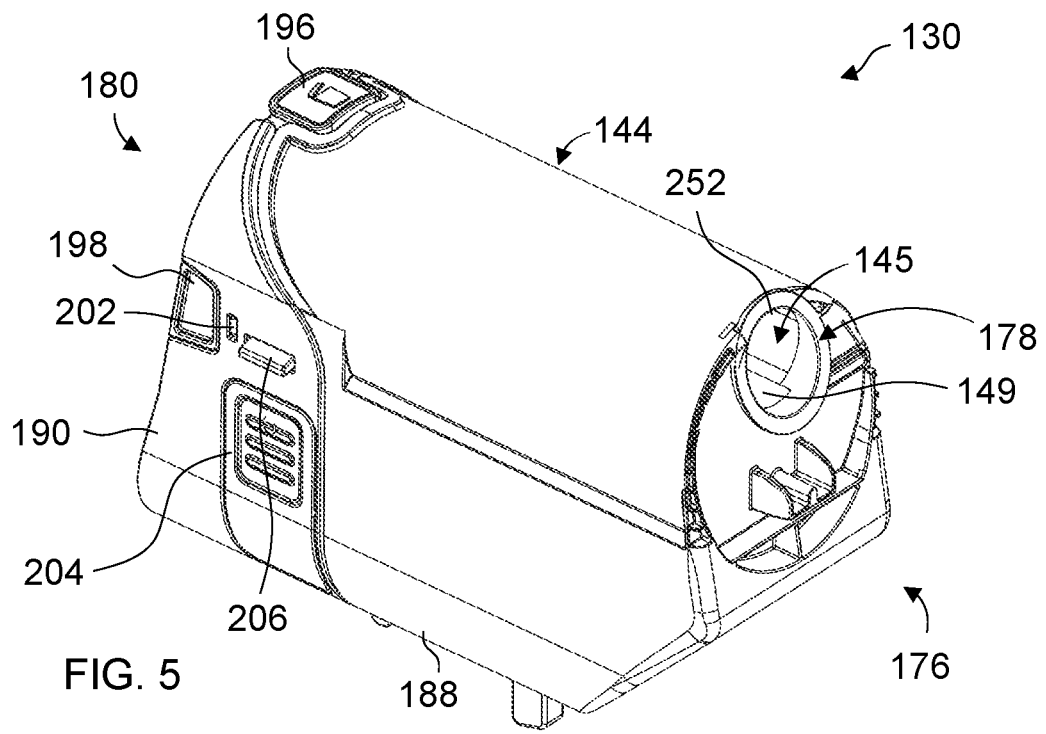
FIG. 5 is a top perspective view of an air treatment member assembly of the hand vacuum of FIG. 1.
Figure 6:
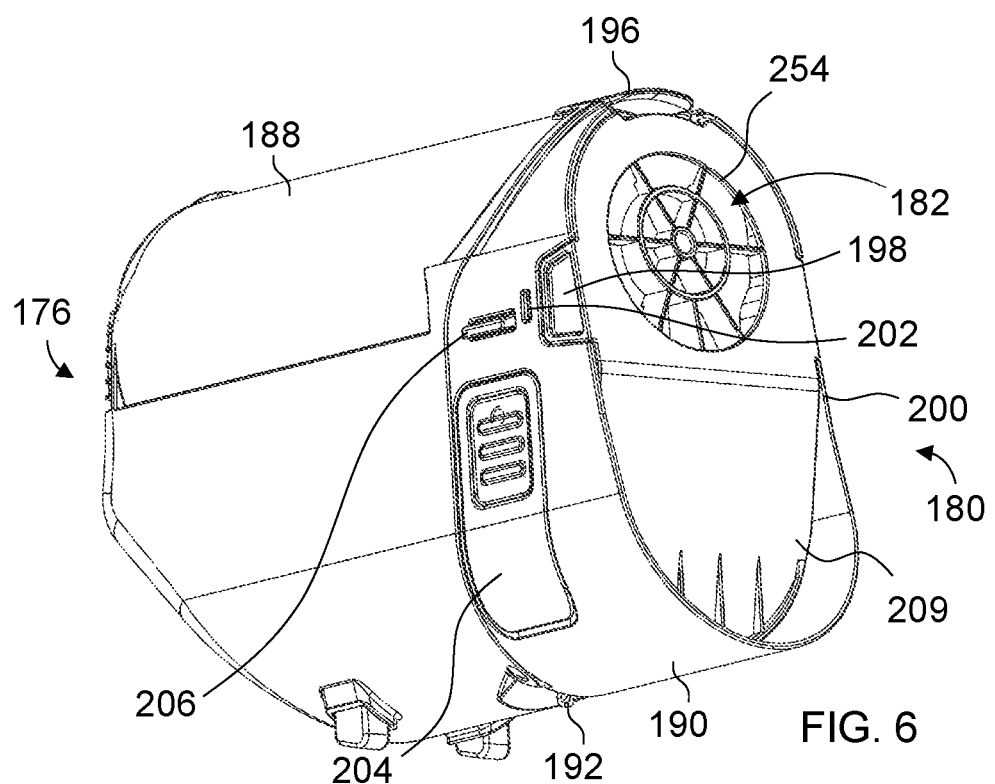
FIG. 6 is a bottom perspective view of an air treatment member assembly of FIG. 5.

The cyclone chamber 146 defines a cyclone axis 152, about which air may circulate when in the cyclone chamber 146, and may include a vortex finder 147. Air may enter the cyclone chamber 146 through a chamber inlet in a sidewall of conduit portion 149 extending from an inlet 178 of air treatment member assembly 130 described below. Any cyclone inlet known in the cyclone arts may be used. An exemplary tangential cyclone chamber inlet 145 is shown in FIG. 5. Air may exit the cyclone chamber 146 through chamber outlet 151. Any cyclone outlet known in the cyclone arts may be used. The cyclone outlet may be an axially extending outlet as exemplified in FIG. 4. The cyclone chamber 146 may be oriented in any direction, however a horizontal or generally horizontal orientation when the upper end 120 is above the lower/bottom end 122 may allow for a shorter and/or straighter air flow passage.

Optionally, as exemplified, in FIGS. 35-38, air treatment member assembly 130 may have a front openable door 284. Door 284 may be held at a top end by a front door hinge 286 and at a bottom edge by a pivot latch 288 released by pressing upward on finger end 290. Front openable door 284 may provide access to cyclone chamber 146 and dirt collection chamber 148.

In the embodiment of FIG. 4, the motor axis 140 is generally parallel to the cyclone axis 152. As exemplified, the motor axis 140 may be also positioned so that the motor axis 140 intersects the cyclone chamber 146, and may be co-axial or nearly co-axial with the cyclone axis 152, such as slightly higher or, as exemplified, slightly lower than the cyclone axis 152 when a dirt collection chamber 148 is provided below the cyclone chamber 146.

In the embodiment of FIGS. 1 to 4, the clean air outlet 136 is provided as part of the main body 124, and includes a grill 154. In this example, the grill 154 is oriented such that air exiting the clean air outlet 136 travels generally perpendicular to the motor axis 140, although in other embodiments of the hand vacuum 100 the grill 154 may be oriented otherwise, such as so that air exiting the clean air outlet 136 travels generally parallel to the motor axis 140. In the illustrated example embodiment, the grill 154 forms part of an optional post-motor filter housing 156 as described further below.

As exemplified in FIG. 4, the dirty air inlet 134 of the hand vacuum cleaner 100 is the inlet end of an inlet conduit 158. Dirty air inlet 134 may be positioned forward of the air treatment member assembly 130 as shown, and may be part of the nozzle portion 132 which may be used as a nozzle to directly clean a surface and may have any configuration. The air inlet conduit 158 is, in this example, a generally linear member that extends along a conduit axis 160 that is oriented in a longitudinal forward/backward direction and may be generally horizontal when the hand vacuum cleaner 100 is oriented with the upper end 120 above the lower end 122. Alternatively, or in addition to functioning as a nozzle, the inlet conduit 152 may be connected or directly connected to the downstream end of any suitable accessory tool such as a rigid air flow conduit (e.g., elongate wand 108 which may function as an above floor cleaning wand when detached from surface cleaning head 104), a flexible air flow conduit such as a hose, a crevice tool, a mini brush or the like.

As exemplified, the air inlet conduit 158 may be located above (e.g., closer to the upper end 120 than) the cyclone axis 152, and may be spaced from the axis 152 by a distance 162. The distance 162 may be selected so that the inlet conduit 158 is above the cyclone axis 152 but a projection of part or all of the conduit may pass through cyclone chamber 146, which may help reduce the overall height of the apparatus 100. Alternatively, the distance 162 may be selected to be large enough that the air inlet conduit 158 is above the cyclone chamber 146, above cyclone axis 152, and/or above other features, which may help facilitate using a generally linear air flow passage and/or provide a desirable hand feel.

Optionally, the nozzle portion 132, or other portion of the apparatus 100, may be provided with any suitable electrical connector 164 that can establish an electrical connection between the apparatus 100 and any accessory tool (e.g., elongate wand 108), cleaning head and the like that is connected to the nozzle portion 132. In such a configuration, the hand vacuum 100 may be used to power a surface cleaning head having a rotating brush, or other tools of that nature, using either the power supplied by the wall outlet and/or an onboard battery pack.

Referring again to FIG. 2, controls may be provided on the surface cleaning apparatus 100 to allow a user to control the operation of the surface cleaning apparatus. For example, buttons 166 may be provided to allow the user to choose suction motor power levels (e.g., low, medium, high) and/or floor cleaning mode selections such as a hard floor cleaning mode (e.g., brush off, higher flow rate) and a carpet cleaning mode (e.g., brush on, lower flow rate).

Volume Between Nozzle Portion and Main Body

Referring again to FIGS. 2 and 3, nozzle portion 132 having the dirty air inlet 134 is provided at the front end 116 of the hand vacuum cleaner 100. Surface cleaning apparatus 100 also includes first and second laterally spaced apart opposed arm members 168, 170 (FIGS. 13 and 14) extending between nozzle portion 132 and the main body 124. While two arm members 168, 170 are illustrated in the example embodiment, any suitable number of arms may be used to join the nozzle portion 132 and main body 124, such as one or three or more arms. In particular, more than two arm members 168, 170 may be used to increase the stability and/or durability of the apparatus 100, although two arm members may provide a desired stability and durability without the added weight or bulk of additional arms.

A volume 172 (see also FIGS. 13 and 14) is positioned between the nozzle portion 132, the main body 124, and the opposed arm members 168, 170. Air treatment member assembly 130 is removably positionable in the volume 172, and is shown in FIGS. 2 and 3 received in the volume 172 in an operating position. When the air treatment member assembly 130 is mounted to the hand vacuum cleaner 100 in an operating position, the air treatment member assembly 130 is positioned in the volume 172 and the air treatment member 144 is positioned in the air flow passage.

First and second laterally spaced apart opposed arm members 168, 170 may allow the air treatment member assembly 130 to be removably positionable in the volume 172 without the added size or weight of a housing and/or body portion joining the nozzle portion 132 and main body 124 and housing the air treatment member assembly 130.

One or more electrical conduits 174 (FIG. 16) may run up one or both of the arms 168, 170 to join the nozzle portion to a power source and/or controls. For example, electrical connection 164 may be joined to power cord 112 via an electrical conduit 174 running along first arm member 168.

Air Treatment Member Assembly

Referring now to FIGS. 4 to 8, the removable air treatment member assembly 130 includes an air treatment member 144. While various air treatment members 144 may be used, in the illustrated example, air treatment member 144 is a cyclone and includes a cyclone chamber 146 and a separate (external) dirt collection chamber 148 in communication with cyclone chamber 136 through dirt outlet 150. Dirt outlet 150 has a dirt outlet axis 153 through a port of dirt outlet 150. Dirt outlet axis 153 may be generally perpendicular to motor axis 140. In the illustrated example, dirt outlet 150 is in a lower portion of cyclone chamber 136, which may contribute to a gravitational dirt motive effect when hand vacuum cleaner 100 is in the operating position shown in FIG. 4.

Illustrated air treatment member assembly 130 has a front end 176 having an air inlet 178 and a rear end 180 having an air outlet 182. The air inlet 178 is provided to be in air flow communication with a nozzle air outlet 184 (see also FIG. 20) when the air treatment member assembly 130 is in an operating position. The air outlet 182 is provided to be in air flow communication with a main body air inlet 186 (see also FIG. 21) when the air treatment member assembly 130 is in an operating position. One or more of nozzle air outlet 184, assembly air inlet 178, assembly air outlet 182, and main body air inlet 186 may include a sealing material such as a rubberized material to help prevent air leakage. For example, a gasket may be provided on one or both of the abutting surfaces of the air treatment member assembly and the nozzle portion. Similarly, a gasket may be provided on one or both of the abutting surfaces of the air treatment member assembly and the main body.

The air treatment member assembly 130 also includes an air treatment member assembly body 188. An interior of the air treatment member assembly body 188 may be accessible, such as through an openable door. In some embodiments, opening a door or other openable member may provide access to one or to two or more regions.

Figure 7:
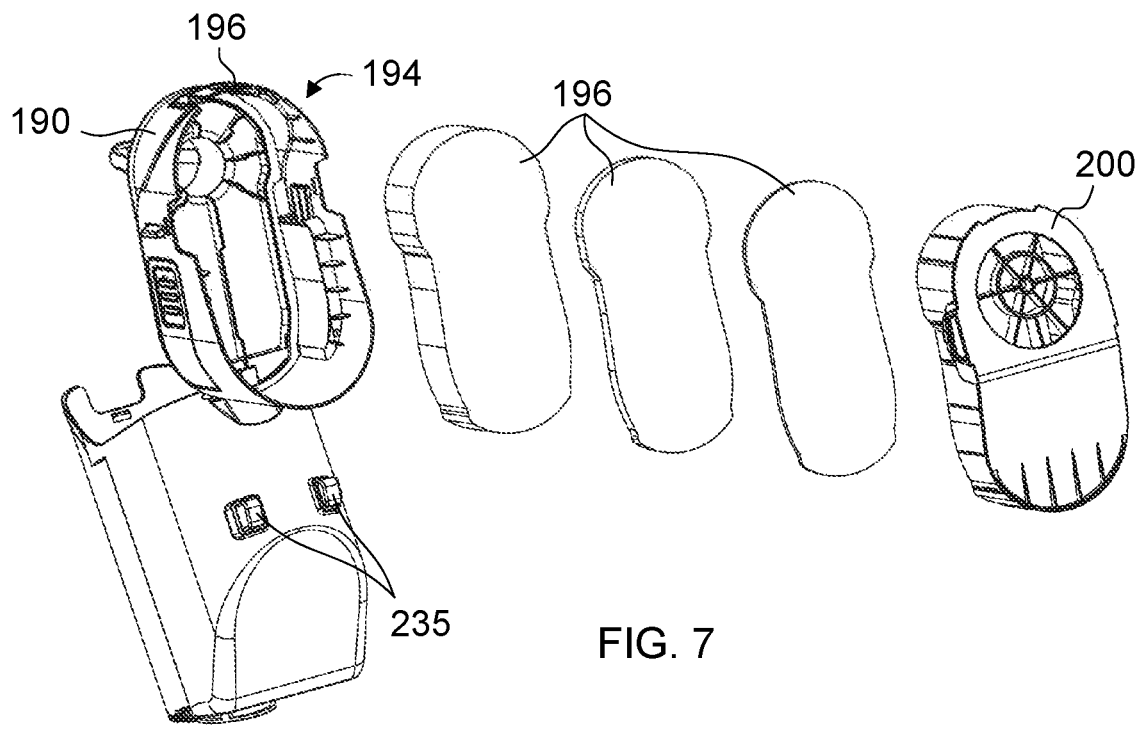
FIG. 7 is a bottom perspective exploded view of the air treatment member assembly of FIG. 5 in an open position with an exploded view of the pre-motor filter housing.
Figure 8:
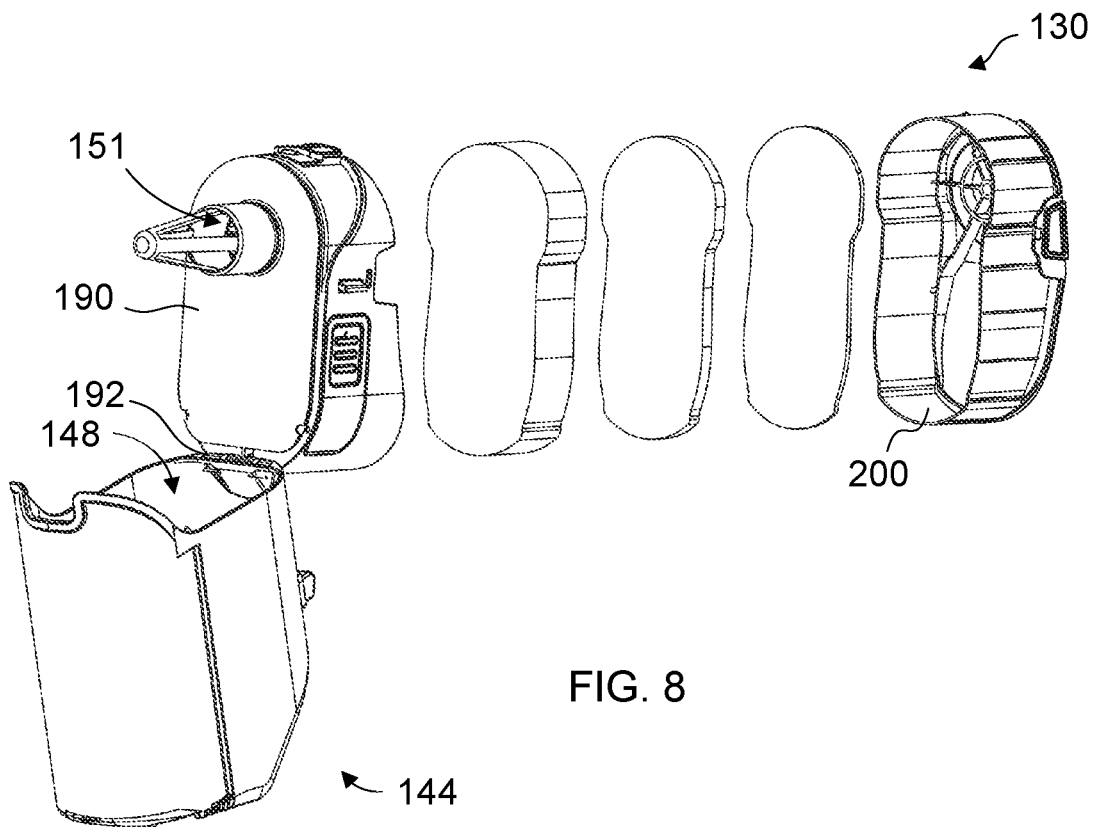
FIG. 8 is a top perspective exploded view of the air treatment member assembly of FIG. 5 in an open position with an exploded view of the pre-motor filter housing.

In the illustrated example, a rear door 190 is pivotally attached to air treatment member assembly body 188 at hinge 192. Access to an interior of body 188 may allow a user to maintain or clean an air treatment member or replace other components such as filters. As illustrated in FIGS. 7 and 8, rear door 190 forms a rear wall of both cyclone chamber 146 and dirt collection chamber 148. Rear door 190 may be released from body 188 by any means, such as by depressing button 196 to release a latch, whereupon rear door 190 may be opened.

Optionally, one or more pre-motor filters may be placed in the air flow passage between the air treatment member 144 and the suction motor 138. While the premotor filter and optional premotor filter housing may be of any suitable configuration, in the illustrated example they are formed in rear door 190. Accordingly, as exemplified in FIGS. 5 to 8, in the illustrated embodiment rear door 190 also forms a premotor filter housing 194 such that premotor filter 196 is removed when the air treatment member assembly is removed.

The premotor filter housing 194 may be closed. Accordingly, for example, a back panel module 200 may be provide. In the illustrated embodiment, premotor filter 196 is a multilayer filter held in a removable back panel module 200. Pre-motor filter 196 may be accessed by opening the premotor filter housing 194, such as by depressing buttons 198 on back panel 200 to release projections 202 from sidewalls of rear door 190, at which point back panel 200 may be withdrawn from rear door 190. Any opening means may be used.

It will alternately be appreciated that the pre-motor filter (s) may be provided in a front end of the main body, and may be revealed when the air treatment member assembly is removed.

Figure 24:
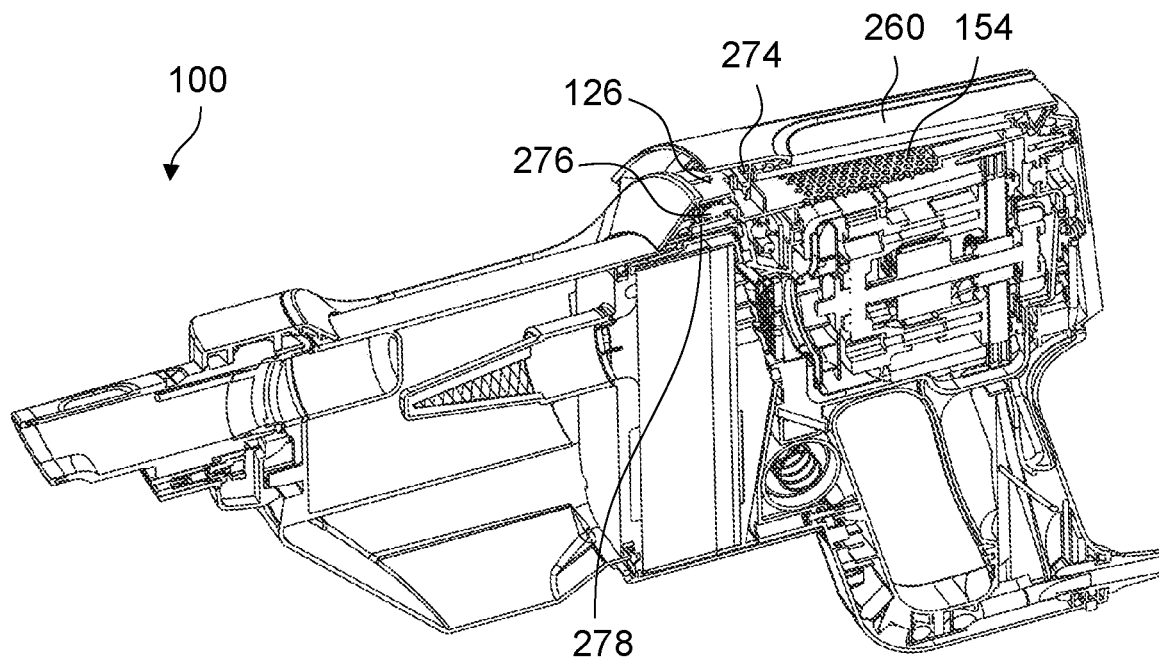
FIG. 24 is a perspective view of the cross section of FIG. 19, with the removable cover lifted to the first removal position.
Figure 25:
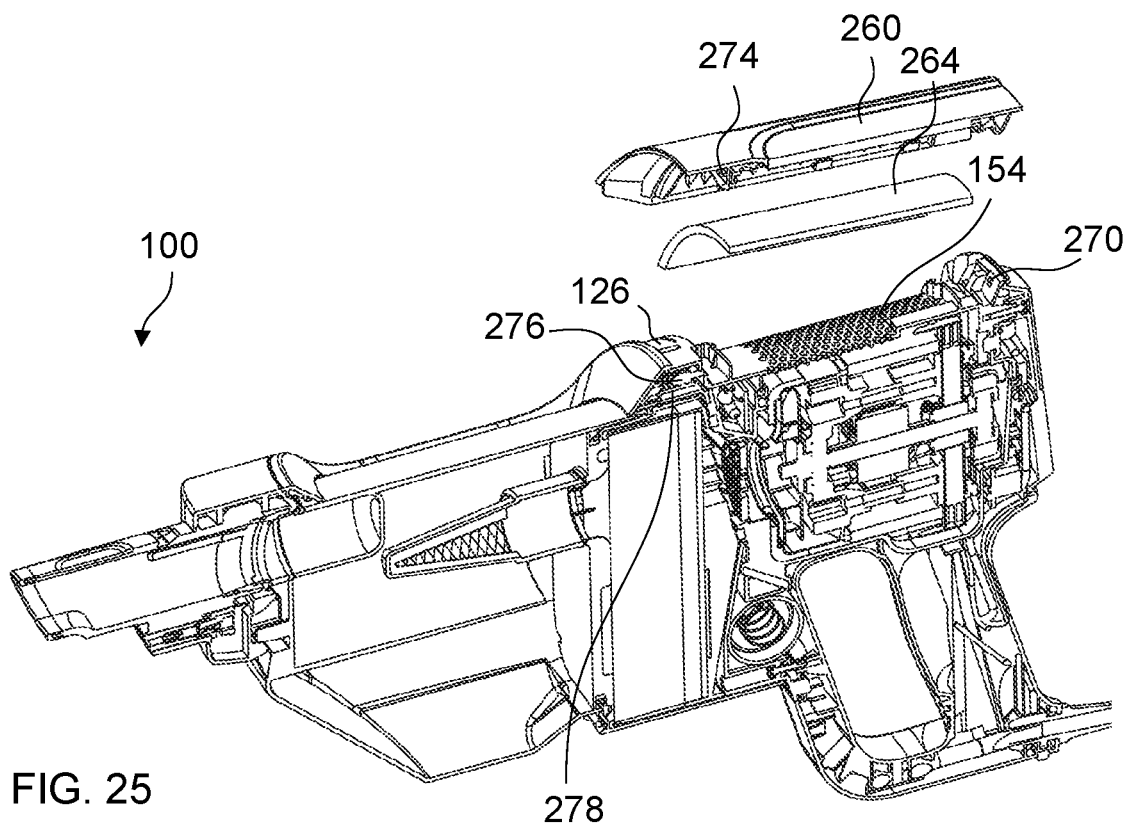
FIG. 25 is the view of FIG. 24 with the removable cover lifted to a second removal position and separated from a post motor filter.

Alternately, as exemplified in FIG. 24, a pre-motor filter module 292 at a rear end of air treatment member assembly 130 may hold a pre-motor filter 196 in a friction fit. In the illustrated embodiment, pre-motor filter module 292 is a chamber with an open rearward end and sidewalls extending beyond a rear extend of pre-motor filter 196 to form an airflow chamber 295 (FIG. 29) between pre-motor filter 196 and a forward wall of main body 124 when air treatment member assembly 130 is in an operating position. Outlet 182 of air treatment member assembly 130 may be substantially the entire rearward end of air treatment member assembly 130.

The pre-motor filter 196 may be any suitable filter, including any suitable porous media filter (i.e. foam and/or felt and the like) and may have any suitable shape that is consistent with the configuration of the pre-motor filter housing 194. A pre-motor filter 196 may have an upstream filter face axis or plane 197 (FIG. 4) that is generally perpendicular to the suction motor axis 140, such as to provide an increased air flow efficiency.

Figure 14:
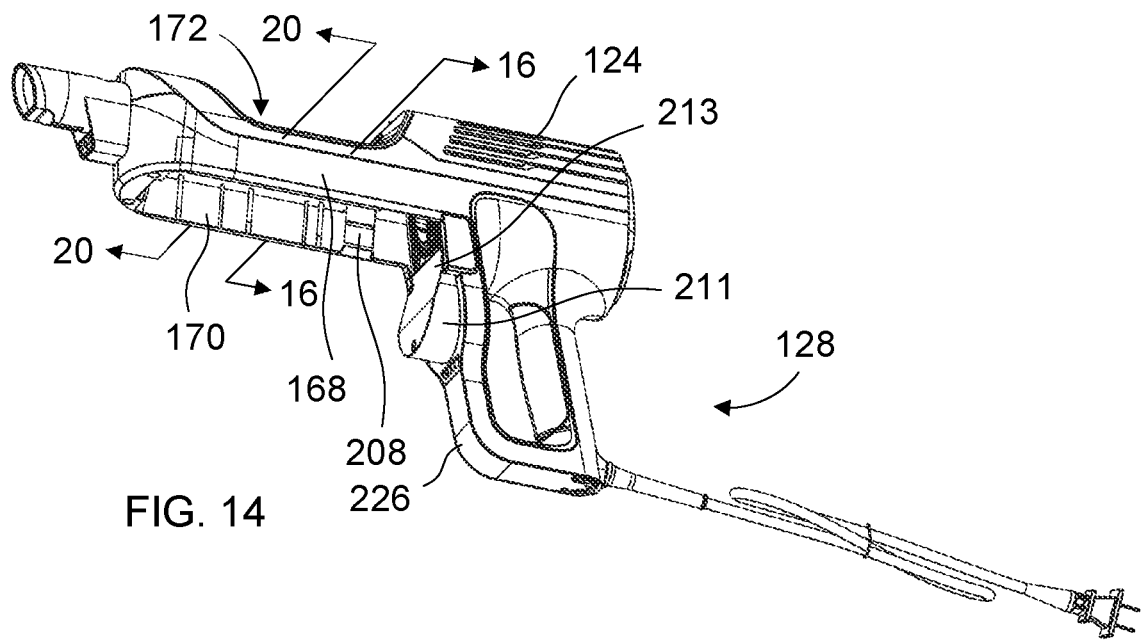
FIG. 14 is a front perspective view of the hand vacuum of FIG. 1 with the air treatment member of FIG. 5 removed.
Figure 15:
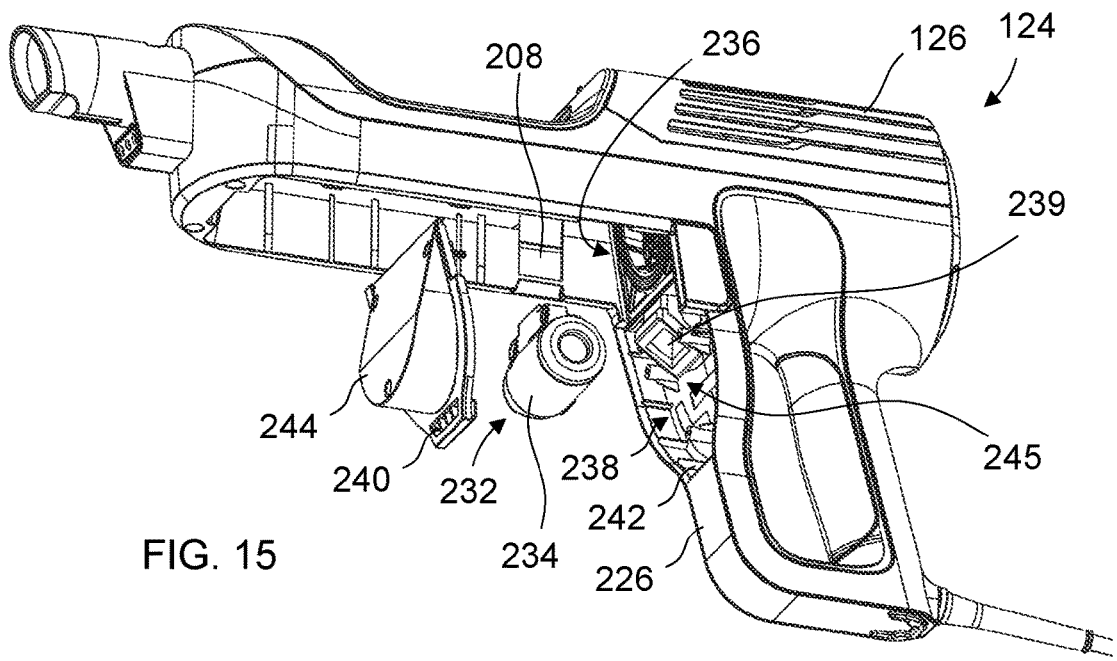
FIG. 15 is a front partially exploded perspective view of the hand vacuum of FIG. 1 with the air treatment member of FIG. 5 removed.

The air treatment member assembly may be lockably securable in the volume by any means known in the vacuum cleaner arts. As exemplified, first and second inter-engageable members (such as retracting snap-fit projections 206 and slots 208) are utilized wherein the first interengageable member is moveable between a locked position and an air treatment member assembly removable position. As exemplified, an actuator for the retracting snap-fit projections 206 (e.g., buttons 204), may be provide don rear door 190. Buttons 204 are provided for use in retracting snap-fit projections 206. When the air treatment member assembly 130 is in an operating position, projections 206 rest within slots 208, which may be provided in first and second arm members 168, 170 (FIGS. 14 and 15). Retraction of projections 206 releases air treatment member assembly 130 from first and second arm members 168, 170 to allow the air treatment member assembly 130 to be removed from the operating position.

A rear end 180 of an air treatment assembly 130 may have a recess for receiving a portion of the main body 124 therein when the air treatment member assembly 130 is mounted to the hand vacuum cleaner 100 in the operating position. This recess may allow for a more compact construction, such as by allowing a portion of the main body 124 to occupy a space that is not needed by the functioning of the air treatment member assembly 160. In the illustrated example, recess 209 is provided to receive portion 211 (FIG. 14) of main body 124. Portion 211 in the illustrated example is a forward portion of finger guard 226 formed by front panel 244 and enclosing a bleed valve chamber 238, as discussed further below with reference to FIG. 15.

In some embodiments, the portion 211 of the main body 124 may be a projection of the main body that forms a concave portion 213 (FIG. 14) of the main body 124 above the portion 211. Where air treatment member assembly 130 is to be received against the concave portion 213, the air treatment member assembly 130 may be prevented from being vertically inserted in a direction perpendicular to the motor axis 140 by the portion 211. Accordingly, a rear end 180 of an air treatment member assembly 130 may need to be inserted at an angle to the motor axis 140, such as by being rotationally inserted as discussed below.

Air Treatment Member Assembly Removable Downwardly

In accordance with an aspect of this disclosure, which may be used alone or in combination with any other aspect, air treatment member assembly 130 may be removed from the operating position in any suitable direction, such as downwardly as described in the following paragraphs, or upwardly as described subsequently. Upwardly removable air treatment member assemblies may be more secularly held in position, while downwardly removable air treatment member assemblies may be more easily removable. In some cases, an air treatment member assembly may be removable upwardly and downwardly.

Referring to FIGS. 1 to 4, the exemplary air treatment member assembly 130 is illustrated in the operating position and is removable downwardly. In the illustrated operating position of FIGS. 1 to 4, the air treatment member assembly 130 is positioned in the volume 172 and the air treatment member 144 is positioned in the air flow passage.

Air treatment member assembly 130 may be vertically translatable into and/or out of the volume as discussed subsequently or, alternately, the air treatment member assembly 130 may be rotatably insertable into hand vacuum cleaner 100.

Figure 10:
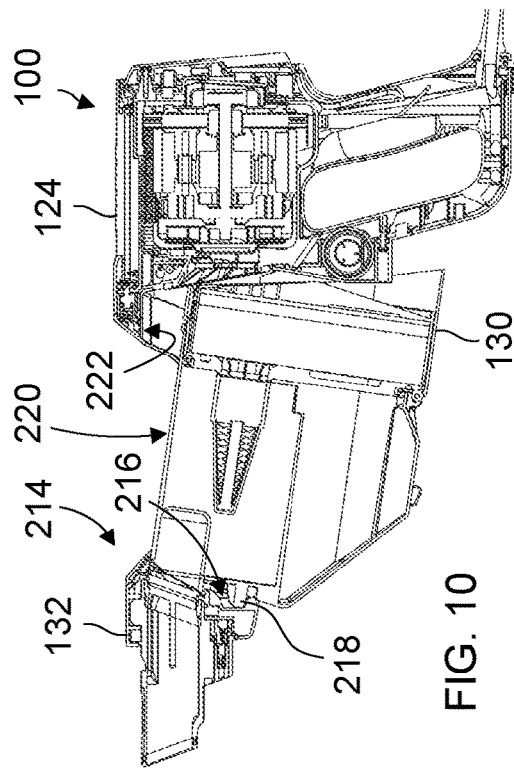
FIG. 10 is a cross sectional view of the hand vacuum of FIG. 9.
Figure 12:
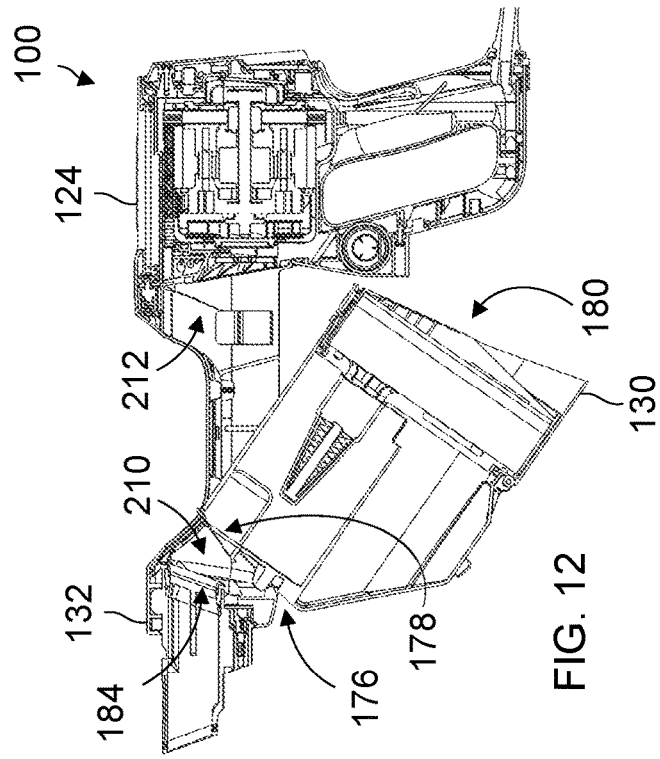
FIG. 12 is a cross sectional view of the hand vacuum of FIG. 11.
Figure 9:
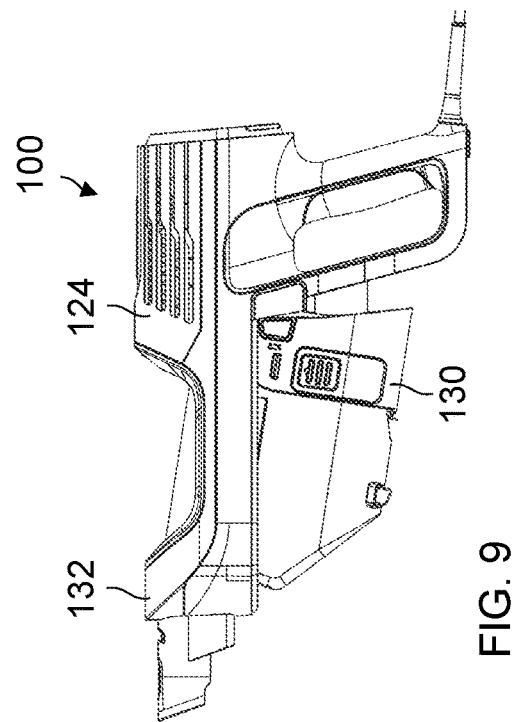
FIG. 9 is a side elevation view of the hand vacuum of FIG. 1, with the air treatment member of FIG. 5 at a first removal stage.
Figure 11:
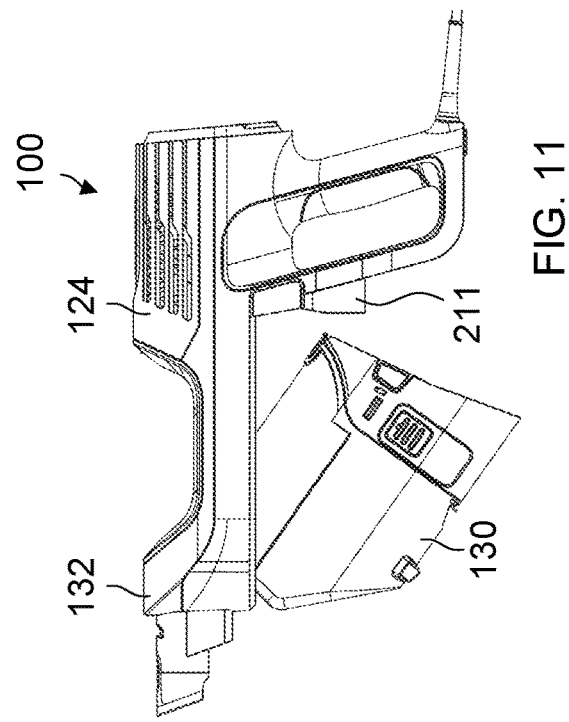
FIG. 11 is a side elevation view of the hand vacuum of FIG. 1, with the air treatment member of FIG. 5 at a second removal stage.

As exemplified FIGS. 9 to 12, the air treatment member assembly 130 may be rotatably insertable about a rotational axis that is perpendicular to the forward/rearward direction (e.g., cyclone axis 152) and in a horizontal plane when the hand vacuum 100 is disposed with the upper end above the lower end as exemplified in FIG. 4. As shown in FIGS. 11 and 12, volume 172 has a forward portion 210 and a rearward portion 212. In order to insert the air treatment member assembly 130 in the hand vacuum 100, the front end 176 of air treatment member assembly 130 may be positioned in the forward portion 210 of volume 172 with a rear end 180 of air treatment member assembly 130 is extending downwardly. In this position, the air inlet 178 of the air treatment member assembly 130 may be positioned adjacent nozzle portion air outlet 184. For example, a lower portion of the air treatment member assembly 130 may abut a lower portion of the nozzle portion air outlet 184.

The rear end 180 may then be rotated upwardly towards the operating position. As the rear end 180 is rotated upwardly into the rearward portion 212 of volume 172, the air inlet of the air treatment member assembly 130 rotates to align and abut with the nozzle portion air outlet 184. Accordingly, when the air treatment member assembly 130 is in the operating position, the air inlet of the air treatment member assembly 130 is in flow communication with the nozzle portion air outlet 184. If a sealing member or a gasket is provided on one or both of the air inlet of the air treatment member assembly 130 and the nozzle portion air outlet 184, then the sealing member may be compressed at the air treatment member assembly is rotated into position without the sealing member sliding against a hard surface.

Optionally as exemplified in FIG. 10, a rear end 214 of the nozzle portion 132 may have a recess 216. A projecting portion 218 of a front end 176 of air treatment member assembly 130 may be received in the recess 216 when the air treatment member assembly 130 is in the operating position. The rear end 214 may be shaped so as to surround projecting portion 216 as the air treatment member assembly 130 is rotated into position. Accordingly, the portion 218 may cooperate with the recess 216 to form a pivot about which a front end 176 of air treatment member 130 turns as the air treatment member assembly 130 is rotatably inserted into hand vacuum cleaner 100.

As exemplified in FIG. 10, the air treatment member assembly 130 may be securely held in the operating position by one or more of the portion 218 in recess 216, projections 206 being received in slots 208 of arm members 168, 170 (FIGS. 5, 6, 14, and 15), and an upper end 220 of air treatment member 130 held against an upper stop member. As exemplified, the upper stop member 222 may be a top projecting lip 222 of the main body 124, which extends forwardly to overlie a portion of the volume and thereby limit the upward movement of air treatment member assembly 130 as the air treatment member assembly 1230 is rotated into the operating position.

While in the illustrated embodiment, the air treatment member assembly 130 is removable downwardly, in other embodiments an upwardly removable air treatment member assembly 130 may also be rotatably inserted.

Pistol Grip Handle

Any suitable user grip portion may be provided to allow a user to carry hand vacuum cleaner 100. However, in accordance with another aspect of this disclosure, which may be used alone or in combination with any other aspect, the surface cleaning apparatus includes a pistol grip handle assembly. A pistol grip handle may be a convenient handle forming an ergonomic grip for a user, and may provide a desirable hand feel to a user.

Figure 13:
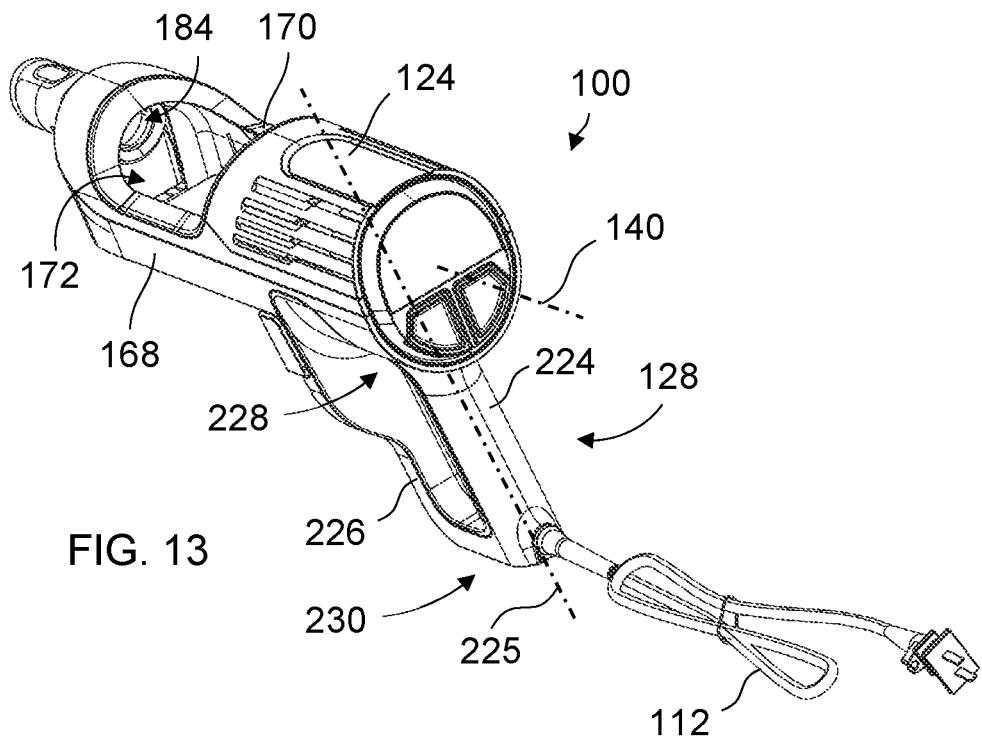
FIG. 13 is a rear perspective view of the hand vacuum of FIG. 1 with the air treatment member of FIG. 5 removed.

Referring to FIGS. 13 and 14, in the illustrated example hand vacuum cleaner 100 includes a handle assembly 128. Handle assembly 128 is a pistol grip handle assembly. In the illustrated example, the pistol grip handle assembly 128 is rearward of the volume 172 and proximate suction motor 138 in an upper part of main body 124. A position rearward of the volume 172 may provide a desirable hand feel to a user and/or allow a positioning proximate suction motor 138.

The pistol grip handle assembly 128 may be provided on any portion of the main body. As exemplified, the pistol grip handle assembly 128 is optionally provided at a rearward end of the hand vacuum 100 and may extend downwardly and rearwardly from the suction motor housing. Accordingly, as exemplified, handle assembly 128 is provided on a lower portion of the main body 124. This position may allow the user to more easily maneuver the suction motor 138, as the suction motor 138 is often one of the heaviest parts of a surface cleaning apparatus. This position may also allow the user to more easily insert and remove a downwardly removable air treatment member assembly 130.

Optionally, as exemplified, handle assembly 128 may include a pistol grip hand grip 224 and a finger guard 226 positioned forward of the pistol grip hand grip 224 and rearward of the volume 172. A hand grip 224 may extend away from the lower portion 228 of main body 124, such as to allow a user to rest the weight of the suction motor 138 generally above the user's gripping hand.

While a power source may be provided at any suitable location on a hand vacuum cleaner 100, in the illustrated example electrical cord 112 enters the housing 126 at a lower end 230 of handle assembly 128. This may improve the maneuverability of the hand vacuum cleaner. In embodiments in which a battery pack is include, the battery pack may also be located on or in a lower end 230 of a handle assembly 128. Battery packs are also generally one of the heavier components of a hand vacuum cleaner, and placing a battery pack proximate a handle may improve the hand feel of the cleaner, as may positioning a battery pack generally opposite suction motor 138 across a handle assembly 128.

A hand grip may form a handle axis generally perpendicular to the suction motor axis and/or generally vertical when the hand vacuum cleaner 100 is in an operating position, which may contribute to a desirable hand feel. In the illustrated example, hand grip 224 has a handle axis 225 (see also FIG. 19) that is at an angle of about 70° to 80° to suction motor axis 140 and an angle of 10° to 20° to vertical when the hand vacuum cleaner 100 is in an operating position as shown for example in FIG. 4.

Bleed Valve

In accordance with another aspect of this disclosure, which may be used alone or in combination with any other aspect, a bleed valve may be positioned at least partially and, optionally, fully within the volume defined by the air treatment member assembly 130. Accordingly, for example, a rear end of the air treatment member assembly 130 may have a recess in which the bleed valve is received when the air treatment member assembly 130 is in the operating position. A hand vacuum cleaner 100 may include a bleed valve to help prevent damage to a motor if, e.g., the dirty air inlet 134 is obstructed, by bleeding air into the air flow passage when pressure within the air flow passage increases above a predetermined pressure.

Positioning the bleed valve at least partially within the volume defined by the air treatment member assembly 130 may enable the bleed valve to be positioned and oriented so as to provide a compact construction. Accordingly, in some embodiments, a bleed valve may be positioned below suction motor 138 but forward of hand grip 224 and rearward of an air treatment member assembly 130 to provide a compact construction. Optionally, the bleed valve may be positioned rearward of the air treatment member 144 and/or rearward of a pre-motor filter. Alternately, or in addition, the bleed valve may also be oriented with an axis perpendicular to the suction motor axis 140 to provide a further compact construction.

As exemplified in FIGS. 13 to 18, bleed valve assembly 232 may be positioned forward of a pistol grip hand grip 224 and rear of air treatment member 144. In this position, the bleed valve assembly 232 is rearward of air treatment member 144. In addition, in this position, the bleed valve assembly 232 may also be rearward of an upstream face of the pre-motor filter 196 or rearward of the downstream face of the pre-motor filter 196.

A bleed valve may be above or below the suction motor in a suitably compact position, and may be below the suction motor if the handle assembly and/or the air treatment member assembly extend below the suction motor. In the illustrated example, the bleed valve assembly 232 is generally below suction motor 138, and is below a forward portion 236 of main body 124.

The bleed valve is provided in a housing that may be formed by part or all of the main body. As exemplified, the bleed valve may be provided in an openable chamber such that the bleed valve and/or the bleed valve passage may be accessible by opening a portion (e.g., a door) of the bleed valve chamber.

As exemplified, bleed valve assembly 232 includes a bleed valve 234 and a bleed valve outlet passage 239. Bleed valve 234 is joined to an air flow passage upstream of suction motor 138 and downstream of the pre-motor filter 196 by bleed valve outlet passage 239. Bleed valve 234 is received in a bleed valve chamber 238, which is joined to a housing surface vent 240 on a surface of housing 126 by a bleed valve inlet passage 242.

Figure 16:
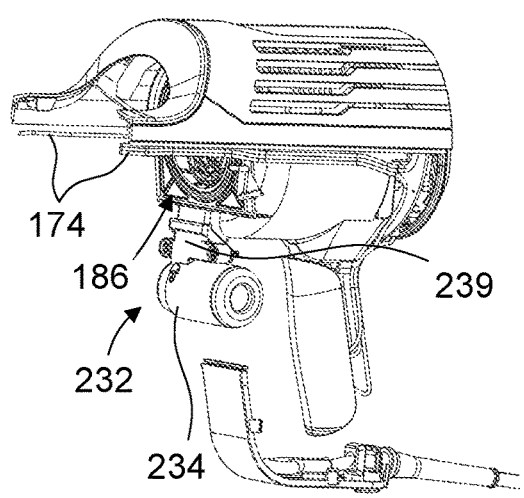
FIG. 16 is a left perspective view of a cross section of the hand vacuum of FIG. 14 taken along line 16-16, with part of a housing removed.
Figure 17:
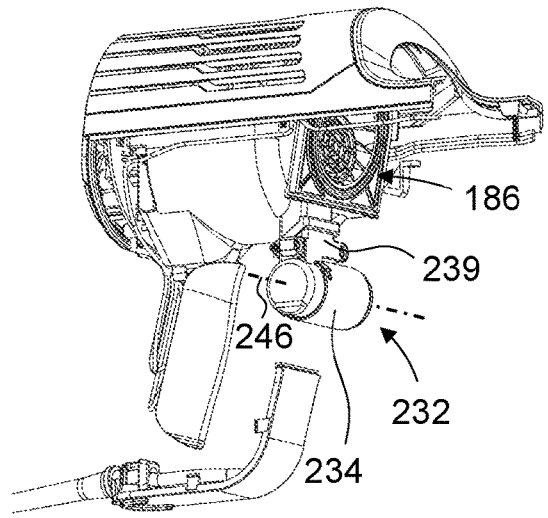
FIG. 17 is a right perspective view of a cross section of the hand vacuum of FIG. 14 taken along line 16-16, with part of the housing removed.
Figure 18:
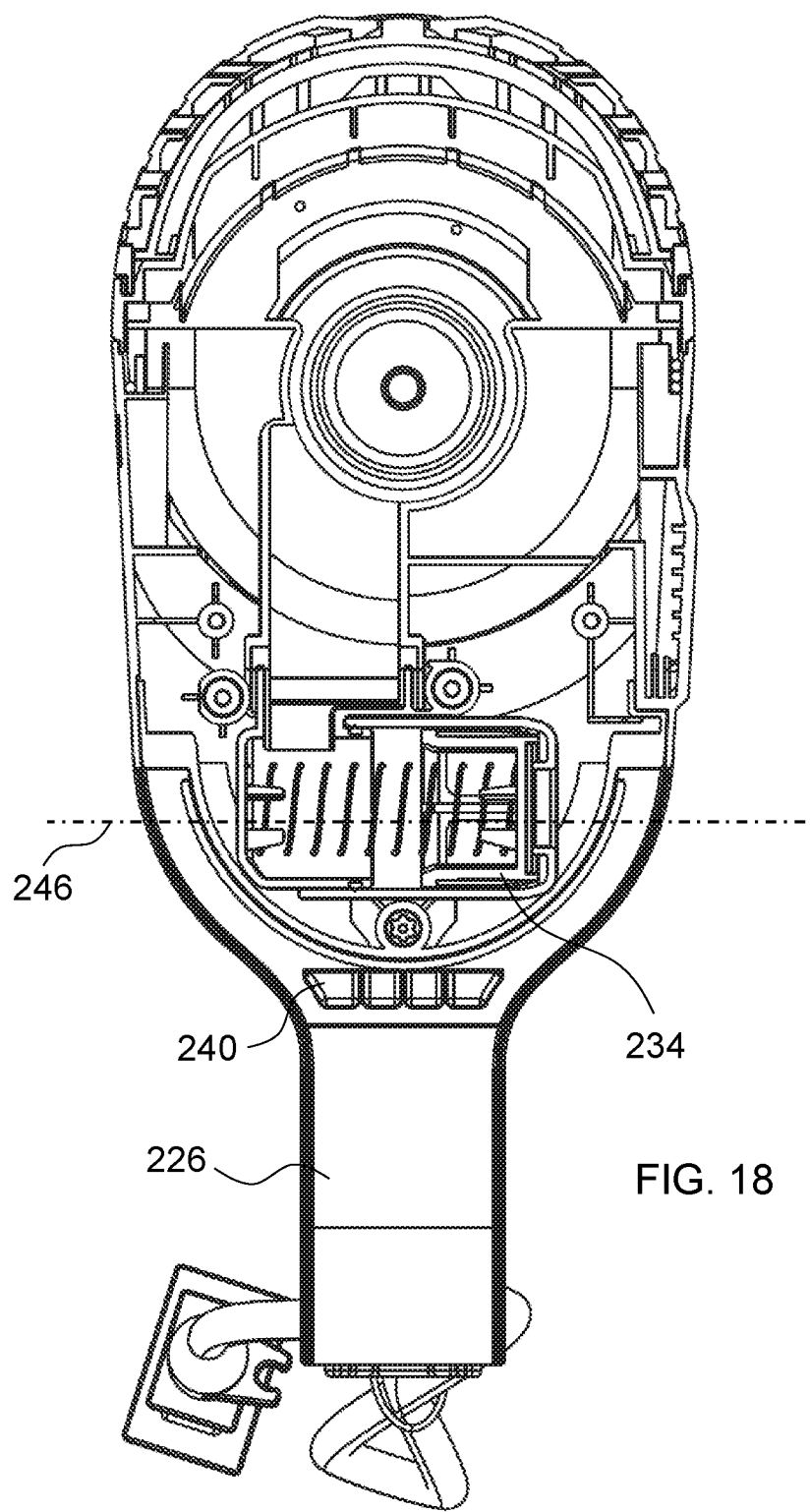
FIG. 18 is a cross sectional view of the hand vacuum of FIG. 1, taken along line 18-18 of FIG. 2.
Figure 22:
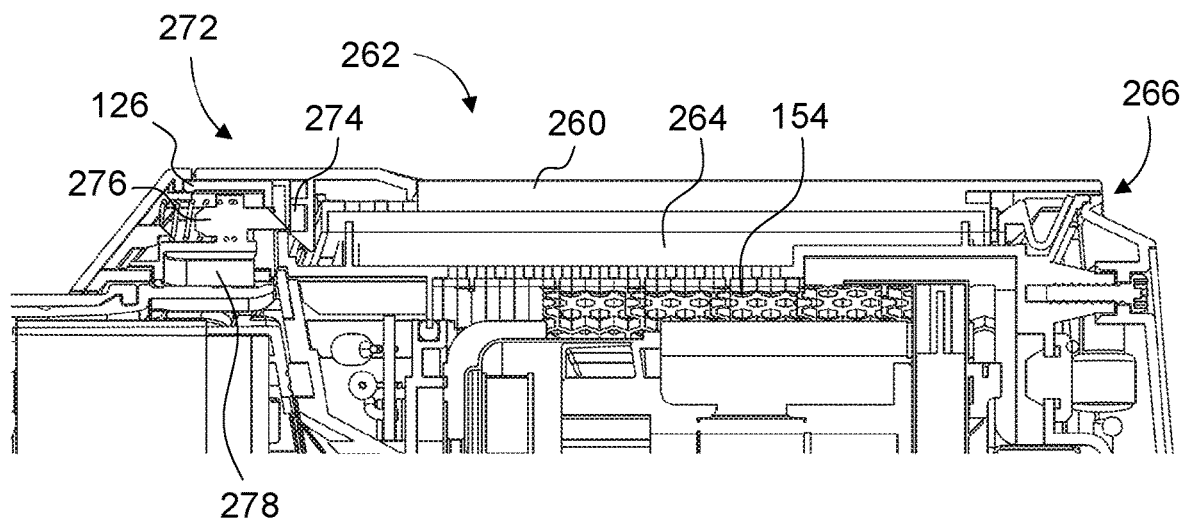
FIG. 22 is a view of a portion of the cross section of FIG. 19 with a retractable projection of the housing withdrawn.
Figure 23:
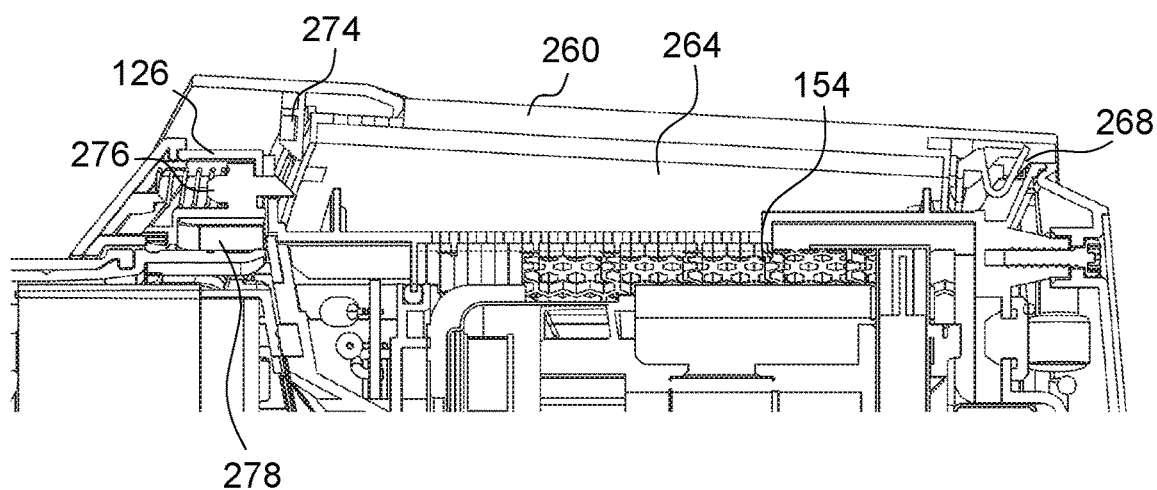
FIG. 23 is the view of FIG. 22 with a removable cover lifted to a first removal position.

In the illustrated embodiment, bleed valve chamber 238 is formed by a front panel 244 enclosing a recess 245 in a forward portion of finger guard 226. Surface vent 240 is also formed in front panel 244, and front panel 244 forms a front wall of bleed valve inlet passage 242. In FIGS. 16 and 17 bleed valve assembly 232 is shown with portions of the finger guard 226 and hand grip 224 housing 126 removed to better show bleed valve outlet passage 239.

Bleed valve 234 has a bleed valve axis 246. Bleed valve axis 246 is generally perpendicular to inlet conduit axis 160, suction motor axis 140, and cyclone axis 152. A bleed valve axis 246 perpendicular to the inlet conduit axis 160 may allow for a more compact construction. In the illustrated example, the bleed valve axis 246 is also generally horizontal when the hand vacuum cleaner 100 is in an operating position. This orientation of axes 246, 160, 140, 152 may contribute to a compact construction and/or a more desirable hand feel.

As discussed previously, air treatment member assembly 130 has a recess 209 is provided to receive portion 211 which, as exemplified, comprises the bleed air chamber front panel 244. As the bleed air chamber is accordingly positioned with the air treatment member assembly 130 when the air treatment member assembly 130 is in the operating position, housing surface vent 240 is positioned so as to be exterior to the air treatment member assembly 130 when the air treatment member assembly 130 is in the operating position.

Figure 29:
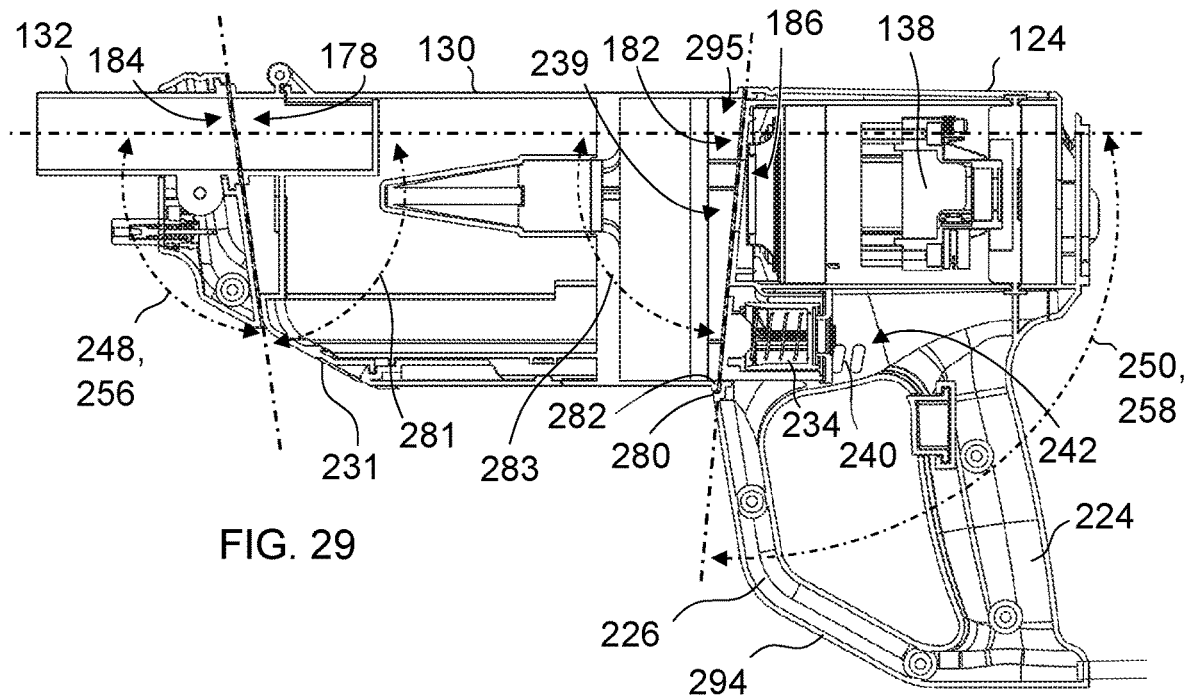
FIG. 29 is a cross sectional view of the hand vacuum of FIG. 26 taken along line 29-29.
Figure 30:
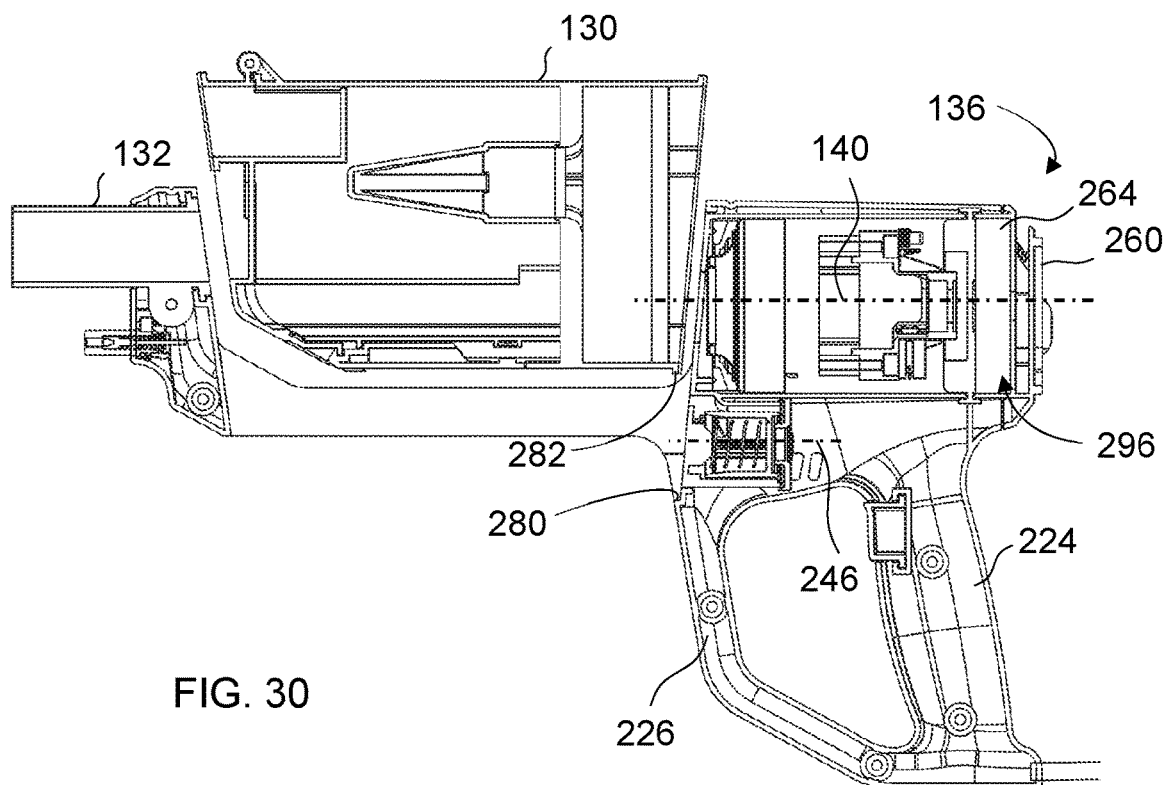
FIG. 30 is the view of FIG. 29 with the air treatment member assembly removed to a first removal position.
Figure 31:
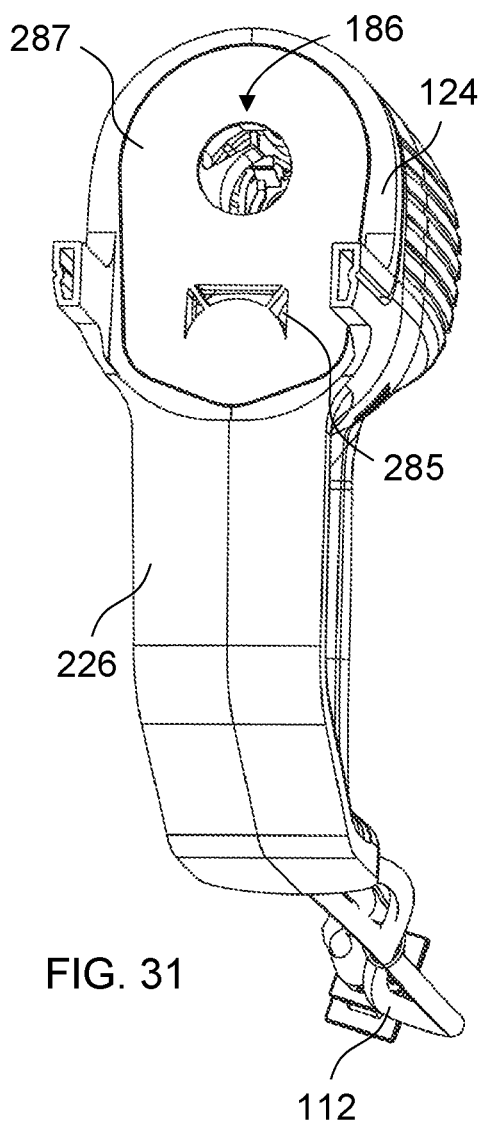
FIG. 31 is a perspective cross sectional view of the hand vacuum of FIG. 26 taken along line 31-31 of FIG. 28.
Figure 32:
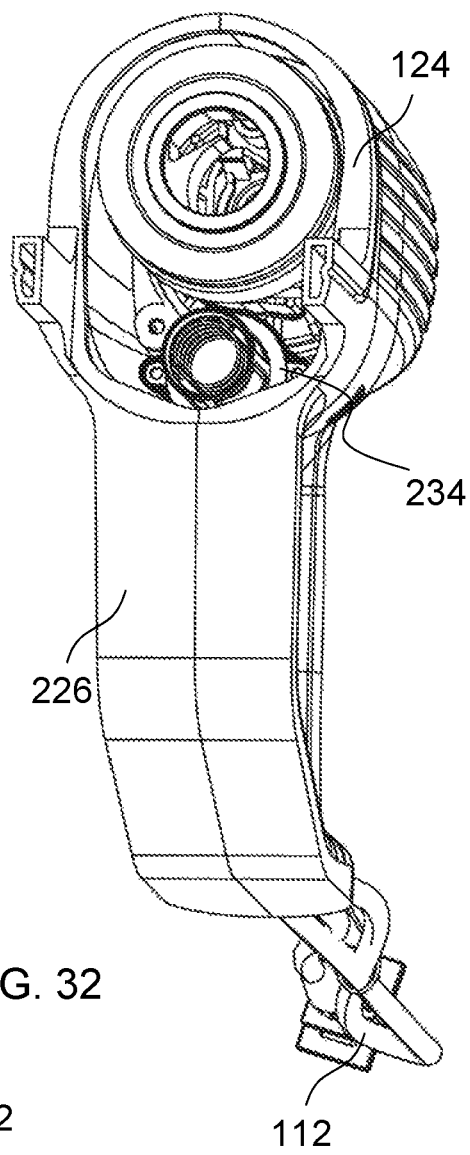
FIG. 32 is the view of FIG. 31 with a portion of a housing removed.
Figure 33:
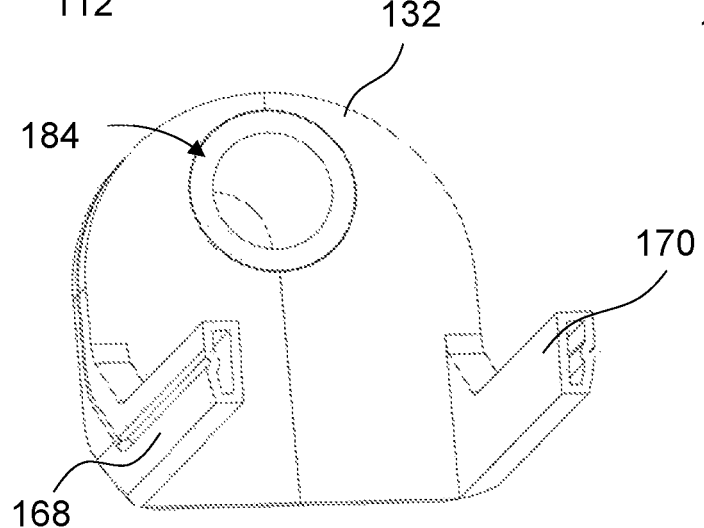
FIG. 33 is a perspective cross sectional view of the hand vacuum of FIG. 26 taken along line 33-33 of FIG. 28.
Figure 34:
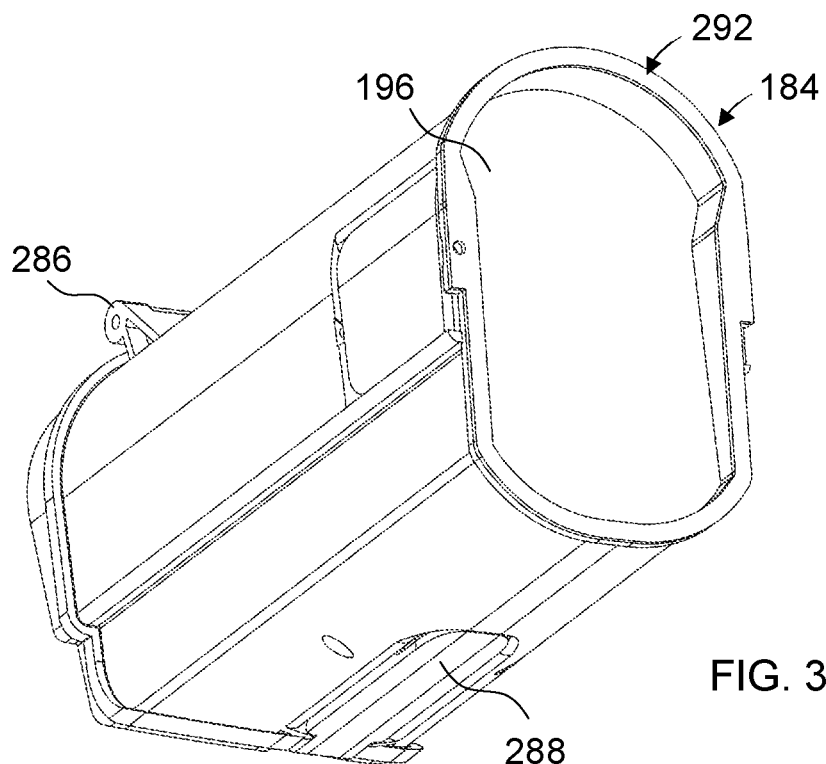
FIG. 34 is a rear perspective view of the air treatment member assembly of the hand vacuum of FIG. 26.
Figure 35:
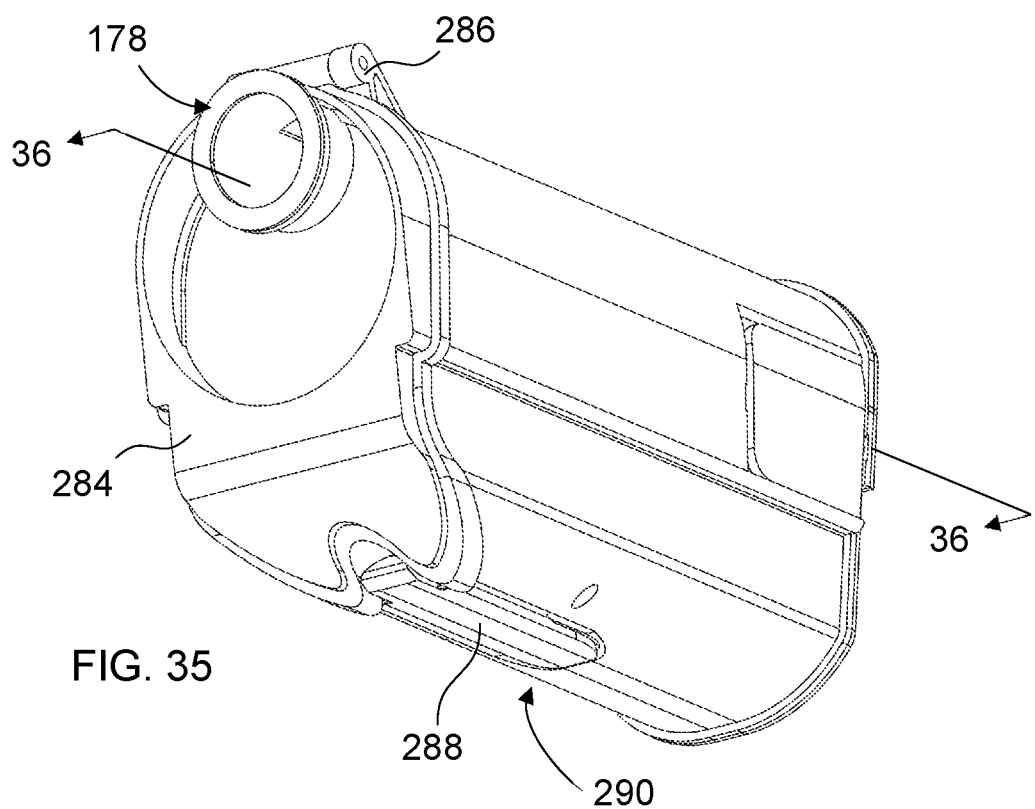
FIG. 35 is a front perspective view of the air treatment member assembly of FIG. 34.
Figure 36:
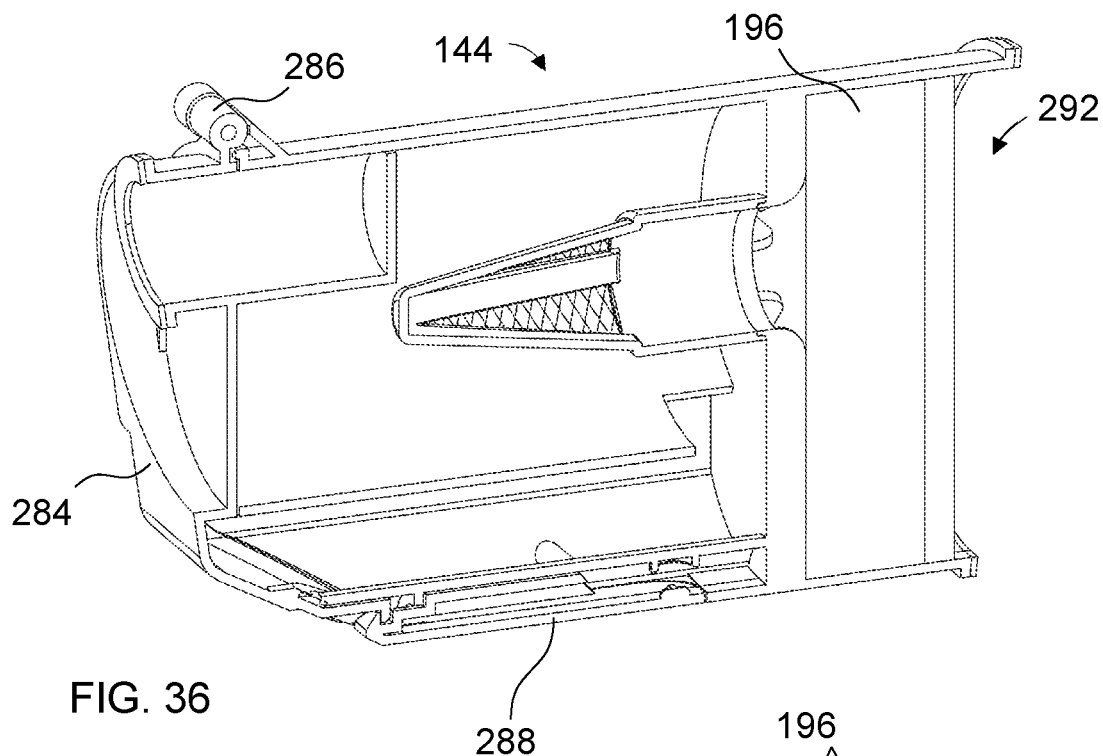
FIG. 36 is a cross sectional view of the air treatment member assembly of FIG. 35 taken along line 36-36.
Figure 37:
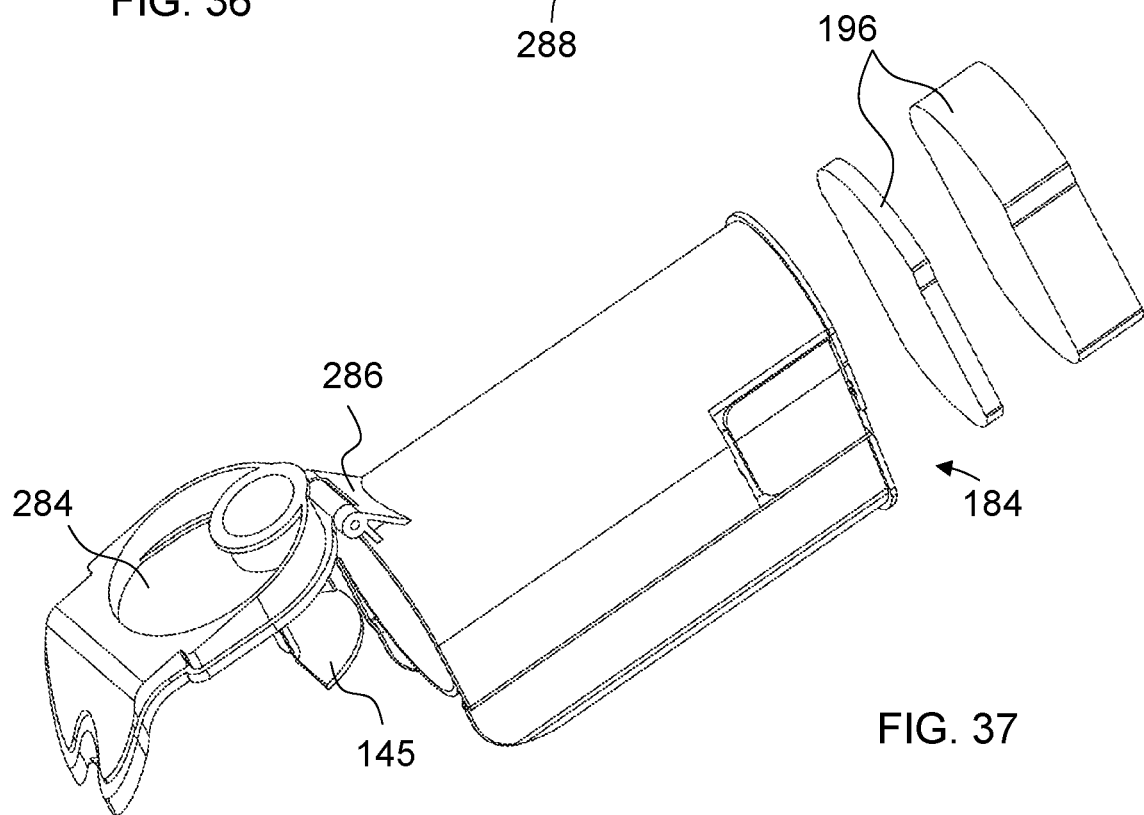
FIG. 37 is an exploded perspective view of the air treatment member of FIG. 34 in an open position.

Optionally, as exemplified in FIGS. 29 and 30, bleed valve axis 246 may be generally parallel to motor axis 140. In the illustrated embodiment, bleed valve 234 is positioned above finger guard 226. A bleed valve inlet passage 242 runs from a housing surface vent 240 to bleed valve chamber 238. Bleed valve 234, which is in bleed valve chamber 238, is fluidly connected to suction motor 138 by bleed valve outlet passage 239 formed between a forward surface of main body 124 and a rear surface of air treatment member 130 and extending from outlet vent 285 (FIG. 31) in face plate 287 to inlet 186 of main body 124.

Angled Inlet or Outlet

In accordance with another aspect of this disclosure, which may be used alone or in combination with any other aspect, one or more of a nozzle portion air outlet, air treatment member air inlet, air treatment member air outlet, and main body air inlet is angled relative to an inlet axis, and the air treatment member assembly is removable upwardly or downwardly.

Inlets and outlets may be angled relative an inlet axis to reduce friction between adjacent materials (e.g., a sealing member and a face of a component) during removal of the air treatment member assembly. For example, when an air treatment member assembly is removed downward, an angled inlet of the air treatment member assembly may move away from an angled outlet of the nozzle portion with reduced or no sliding against the outlet of the nozzle portion. Angled inlets or outlets may reduce the wear of these materials and reduce the risk of air flow leaks forming in the air flow passage.

At least one angled inlet or outlet may reduce material wear, and in particular angling an interfacing pair of inlet and outlet may reduce material wear.

Referring to FIGS. 19 to 21 and FIGS. 5 and 6, illustrated air treatment member assembly 130 has a front end 176 having an air inlet 178 and a rear end 180 having an air outlet 182. The air inlet 178 is in air flow communication with a nozzle air outlet 184 when the air treatment member assembly 130 is in an operating position. The air outlet 182 is in air flow communication with a main body air inlet 186 when the air treatment member assembly 130 is in an operating position.

In the illustrated example, each of outlet 184 of nozzle portion 132, inlet 178 of air treatment member assembly 130, outlet 182 of air treatment member assembly 130, and inlet 186 of main body 124 is angled relative to inlet conduit axis 160 of inlet conduit 158. Outlet 184 and inlet 178 extend downwardly and forwardly at an included angle 248 to the inlet conduit axis 160 when the air treatment member assembly 130 is in an operating position. Outlet 182 and inlet 186 extend downwardly and rearwardly at an included angle 250 to the inlet conduit axis 160 when the air treatment member assembly 130 is in an operating position.

Angles 248, 250 may be any suitable angle to reduce material ware. Each of angles 248, 250 may be individually selected to be between 45° and 85°, 70° and 80° or 60° and 80°. Accordingly, angles 248, 250 may be the same or different. It will be appreciated that a greater angle may result in less significant wear reduction, while lesser angles may result in an interface between an inlet and an outlet that is more parallel to air flow direction and harder to seal.

Optionally, as exemplified, each of the inlets and outlets has a port that is located in the same plane as the respective inlet and the outlet with which it is associated.

In the illustrated example, air treatment member assembly air inlet port 252 (FIG. 5) of air inlet 178 is located in a plane. When the air treatment member assembly 130 is in the operating position, an angle 256 from the inlet conduit axis 160 downwardly and rearwardly to the plane is between 60° and 80°, although other angles may be suitable in some cases. Nozzle portion air outlet 184 extends at a mating angle.

Also in the illustrated example, air treatment member assembly air outlet port 254 (FIG. 6) of air outlet 182 is located in a plane. When the air treatment member assembly 130 is in the operating position, the angle 258 from the inlet conduit axis 160 downwardly and forwardly to the plane is between 60° and 80°, although other angles may be suitable in some cases. Main body air inlet 186 extends at a mating angle.

Opposite angles may be used in some embodiments, such as when an air treatment member assembly 130 is to be removable upwardly.

Referring to FIG. 29, the example illustrated embodiment includes outlet 184 of nozzle portion 132, inlet 178 of air treatment member assembly 130, outlet 182 of air treatment member assembly 130, and inlet 186 of main body 124. In the illustrated example of FIG. 29, each of the air treatment member air inlet 178 and the nozzle portion air outlet 184 extend upwardly and forwardly at an angle to the inlet axis. Each of the air treatment member air outlet 182 and the main body air inlet 186 extend upwardly and rearwardly at an angle to the inlet axis.

As illustrated in the embodiment of FIG. 29, the air treatment member air inlet 178 may have an inlet port that is located in a plane and, when the air treatment member assembly is in the operating position, an included angle 281 downwardly and forwardly from the inlet axis to the plane is between 60° and 80° and the nozzle portion air outlet extends at a mating angle. As also illustrated in the embodiment of FIG. 29, the air treatment member air outlet 182 may have an outlet port that is located in a plane and, when the air treatment member assembly is in the operating position, an included angle 283 from the inlet axis downwardly and rearwardly to the plane is between 60° and 80° and the main body air inlet extends at a mating angle.

Retractable Inlet or Outlet

In accordance with another aspect of this disclosure, which may be used alone or in combination with any other aspect, at least one of the nozzle portion air outlet, the air treatment member assembly air inlet, the air treatment member assembly air outlet and the main body air inlet is retractable.

An air inlet and/or air outlet may be retractable to reduce friction between adjacent materials during removal of the air treatment member assembly. For example, an inlet or an outlet may be retracted before the air treatment member assembly is removed and/or as the air treatment member assembly is inserted into the volume so that adjacent materials are spaced apart so that adjacent portions (e.g., a sealing member and an air flow port) do not slide against one another during insertion and/or removal of the air treatment member assembly or the amount of engagement is reduced during insertion and/or removal. Sliding of materials against one another may be particularly damaging when the materials are air flow sealing materials, such as gasket. Reducing wear on materials may assist in preventing air flow leaks from an air flow passage.

In some embodiments (not shown), one or more air inlet or air outlet may be retractable. For example, one or more of outlet 184 of nozzle portion 132, inlet 178 of air treatment member assembly 130, outlet 182 of air treatment member assembly 130, and inlet 186 of main body 124 by be retractable.

In some embodiments, when one or more of the inlets or outlets is retractable an angle between the inlet conduit 160 and a plane to which an inlet or outlet extends generally parallel may be between 5 and 85°, as retraction of the inlet or outlet may greatly change the dynamics of material wear.

For example, a plane may extend at angle 256 or 258, and angle 256 or 258 may be an included angle and may be between 5° and 85°. The angle from the conduit axis 160 to the plane may be upwardly or downwardly and forwardly or rearwardly, and retractable inlets or outlets may be used with upwardly removable air treatment member assembly's, downwardly removable air treatment member assemblies, or otherwise removable air treatment member assemblies. However, an angle 256 downwardly and rearwardly and an angle 258 downwardly and forwardly may reduce the necessary retraction distance for a downwardly removable air treatment member assembly 130. Similarly, an angle 256 upwardly and rearwardly and an angle 258 upwardly and forwardly may reduce the necessary retraction distance of an inlet or outlet for an upwardly removable air treatment member assembly 130.

Retraction of an inlet or outlet may be in any suitable direction, however axial translation of the inlet or outlet, as exemplified in FIGS. 39 to 44, may result in reduced device complexity. For example, an inlet may be an end of a conduit having a conduit axis, and the conduit may translate axially away from a mating air flow conduit. In some cases, retraction may be the result of a pinching mechanism actuated by a user, such as activated by a user when releasing the air treatment member assembly by retracting projections of the air treatment member assembly from slots in the arms of the hand vacuum cleaner.

Removable Post-Motor Filter Cover

In accordance with another aspect of this disclosure, which may be used alone or in combination with any other aspect, one or more post-motor filters may be positioned in the air flow passage between the suction motor 138 and the clean air outlet 136 and a motor housing cover may be removable and may enclose the post motor filter. A removable motor housing cover may allow access to a post motor filter chamber and a post motor filter contained therein.

Referring now to FIGS. 22 to 25, a removable cover 260 may overlay clean air outlet grill 154. The removable cover 260 and grill 154 may form a post-motor filter housing 262. In the illustrated embodiment, a post-motor filter 264 is provided within the housing 262 to help further treat the air passing through the hand vacuum 100. The illustrated post-motor filter 264 is a physical foam media filter, but optionally the post-motor filters may be any suitable type of filter and may include one or more foam filter, felt filter, HEPA filter, other physical filter media, an electrostatic filter and the like. It will be appreciated that any post motor air flow passage may be used.

Removable cover 260 may be removably secured in any suitable way. In the illustrated example, removable cover 260 is positioned over post motor filter 264. A rearward end 266 of cover 260 includes a projection 268 (FIG. 23) which may rest in a recess 270 (FIG. 25) of housing 126. A forward end 272 of cover 260 includes a recess 274. A retractable projection 276 of housing 126 may be biased in an extended position, but may be retracted by a user when the air treatment member assembly 130 is removed by reaching through volume 172 and withdrawing finger tab 278 to withdraw retractable projection 276 and release cover 260.

Figure 26:
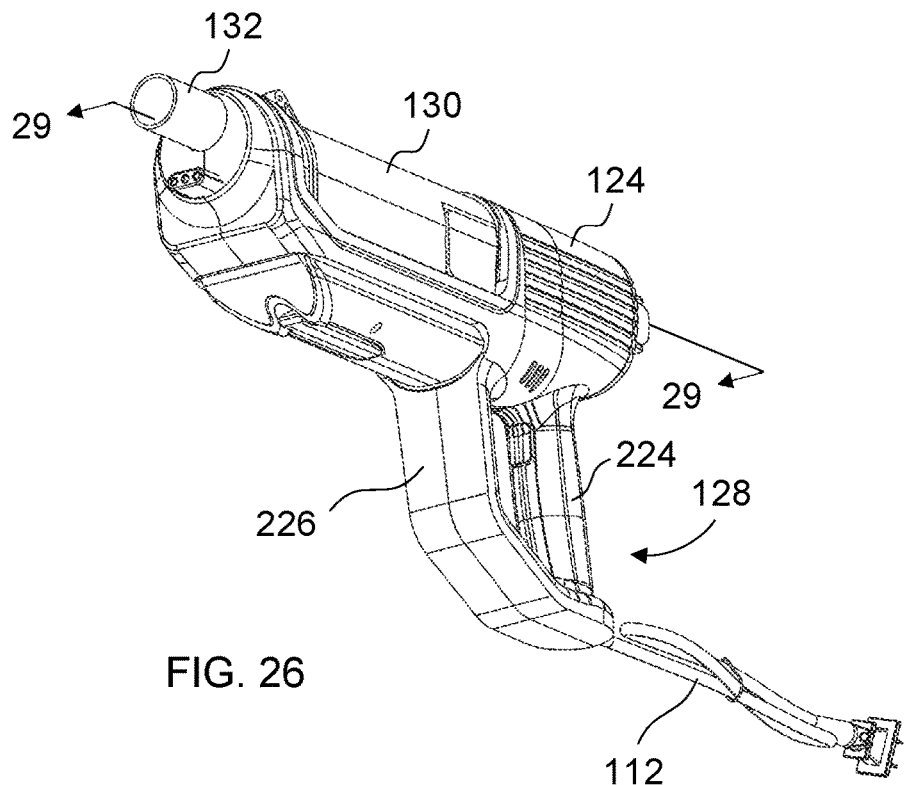
FIG. 26 is a perspective view of a hand vacuum according to another embodiment.
Figure 27:
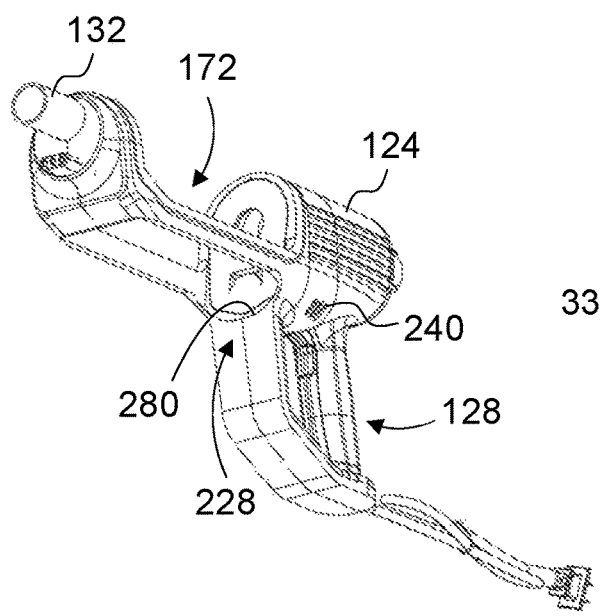
FIG. 27 is a front perspective view of the hand vacuum of FIG. 26 with an air treatment member assembly removed.
Figure 28:
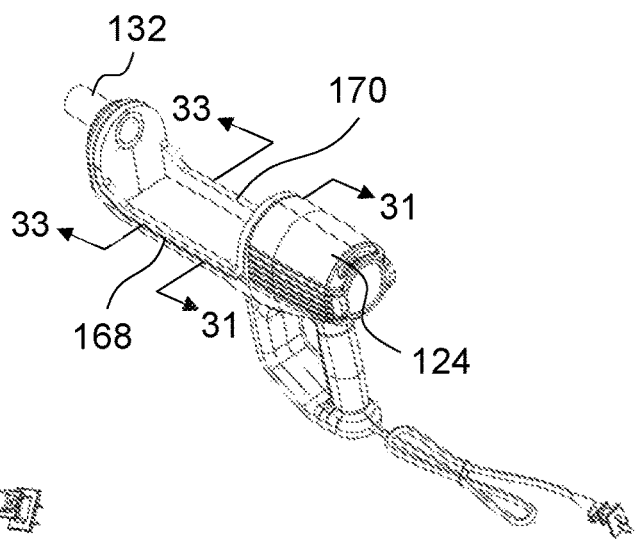
FIG. 28 is a rear perspective view of the hand vacuum of FIG. 27.
Figure 38:
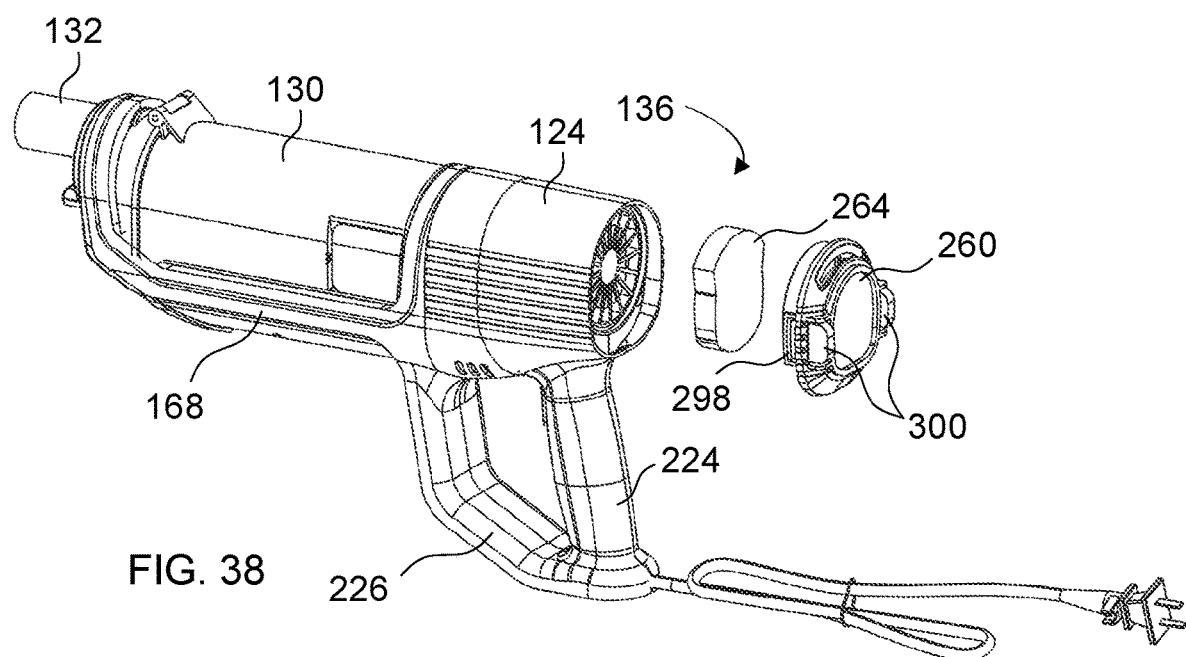
FIG. 38 is a partially exploded view of the hand vacuum of FIG. 26.
Figure 39:
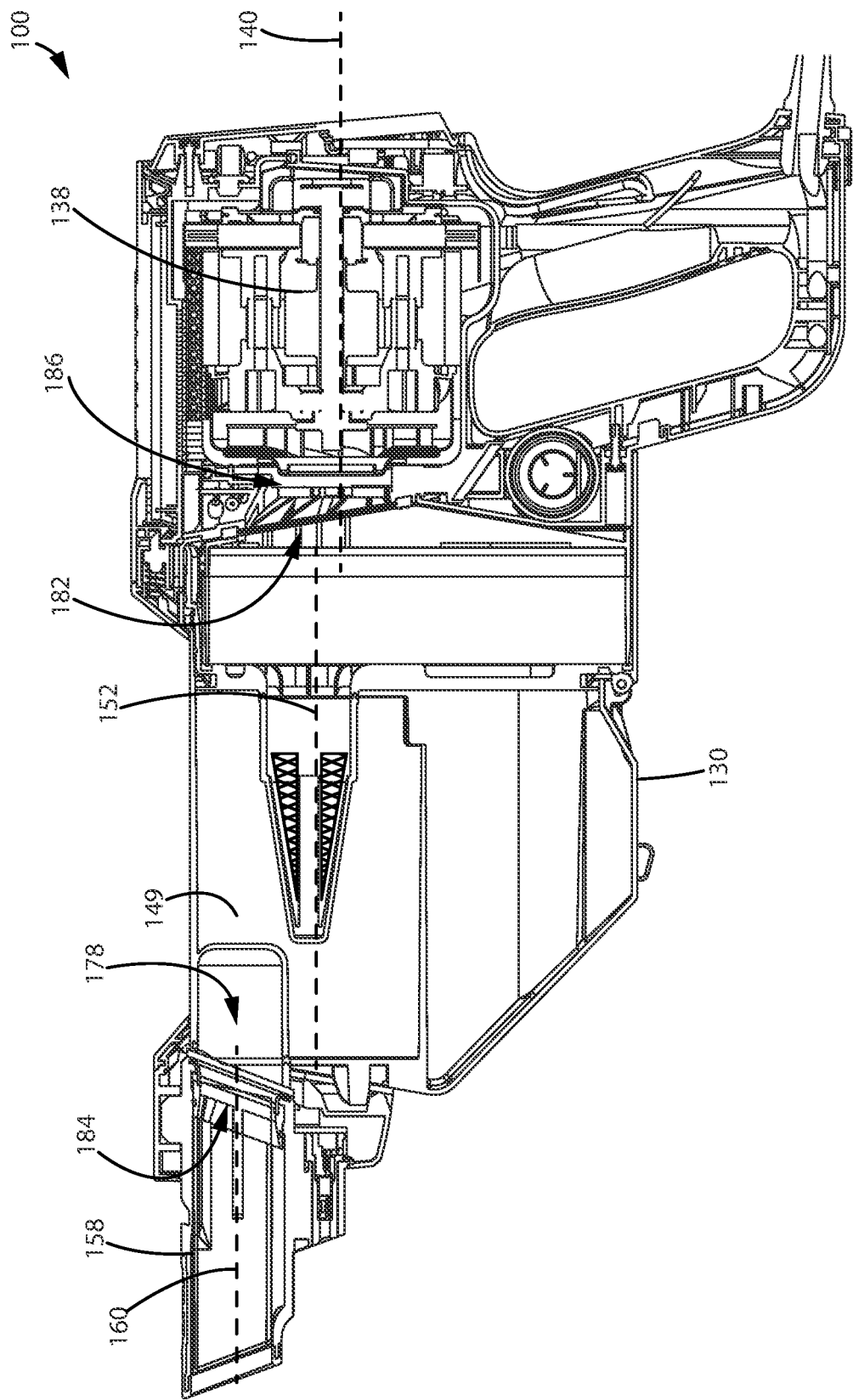
FIG. 39 is a cross sectional side view of a hand vacuum cleaner according to another embodiment.
Figure 40:
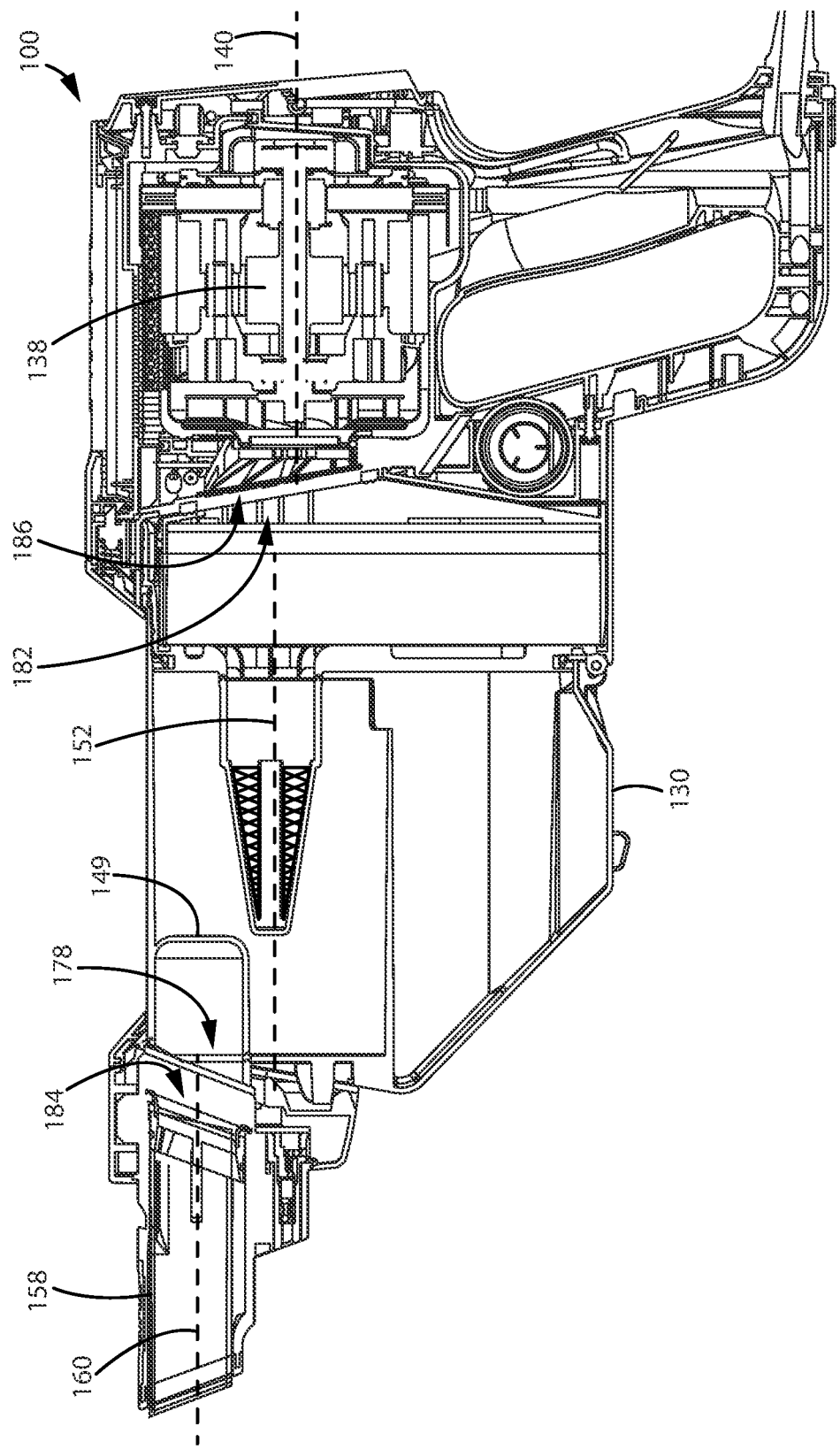
FIG. 40 is a cross sectional side view of the hand vacuum cleaner of FIG. 39 with a nozzle portion air outlet and a main body air inlet axially translated.
Figure 41:
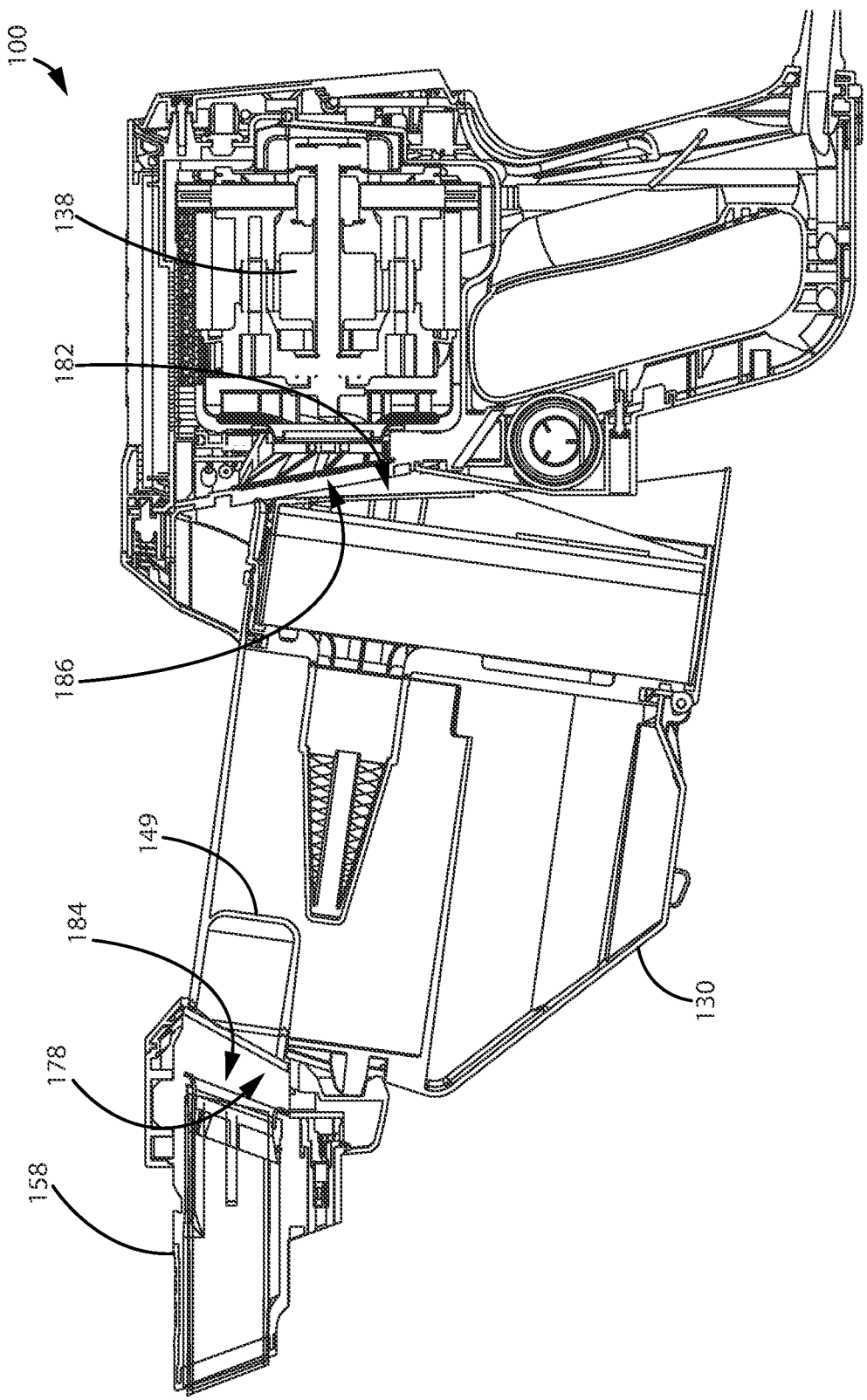
FIG. 41 is a cross sectional side view of the hand vacuum cleaner of FIG. 39 with the air treatment member assembly partially removed.
Figure 42:
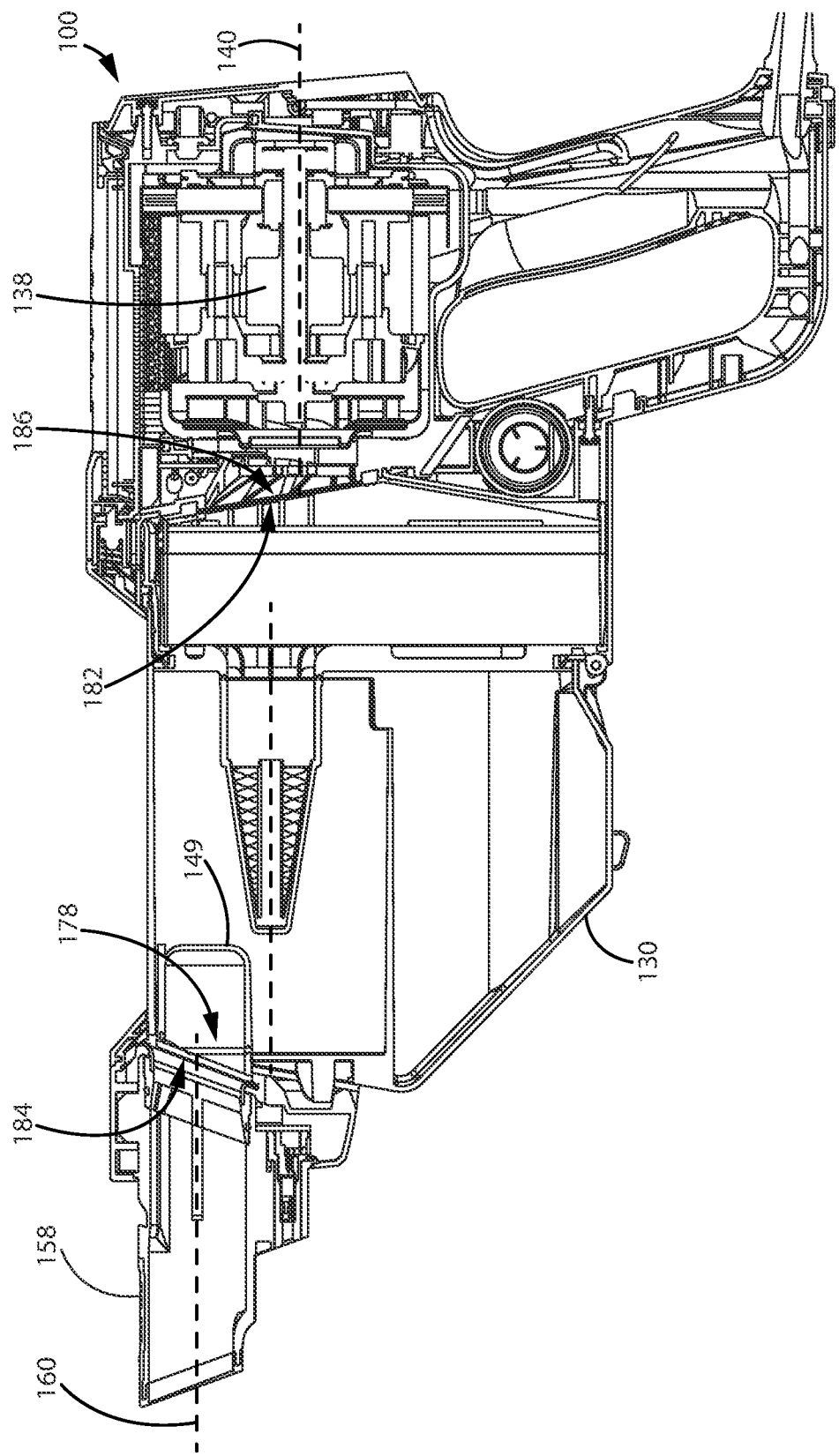
FIG. 42 is a cross sectional side view of a hand vacuum cleaner according to another embodiment.
Figure 43:
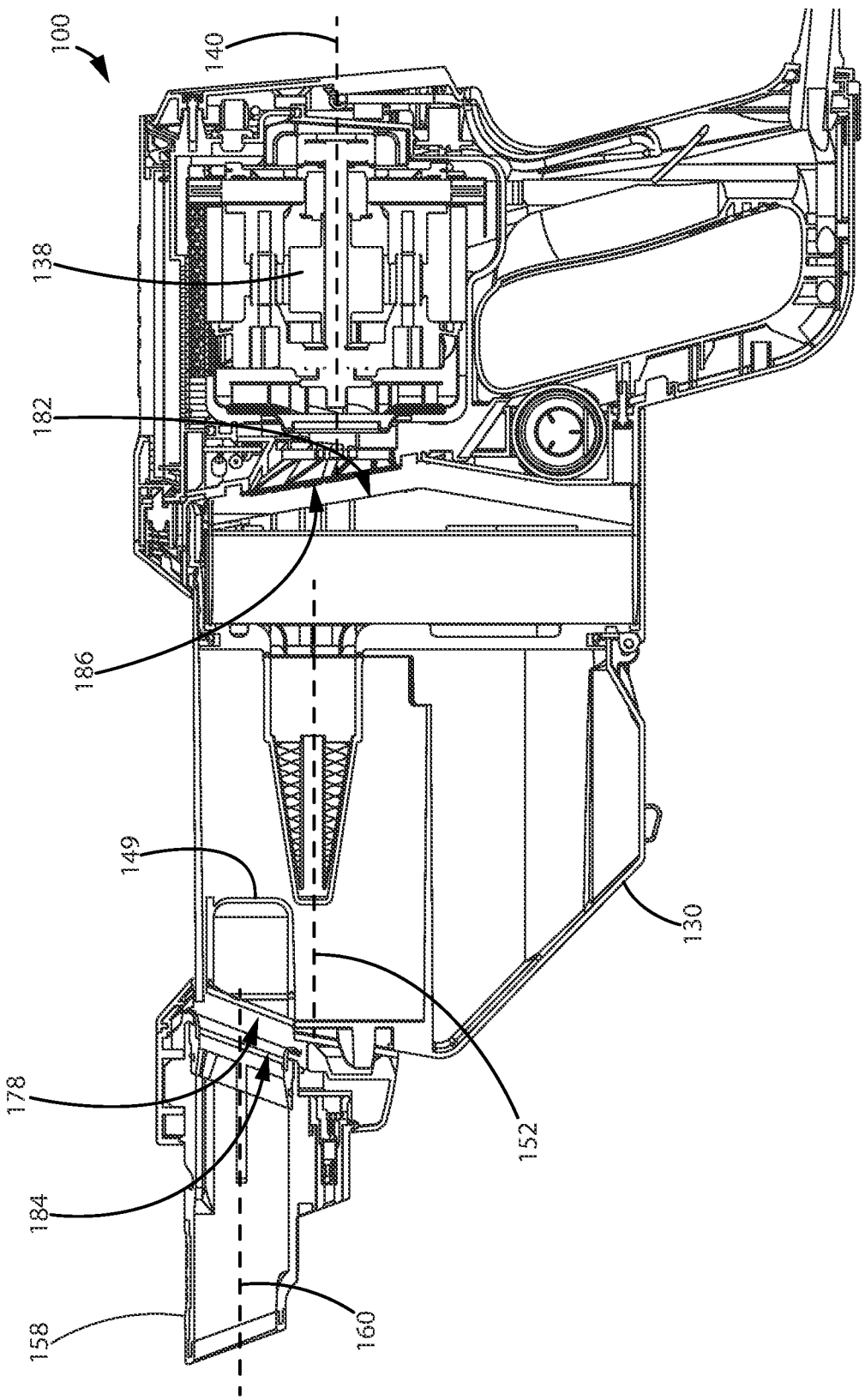
FIG. 43 is a cross sectional side view of the hand vacuum cleaner of FIG. 42 with an air treatment member assembly air inlet and an air treatment member assembly air outlet axially translated; and, FIG. 44 is a cross sectional side view of the hand vacuum cleaner of FIG. 42 with the air treatment member assembly partially removed.
Figure 44:
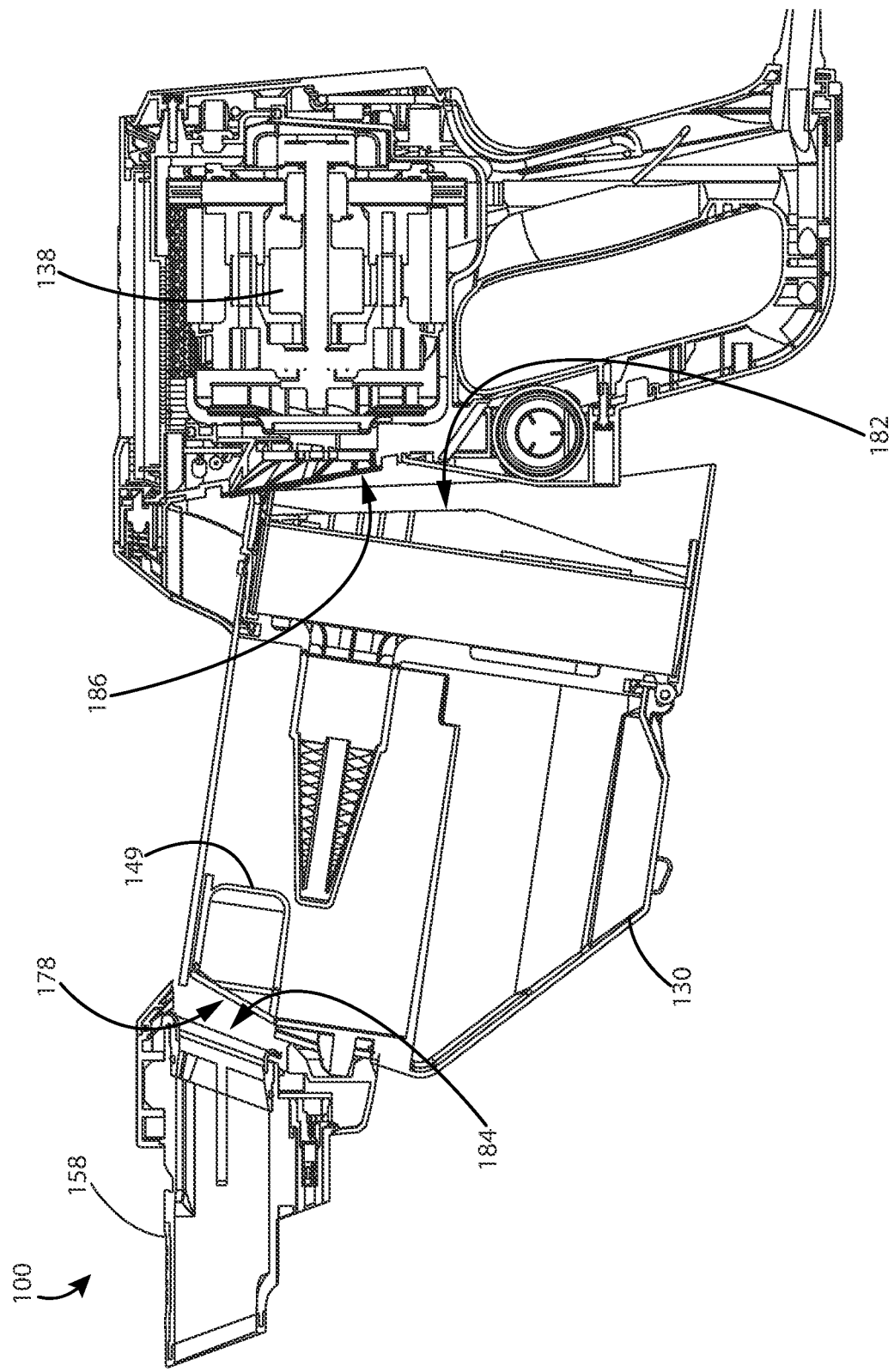

As exemplified in FIG. 26 The removable cover of the embodiment of FIGS. 26 to 38 has a post-motor filter module 296 (FIG. 30) to hold the post motor filter 264, and is held in position by snap-fit projections 298 which may be released by depressing buttons 300 (FIG. 38).

Air Treatment Member Assembly Seating on a Base

In accordance with one aspect of this disclosure, which may be used alone or in combination with any other aspect, a removable air treatment member assembly is removable upwardly and seats on a lower portion of the main body when the air treatment member assembly is in the operating position.

Seating the air treatment member assembly on the lower portion of the main body may simplify inserting or securing the air treatment member assembly. It may also increase the stability of the air treatment member assembly, and reduce movement between the air treatment member assembly and other parts of the surface cleaning apparatus. Reduced movement may increase the performance of the surface cleaning apparatus, such as by reducing wear on interfacing materials or by preventing misalignment.

The air treatment member assembly 130 may seat on any portion of the main body or any member attached to the main body. Accordingly, the air treatment member assembly 130 may seat on a base portion 280 wherein the base portion 280 may be provided on any suitable lower portion of the main body 124 to provide a seat for a part of the air treatment member assembly 130.

As exemplified in FIGS. 26 to 38, the base portion 280 is an upper portion of the handle assembly 128 which extends forwardly of the main body to underlie the volume 172.

As exemplified, base portion 280 is an upward-facing lip on which a rear edge 282 of the air treatment member assembly 130 may seat. In some cases, base portion 280 may form a wider seat. For example, in some embodiments, suction motor 138 may be set back further, and handle assembly 128 may have a larger upper surface provided to receive the air treatment member assembly 130. A larger base portion 280 may provide a more secure seat, but may not be as compact.

An upwardly removable air treatment member assembly 130 may rest upon base portion 280, and a secure seat for an upward removable air treatment member assembly 130 may allow air treatment member assembly 130 to remain in an operating position without a need for snap-fit projections 206. However, in some cases fasteners such as snap-fit projections 206 may be used to more securely hold air treatment member assembly 130 in an operating position.

Hand Vacuum Cleaner Stand

In accordance with another aspect of this disclosure, which may be used alone or in combination with any other aspect, the hand vacuum cleaner may be configured to stand on a horizontal surface with the hand grip portion facing upwardly. An advantage of this design is that a hand vacuum cleaner 100 may also have a resting position in which hand vacuum cleaner 100 may be set down on a surface with a rear handle assembly 128 raised for easy user access.

As exemplified in FIGS. 19 and 29, hand vacuum cleaner 100 includes a resting surface 231 on a front of the air treatment member assembly having a plane at an angle 233 downwardly and forwardly from the inlet conduit axis 160. When hand vacuum cleaner 100 is placed down with the resting surface 231 on an environmental surface, handle assembly 128 is raised for user access.

One or more further surfaces may also be provided to cooperate with a resting surface 231 in increasing the stability of a resting position of the hand vacuum cleaner 100. For example, air treatment member assembly 130 may include supporting legs 235 (see for example FIG. 7). Surfaces may also or alternatively be angled or otherwise suitably arranged to prevent the surfaces from interfering with a resting position of the hand vacuum cleaner.

Optionally, a front end surface 237 of nozzle portion 132 may also be angled, e.g., at the same angle as resting surface 231, to provide the front end 237 with a mating surface to enable the hand vacuum cleaner to be more stable in the resting position of the hand vacuum cleaner 100. Alternately, or in addition, as exemplified in FIG. 29, the handle assembly 128, and particularly the finger guard 226, may have a resting surface 294 that may be similarly angled to provide a supporting resting surface. Accordingly, resting surfaces 294 and 231 may have substantially parallel planes of extent.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A hand vacuum cleaner comprising:
   (a) an air flow passage extending from a dirty air inlet at a front end of the hand vacuum cleaner to a clean air outlet;
   (b) a nozzle portion comprising an air inlet conduit that extends from the dirty air inlet provided at the front end of the hand vacuum cleaner to an air outlet of the nozzle portion, the air inlet conduit having a conduit axis;
   (c) a main body positioned rearward of the nozzle portion and housing a suction motor, the suction motor provided in the air flow passage, the main body having a front end having an air inlet wherein air enters the main body in a main body air inlet flow direction;
   (d) first and second laterally spaced apart opposed arm members extending between the nozzle portion and the main body wherein a volume is positioned between the nozzle portion, the main body and the opposed arm members;
   (e) an air treatment member assembly comprising an air treatment member, the air treatment member assembly has a front end having an air inlet wherein air enters the air treatment member assembly in an air treatment member assembly inlet flow direction and a rear end having an air outlet wherein air exits the air treatment member assembly in an air treatment member assembly outlet flow direction, the air treatment member assembly is removably positionable in the volume wherein, when the air treatment member assembly is mounted to the hand vacuum cleaner in an operating position, the air treatment member assembly is positioned in the volume and the air treatment member is positioned in the air flow passage; and,
   wherein at least one of
   (a) the nozzle portion air outlet is translatable along the conduit axis away from the air treatment member assembly air inlet,
   (b) the air treatment member assembly air inlet is translatable in the air treatment member assembly inlet flow direction away the nozzle portion air outlet,
   (c) the air treatment member assembly air outlet is translatable in the air treatment member assembly outlet flow direction away from the main body air inlet, and (d) the main body air inlet is translatable in the main body air inlet flow direction away from the air treatment member assembly air outlet, whereby, before a user is able to remove the air treatment member assembly from the volume, the user must:

(i) translate the nozzle portion air outlet along the conduit axis away from the air treatment member assembly air inlet; or (ii) translate the air treatment member assembly air inlet in the air treatment member assembly inlet flow direction away the nozzle portion air outlet; or (iii) translate the air treatment member assembly air outlet in the air treatment member assembly outlet flow direction away from the main body air inlet; or (iv) translate the main body air inlet in the main body air inlet flow direction away from the air treatment member assembly air outlet.

2. The hand vacuum cleaner of claim 1 wherein one of the nozzle portion air outlet and the air treatment member assembly air inlet is axially translatable away from the other of the nozzle portion air outlet and the air treatment member assembly and one of the air treatment member assembly air outlet and the main body air inlet is axially translatable away from the other of the air treatment member assembly air outlet and the main body air inlet.

3. The hand vacuum cleaner of claim 1 wherein one of the nozzle portion air outlet and the air treatment member assembly air inlet is axially translatable away from the other of the nozzle portion air outlet and the air treatment member assembly.

4. The hand vacuum cleaner of claim 1 wherein one of the air treatment member assembly air outlet and the main body air inlet is axially translatable away from the other of the air treatment member assembly air outlet and the main body air inlet.

5. The hand vacuum cleaner of claim 1 wherein the dirty air inlet has an inlet axis and a plane extends at an angle of 5° to 85° to the dirty air axis wherein, when the air treatment member assembly is in the operating position, the air treatment member air outlet is in air flow communication with the main body air inlet and each of the air treatment member air outlet and the main body air inlet extend generally parallel to the plane.

6. The hand vacuum cleaner of claim 5 wherein when the air treatment member assembly is in the operating position, the air treatment member air outlet is in air flow communication with the main body air inlet and each of the air treatment member air outlet and the main body air inlet extend downwardly and rearwardly at an angle to the inlet axis.

7. The hand vacuum cleaner of claim 6 wherein the air treatment member air outlet has an outlet port that is located in a plane and, when the air treatment member assembly is in the operating position, an included angle from the inlet axis downwardly and rearwardly to the plane is between 60° and 80° and the main body air inlet extends at a mating angle.

8. The hand vacuum cleaner of claim 1 wherein a rear end of the nozzle portion has a nozzle portion air outlet, the dirty air inlet has an inlet axis and a plane extends at an angle of 5° to 85° to the dirty air axis wherein, when the air treatment member assembly is in the operating position, the air treatment member air inlet is in air flow communication with the nozzle portion air outlet and each of the air treatment member air inlet and the nozzle portion air outlet extend generally parallel to the plane.

9. The hand vacuum cleaner of claim 8 wherein when the air treatment member assembly is in the operating position, the air treatment member air inlet is in air flow communication with the nozzle portion air outlet and each of the air treatment member air inlet and the nozzle portion air outlet extend downwardly and forwardly at an angle to the inlet axis.

10. The hand vacuum cleaner of claim 9 wherein the air treatment member air inlet has an inlet port that is located in a plane and, when the air treatment member assembly is in the operating position, an included angle downwardly and forwardly from the inlet axis to the plane is between 60° and 80° and the nozzle portion air outlet extends at a mating angle.

11. The hand vacuum cleaner of claim 10 wherein the rear end of the air treatment member assembly has a recess for receiving therein a portion of the main body when the air treatment member assembly is mounted to the hand vacuum cleaner in the operating position.

12. The hand vacuum cleaner of claim 10 wherein the air treatment member assembly is removable upwardly or downwardly.

13. The hand vacuum cleaner of claim 10 wherein the air treatment member comprises a cyclone.

14. The hand vacuum cleaner of claim 10 wherein the air treatment member assembly has a front openable door.

15. The hand vacuum cleaner of claim 10 wherein the air treatment member assembly comprises an pre-motor filter positioned rearward of the air treatment member.

16. The hand vacuum cleaner of claim 15 wherein the pre-motor filter is provided at a rear end of the air treatment member.

17. A hand vacuum cleaner comprising:

(a) an air flow passage extending from a dirty air inlet at a front end of the hand vacuum cleaner to a clean air outlet;

(b) a nozzle portion comprising the dirty air inlet provided at the front end of the hand vacuum cleaner, the nozzle portion having an air outlet;

(c) a main body positioned rearward of the nozzle portion and housing a suction motor, the suction motor provided in the air flow passage, the main body having a front end having an air inlet;

(d) first and second laterally spaced apart opposed arm members extending between the nozzle portion and the main body wherein a volume is positioned between the nozzle portion, the main body and the opposed arm members;

(e) an air treatment member assembly comprising an air treatment member, the air treatment member assembly has a front end having an air inlet and a rear end having an air outlet, the air treatment member assembly is removably positionable in the volume wherein, when the air treatment member assembly is mounted to the hand vacuum cleaner in an operating position, the air treatment member assembly is positioned in the volume and the air treatment member is positioned in the air flow passage; and, wherein at least one of the nozzle portion air outlet is retractable mounted to the nozzle portion, the air treatment member assembly air inlet is retractably mounted to the air treatment member assembly, the air treatment member assembly air outlet is retractably mounted to the air treatment member assembly and the main body air inlet is retractably mounted to the main body whereby, a user is able to remove the air treatment member assembly after:

(i) the nozzle portion air outlet, being retractably mounted to the nozzle portion, is retracted; or
(ii) the air treatment member assembly air inlet, being retractably mounted to the air treatment member assembly, is retracted; or
(iii) the air treatment member assembly air outlet, being retractably mounted to the air treatment member assembly is retracted; or
(iv) the main body air inlet, being retractably mounted to the main body is retracted.

* * * * *